United States Patent
Zhu et al.

(10) Patent No.: US 12,545,688 B2
(45) Date of Patent: *Feb. 10, 2026

(54) CAMPTOTHECIN DERIVATIVE AND CONJUGATE THEREOF

(71) Applicant: SICHUAN BAILI PHARMACEUTICAL CO., LTD, Sichuan (CN)

(72) Inventors: Yi Zhu, Sichuan (CN); Weili Wan, Sichuan (CN); Shi Zhuo, Sichuan (CN); Wei Zhang, Sichuan (CN); Yiying Zhang, Sichuan (CN); Tao K. Xu, Sichuan (CN)

(73) Assignee: SYSTIMMUNE, INC., Redmond, WA (US)

( * ) Notice: Subject to any disclaimer, the term of this patent is extended or adjusted under 35 U.S.C. 154(b) by 876 days.

This patent is subject to a terminal disclaimer.

(21) Appl. No.: 17/761,417

(22) PCT Filed: Sep. 17, 2020

(86) PCT No.: PCT/CN2020/115807
§ 371 (c)(1),
(2) Date: Mar. 17, 2022

(87) PCT Pub. No.: WO2021/052402
PCT Pub. Date: Mar. 25, 2021

(65) Prior Publication Data
US 2022/0411436 A1    Dec. 29, 2022

(30) Foreign Application Priority Data
Sep. 18, 2019 (CN) .......................... 201910885306.2

(51) Int. Cl.
*C07D 491/22* (2006.01)
*A61K 47/68* (2017.01)
*A61P 35/00* (2006.01)
*C07K 5/103* (2006.01)

(52) U.S. Cl.
CPC ...... *C07D 491/22* (2013.01); *A61K 47/68037* (2023.08); *A61K 47/6889* (2017.08); *A61P 35/00* (2018.01); *C07K 5/1008* (2013.01)

(58) Field of Classification Search
CPC ............ C07D 491/22; A61K 47/68037; A61K 47/6889; A61K 47/6855; A61K 47/6803; A61P 35/00; C07K 5/1008
See application file for complete search history.

(56) References Cited

U.S. PATENT DOCUMENTS 10,195,288 B2 * 2/2019 Masuda ........... A61K 47/68037
2021/0347894 A1 * 11/2021 Ying .................. C07K 16/2827

FOREIGN PATENT DOCUMENTS

| | | |
|---|---|---|
| CN | 104755494 A | 7/2015 |
| CN | 105829346 A | 8/2016 |
| CN | 107922477 A | 4/2018 |
| WO | WO2019034176 A1 | 2/2019 |
| WO | WO2020063673 | 4/2020 |

OTHER PUBLICATIONS

Zaman et al. Targeting Trop-2 in solid tumors: future prospects (OncoTargets and Therapy, 2019: 12, 1781-1790). Published online : Mar. 1, 2019. (Year: 2019).*

* cited by examiner

*Primary Examiner* — Joseph K McKane
*Assistant Examiner* — Meghan C Heasley
(74) *Attorney, Agent, or Firm* — EpiMED LLC

(57) ABSTRACT

An antitumor pharmaceutical camptothecin derivative and an antibody-drug conjugate thereof. By means of a series of molecular structure modifications, an optimal camptothecin antitumor drug is obtained, so as to be more suitable as a drug for antibody conjugation.

25 Claims, 5 Drawing Sheets

Specification includes a Sequence Listing.

SEQUENCE LISTING

<160> NUMBER OF SEQ ID NOS: 1

<210> SEQ ID NO 1
<211> LENGTH: 4
<212> TYPE: PRT
<213> ORGANISM: Artificial Sequence
<220> FEATURE:
<223> OTHER INFORMATION: synthesized

<400> SEQUENCE: 1

Gly Gly Phe Gly
1

CAMPTOTHECIN DERIVATIVE AND CONJUGATE THEREOF

CROSS REFERENCE TO RELATED APPLICATIONS

This application is a national stage application of international application number PCT/CN2020/115807, filed Sep. 17, 2020, which claims the priority benefit of Chinese Patent Application Ser. No. 201910885306.2, filed Sep. 18, 2019, the entire disclosures of which are expressly incorporated by reference herein.

TECHNICAL FIELD

The present application relates to camptothecin derivatives and their antibody-drug conjugates thereof as antitumor drugs. Specifically, the present application relates to molecular structure modifications of camptothecin derivatives for the optimization of antibody-drug conjugates.

BACKGROUND

As a new form of targeted drugs, antibody-drug conjugates (ADCs) are typically consisted of three parts: an antibody or antibody-like ligand, a small molecule drug, and a linker coupling the ligand with the drug. Antibody-drug conjugates use the antibody-specific recognition of antigens to transport drug molecules towards target cells and effectively release drug molecules for therapeutic purposes. Antibody-drug conjugates may specifically bind to tumor cells and therefore reduce the potentially detrimental effect on normal cells as compared with traditional chemotherapeutics [Mullard A, (2013) Nature Reviews Drug Discovery, 12:329-332; DiJoseph J F, Armellino D C, (2004) Blood, 103:1807-1814].

In August 2011, the US Food and Drug Administration (FDA) approved a new ADC drug developed by Seattle Genetics, called Adcetris™, for the treatment of Hodgkin lymphoma and relapsed anaplastic large cell lymphoma [Nat. Biotechnol. (2003) 21 (7):778-784; WO2004010957; WO2005001038; U.S. Pat. Nos. 7,090,843A; 7,659,241; WO2008025020]. The clinical disclosure has since demonstrated the safety and efficacy of such ADC drugs.

In February 2013, the US FDA approved the first ADC drug for the treatment of solid tumors, called Kadcyla (ado-trastuzumab emtansine, T-DM1), which has since been used to treat patients with advanced or metastatic HER2-positive breast cancer who are resistant to both trastuzumab (trade name: Herceptin) and paclitaxel (WO2005037992; U.S. Pat. No. 8,088,387).

The commonly used drug or toxins in ADCs include highly toxic toxins, such as MMAE, T-DM1, PBD, etc., which not only are highly toxic but also have narrow treatment windows even in the form of ADCs.

Camptothecin derivatives exert antitumor effects by inhibiting topoisomerase-I, which make this class of small molecules useful for antibody-drug conjugates. As a representative compound, exatecan was developed by Daiichi Sankyo Company. Exatecan was used as a single chemotherapy drug in the early stage and advanced to Phase III clinical trials. The main indications include bone cancer, prostate cancer, breast cancer, pancreatic cancer, etc. Due to severe side effects and narrow therapeutic window, the direct administration of exatecan was eventually failed to be commercialized.

To overcome the side effects from direct administration of exatecan, Daiichi Sankyo developed exatecan as an ADC toxin and was successful in bringing it to the market. The first ADC marketed with exatecan as a toxin (DS-8201) targets HER2 by linking 8 toxin molecules to a single antibody. However, other ADC drugs designed by Daiichi Sankyo using exatecan as toxin for other targets, such as Trop2, had reduced Drug-Antibody-Ratio (DAR) to DAR=4 due to the issue of safety in subsequent clinical trials. The decrease in the number of conjugated drugs usually reduce the therapeutic index of ADC drugs.

The present disclosure overcame the technical problems by providing camptothecin derivatives with increased anti-tumor activity and decreased toxicity, which can improve the safety and effectiveness of the ADC drugs with an excellent anti-tumor curative effect. Based on a comprehensive understanding of the structure-activity relationship between camptothecin derivatives and ADC drugs, the present disclosure designed and synthesized a series of camptothecin derivatives and their antibody conjugates with significantly improved antitumor therapeutic activity. The toxicity of selected derivatives was significantly reduced, and the antitumor activity was validated by the in vivo assays.

SUMMARY

The present application provides, among others, a camptothecin derivative and its conjugate or its tautomers, mesomers, racemates, enantiomers, diastereomers or mixtures thereof, or pharmaceutically acceptable salts or solvates thereof, wherein the antibody-drug conjugate comprises the antitumor camptothecin compound represented by formula D.

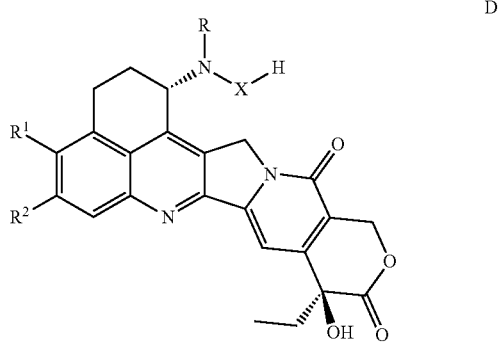

wherein:
R is selected from deuterium, $C_{1-6}$ alkyl, deuterated alkyl, substituted alkyl, aryl, substituted aryl or heteroaryl, or $C_{1-6}$ alkyl or substituted alkyl;
$R^1$ is selected from hydrogen, deuterium, halogen, alkyl, deuterated alkyl, haloalkyl, cycloalkyl, cycloalkylalkyl, alkoxyalkyl, carboxyl, carboxyl, heterocyclyl, aryl, substituted aryl or heteroaryl;
$R^2$ is selected from hydrogen, deuterium, halogen, alkyl, haloalkyl, deuterated alkyl, cycloalkyl, cycloalkylalkyl, alkoxyalkyl, carboxyl, carboxyl, heterocyclyl, aryl, substituted aryl or heteroaryl;
X is selected from —C(O)—$CR^aR^b$—O—$(CR^3R^4)_n$—, —C(O)—$CR^aR^b$—NH—$(CR^3R^4)_n$—, or —C(O)—$CR^aR^b$—$(CR^3R^4)_n$—S—;
$R^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

$R^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl; alternatively, $R^a$, $R^b$ together with the carbon atoms to which they are attached constitute $C_{3-6}$ cycloalkyl, cycloalkylalkyl or heterocyclyl;

$R^3$ and $R^4$ are the same or different, and are independently hydrogen, deuterium, halogen, alkyl, haloalkyl, deuterated alkyl, alkoxy, hydroxyl, amino, cyano, nitro, hydroxyalkyl, cycloalkyl, or heterocyclyl;

alternatively, $R^3$, $R^4$ together with the carbon atoms to which they are attached constitute $C_{3-6}$ cycloalkyl, cycloalkylalkyl or heterocyclyl;

n is selected from an integer from 0 to 4.

In some embodiments, the disclosure provides camptothecin derivatives or tautomers, mesomers, racemates, enantiomers, diastereomers or mixtures thereof, or a pharmaceutically acceptable salt or solvate thereof, comprising a compound represented by the general formula $D_1$ or a pharmaceutically acceptable salt or solvate thereof;

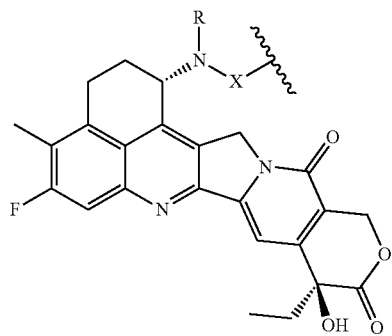

$D_1$ wherein:

R is selected from deuterium, $C_{1-6}$ alkyl or substituted alkyl, aryl, substituted aryl or heteroaryl;

X is selected from —C(O)—$CR^aR^b$—$(CR^3R^4)_n$—O—, —C(O)—$CR^aHR^b$—$(CR^3R^4)_n$—NH—, or —C(O)—$CR^aR^b$—$(CR^3R^4)_n$—S—;

$R^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

$R^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl; alternatively, $R^a$, $R^b$ together with the carbon atoms to which they are attached constitute $C_{3-6}$ cycloalkyl, cycloalkylalkyl or heterocyclyl;

$R^3$ and $R^4$ are the same or different, and are independently hydrogen, deuterium, a hydroxyl group, an amino group, a cyano group, a nitro group, a halogen, an alkyl group, a haloalkyl group, a deuterated alkyl group, an alkoxy group, a hydroxyalkyl group, a cycloalkyl or heterocyclyl;

or $R^3$, $R^4$ together with the carbon atoms to which they are attached constitute $C_{3-6}$cycloalkyl, cycloalkylalkyl or heterocyclyl;

n is selected from an integer from 0 to 4;

wherein, the wavy line in formula $D_1$ either represents a hydrogen or is covalently linked to a linker, or to an antibody that binds to an antigen expressed by a tumor target cell.

In some embodiments, the disclosure provides camptothecin derivatives or pharmaceutically acceptable salts or solvates thereof, wherein —X— is —C(O)—$CR^aR^b$—$(CR^3R^4)_n$—O— or —X— is —C(O)—$CR^aR^b$—$(CH_2)_n$—O—;

wherein:

$R^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

$R^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;

alternatively, $R^a$, $R^b$ together with the carbon atoms to which they are attached constitute $C_{3-6}$ cycloalkyl, cycloalkylalkyl or heterocyclyl;

$R^3$ and $R^4$ are the same or different, and are independently hydrogen, deuterium, halogen, alkyl, haloalkyl, deuterated alkyl, alkoxy, hydroxyl, amino, cyano, nitro, hydroxyalkyl, cycloalkyl or heterocyclyl;

or $R^3$, $R^4$ together with the carbon atoms to which they are attached constitute $C_{3-6}$ cycloalkyl, cycloalkylalkyl or heterocyclyl;

n is 0 or 1.

In some embodiments, the disclosure provides camptothecin derivatives or pharmaceutically acceptable salts or solvates thereof, wherein the O-terminus of the structural unit —X— is connected to the linker L, and the structural unit —X— is selected from, but not limited to:

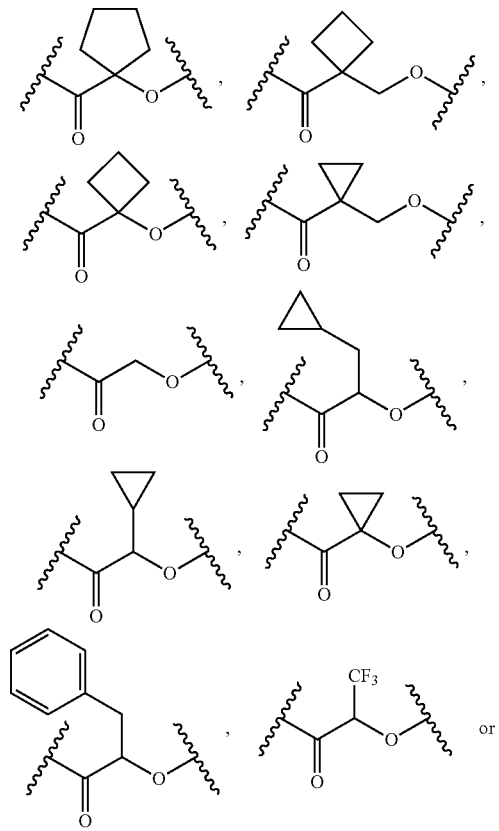

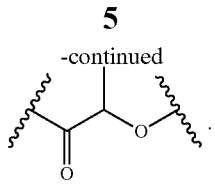

In one aspect, the disclosure provides a compound represented by general formula (D$_2$) or its tautomers, mesomers, racemates, enantiomers, diastereomers or in the form of a mixture thereof, or a pharmaceutically acceptable salt or solvate thereof,

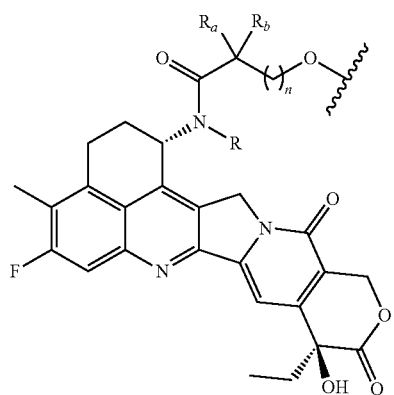

wherein:
R is selected from deuterium, C$_{1-6}$ alkyl or substituted alkyl, aryl, substituted aryl or heteroaryl, preferably C$_{1-6}$ alkyl or substituted alkyl;
R$^a$ is selected from cycloalkyl or cycloalkylalkyl, C$_{3-6}$ cycloalkylalkyl or C$_{3-6}$ cycloalkyl;
R$^b$ is selected from a hydrogen, a deuterium, an alkyl group, a haloalkyl group, a cycloalkyl group or a cycloalkylalkyl group, hydrogen or deuterium;
alternatively, R$^a$, R$^b$ together with the carbon atom to which they are attached constitute C$_{3-6}$ cycloalkyl, cycloalkylalkyl or heterocyclyl;
n is 0 or 1;
wherein, the wavy line in formula D$_2$ either represents a hydrogen or is covalently linked to a linker, or to an antibody that binds to an antigen expressed by a target cell.

In one preferred embodiment, the disclosure provides the compound represented by the general formula (D) or its tautomer, mesomer, racemate, enantiomer, diastereomer or its mixture form, or its pharmaceutically acceptable salt or solvate. In one embodiment, the compound may be represented by the general formula (D$_3$) or its tautomer, mesomer, racemate, enantiomer, diastereomer or mixture thereof, or a pharmaceutically acceptable salt or solvate thereof:

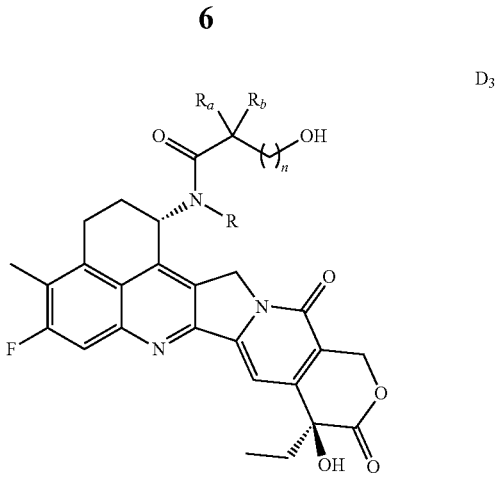

wherein:
R is selected from deuterium, C$_{1-6}$ alkyl or substituted alkyl, aryl, substituted aryl or heteroaryl;
R$^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; preferably C$_3$ cycloalkylalkyl or C$_3$ cycloalkyl;
R$^b$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; preferably C$_3$ cycloalkylalkyl or C$_3$ cycloalkyl;
alternatively, R$^a$, R$^b$ together with the carbon atom to which they are attached constitute C$_{3-6}$ cycloalkyl, cycloalkylalkyl or heterocyclyl;
n is 0 or 1.

Example compound shown in the general formula (D) includes but is not limited to:

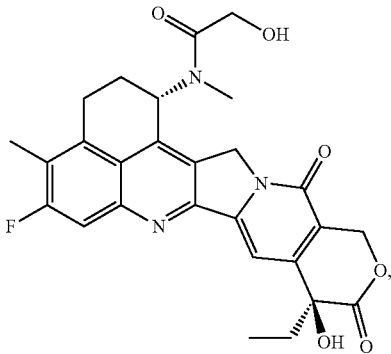

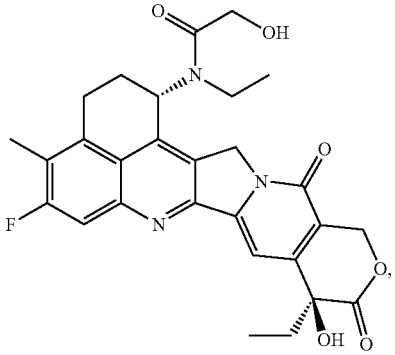

7
-continued
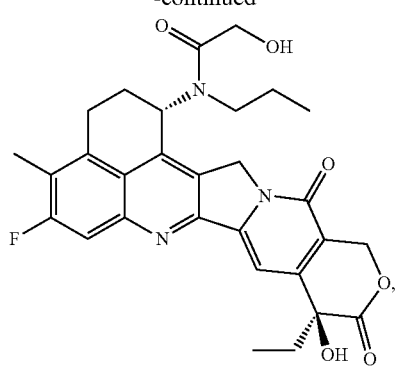
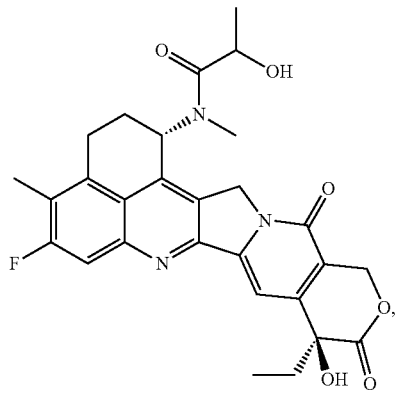
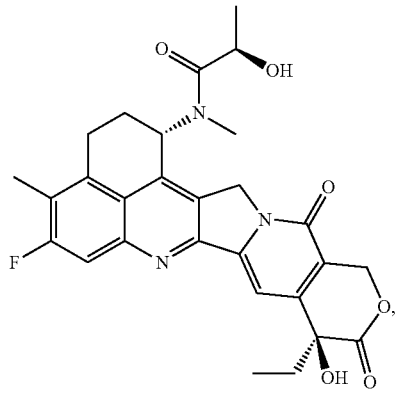
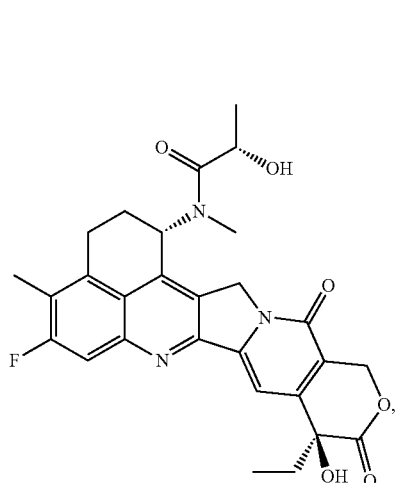
8
-continued
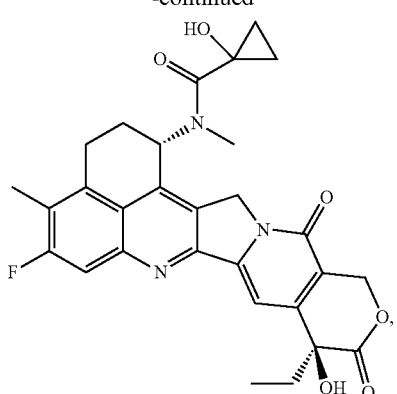
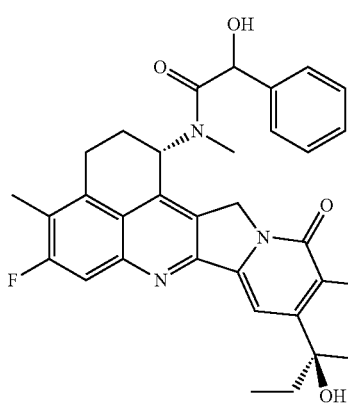
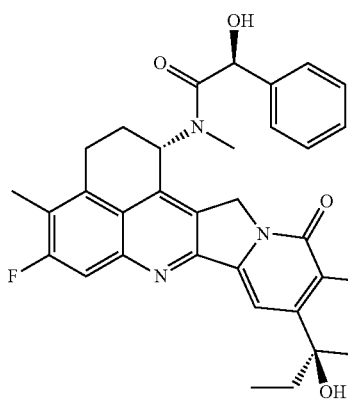
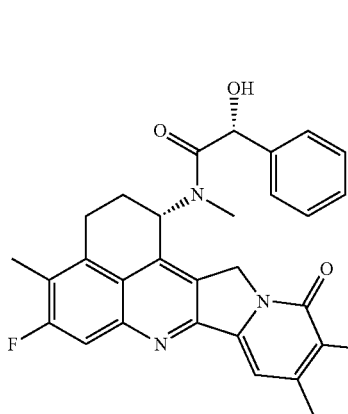

-continued

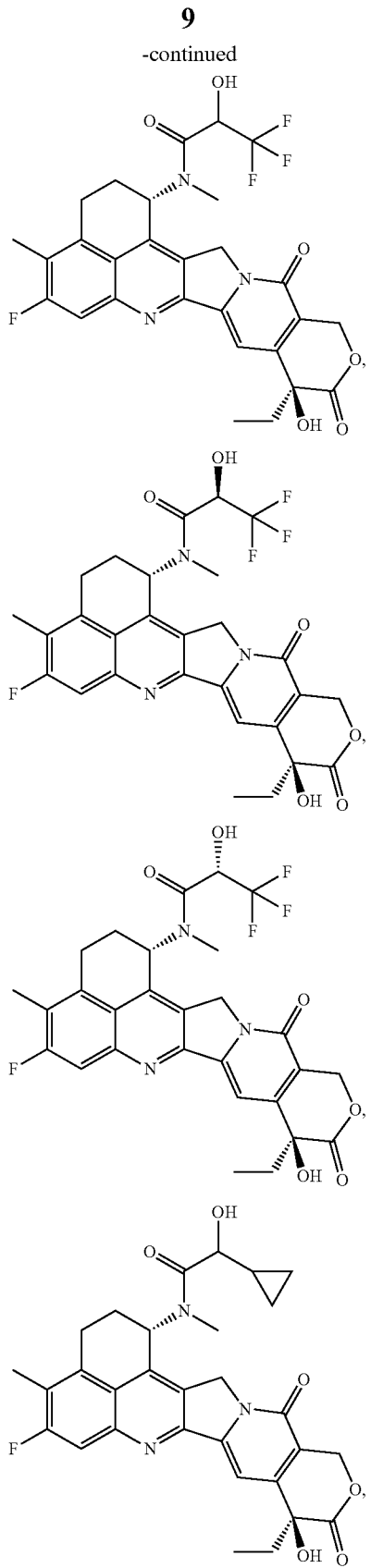

-continued

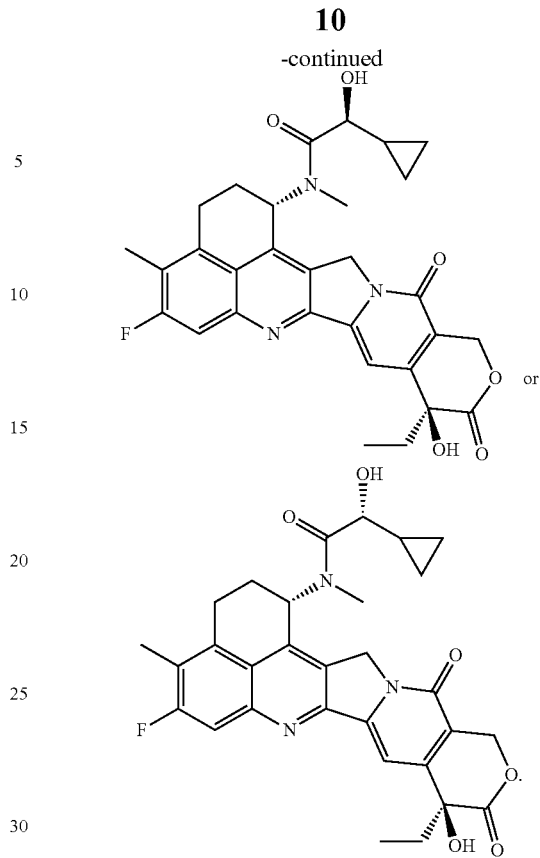

or a tautomer, mesomer, racemate, enantiomer, diastereomer, a mixture thereof, or a pharmaceutically acceptable salt or solvate thereof; including any anti-tumor drugs derived from the camptothecin derivatives disclosed herein, or their pharmaceutical preparations, used for treating solid tumors or hematological malignancies, such as lung cancer, kidney cancer, urethral cancer, colon cancer, rectal cancer, prostate cancer, glioblastoma multiforme, ovarian cancer, pancreatic cancer, breast cancer, melanoma, liver, bladder, stomach, lung, or esophagus.

In one embodiment, the disclosure provides the antibody-drug conjugate or a pharmaceutically acceptable salt or solvate thereof, wherein the linker -L- may be $-L_1-L_2-L_3-L_4-$, the $L_1$ end is connected to the antibody, and the $L_4$ end is connected to X; wherein, $L_1$ is selected from, but not limited to: —Y—C(O)—, —$CH_2$—C(O)—$NR^5$—Y—C(O)— or —C(O)—Y—C(O)—, wherein Y comprises $C_{1-8}$ alkyl, $C_{1-8}$ alkyl-cycloalkyl, or straight-chain or straight-chain-cyclic heteroalkyl of 1-8 atoms, wherein the heteroalkyl contains 1-3 atoms including N, O, or S; the $C_{1-8}$ alkyl, cycloalkyl, straight-chain or straight-chain cyclic heteroalkyl are independently substituted with one or more substituents of deuterium, halogen, hydroxyl, cyano, nitro, amino, alkyl, heteroalkyl, substituted alkyl, carboxyl, alkoxy or cycloalkyl.

In some embodiments, the disclosure provides the antibody-drug conjugate or a pharmaceutically acceptable salt or solvate thereof, wherein the linker $L_1$ is selected from, but is not limited to: -(succinimid-3-yl-N-)—$(CH2)_oC(O)$—, -(succinimide-3-yl-N)—$CH_2$-cyclohexyl-C(O)—, -(succinimide-3-yl-N-)—$(CH_2CH_2O)_oC(O)$—, —CH2-C(O)—$NR^5$—$(CH_2)_oC(O)$— or —C(O)—$(CH_2)_oC(O)$—, wherein o is selected from an integer of 2-8. In one embodiment, o is 5;

$L_2$ is selected from —NR$^6$(CH$_2$CH$_2$O)$_p$CH$_2$CH$_2$C(O)—, —NR$^6$(CH$_2$CH$_2$O)$_p$CH$_2$C(O)—, —S(CH$_2$)$_p$C(O)— or a chemical bond, wherein p is selected from an integer of 0-20;

In some embodiments, the antibody-drug conjugates or pharmaceutically acceptable salts or solvates comprises a linker unit $L_2$, selected from —NR$^6$(CH$_2$CH$_2$O)$_p$CH$_2$C(O)— or a chemical bond, wherein p is selected from an Integer from 0-12.

$L_3$ may comprise peptide residues consisting of 2-7 amino acids, wherein the amino acid may optionally be further substituted with deuterium, halogen, hydroxyl, cyano, amino, nitro, alkyl, substituted alkyl, alkoxy, or cycloalkyl with one or more substitutions.

In some embodiments, the disclosure provides an antibody-drug conjugate or a pharmaceutically acceptable salt or solvate thereof, wherein the peptide residue of $L_3$ is selected from one, two or more amino acids selected from phenylalanine (F), glycine (G), valine (V), lysine (K), citrulline, serine (S), glutamic acid (E) or aspartic acid (D). In one embodiment, the peptide reside of $L_3$ comprises 1, 2 or more amino acid residues selected from phenylalanine and glycine. In one embodiment, the peptide reside of $L_3$ comprises a tetrapeptide residue. In one embodiment, the tetrapeptide residue comprises GGFG (glycine-glycine-phenylalanine-glycine).

$L_4$ is selected from —NR$^7$(CR$^8$R$^9$)$_q$—, —C(O)NR$^7$, —C(O)NR$^7$(CH$_2$)$_q$— or chemical bond, wherein q is selected from an integer of 0-6. In one embodiment, $L_4$ is —NR$^7$(CR$^8$R$^9$)$_q$—.

R$^5$, R$^6$ and R$^7$ are the same or different, and are each independently hydrogen, deuterium, halogen, alkyl, deuterated alkyl, haloalkyl, cycloalkyl, cycloalkylalkyl, alkoxyalkyl, heteroalkyl cyclic, aryl, substituted aryl or heteroaryl.

R$^8$ and R$^9$ are the same or different, and each is independently hydrogen, deuterium, halogen, an alkyl group, a deuterated alkyl group, a haloalkyl group, a cycloalkyl group, a cycloalkylalkyl group, an alkoxyalkyl group, a heterocyclic group, aryl, substituted aryl or heteroaryl.

In other embodiments, the disclosure provides antibody-drug conjugate or a pharmaceutically acceptable salt or solvate thereof, wherein $L_4$ is selected from —NR$^7$(CR$^8$R$^9$)$_q$—, R$^7$ is selected from hydrogen, deuterium or an alkyl group, R$^8$ and R$^9$ are the same or different, and each is independently hydrogen, deuterium or an alkyl group, and q is 1 or 2. In one embodiment, $L_4$ is —NR$^7$(CR$^8$R$^9$)$_q$—. In one embodiment, $L_4$ is —NHCH$_2$—.

In one embodiment, the disclosure provides the drug-linker compound represented by the general formula (L-X-D$_2$) or its tautomer, mesomer, racemate, enantiomer, diastereomer or a mixture thereof, or a pharmaceutically acceptable salt or solvate thereof. In one embodiment, the compound is represented by the general formula (La—X-D$_2$) or a pharmaceutically acceptable salt or solvate thereof:

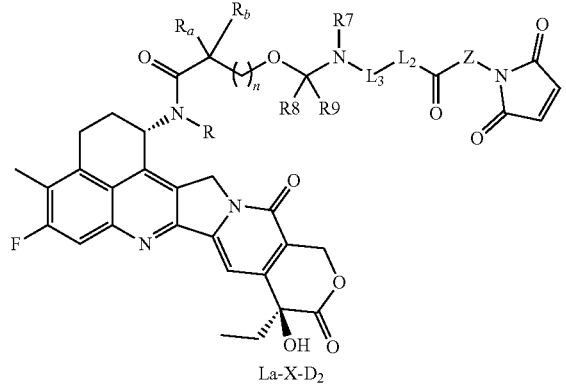

La-X-D$_2$ wherein:
Z is selected from, but is not limited to —Y—C(O)—, —CH$_2$—C(O)—NR$^6$—Y—C(O)— or —C(O)—Y—C(O)—, wherein Y is C$_{1-8}$ alkyl, C$_{1-8}$ alkyl-cycloalkyl, linear or linear-cyclic heteroalkyl of 1-8 atoms, the heteroalkyl containing 1-3 atoms selected from N, O or S, the C$_{1-8}$ alkyl, cycloalkyl, straight-chain or straight-chain cyclic heteroalkyl optionally and independently substituted with one or more substituents selected from deuterium, halogen, hydroxyl, carboxyl, cyano, nitro, amino, alkyl, heteroalkyl, substituted alkyl, carboxyl, alkoxy or cycloalkyl;

$L_2$ is selected from —NR$^6$(CH$_2$CH$_2$O)$_p$CH$_2$CH$_2$C(O)—, —NR$^6$(CH$_2$CH$_2$O)$_p$CH$_2$C(O)—, —S(CH$_2$)$_p$C(O)— or chemical bond, wherein p is an integer of 0-20, or a chemical bond;

$L_3$ is selected from peptide residues consisting of 2-7 amino acids, wherein amino acids may be optionally substituted with one or more substituents selected from deuterium, halogen, hydroxyl, cyano, amino, nitro, alkyl, substituted alkyl, alkoxy and cycloalkane or cycloalkyl;

R is selected from deuterium, C$_{1-6}$ alkyl or substituted alkyl, aryl, substituted aryl or heteroaryl;

R$^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

R$^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;

alternatively, R$^a$, R$^b$ together with the carbon atom to which they are attached constitute C$_{3-6}$ cycloalkyl, cycloalkylalkyl or heterocyclyl;

R$^5$, R$^6$ and R$^7$ are the same or different, and are each independently selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

R$^8$ and R$^9$ are the same or different, and each independently selected from hydrogen, deuterium, halogen, alkyl, deuterated alkyl, haloalkyl, cycloalkyl, cycloalkylalkyl, alkoxyalkyl, heteroaryl, aryl, substituted aryl, or heteroaryl.

n is an integer from 0 to 4. In one embodiment, n is 0 or 1. In one embodiment, n is 0.

One embodiment of the present disclosure provides the drug-linker compound represented by the general formula (L-X-D$_2$) or its tautomer, mesomer, racemate, enantiomer, diastereomer or a mixture thereof, or a pharmaceutically acceptable salt or solvate thereof. In one embodiment, the compound may be represented by the general formula (L$_b$-X-D$_2$) or a pharmaceutically acceptable salt or solvate thereof:

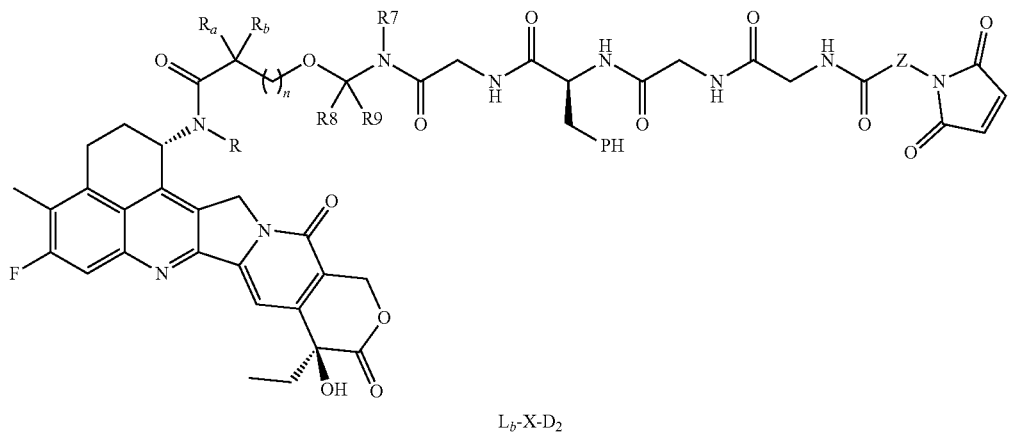

$L_b$-X-$D_2$ wherein:
Z is selected from, but is not limited to —Y—C(O)—, —CH$_2$—C(O)—NR$^6$—Y—C(O)— or —C(O)—Y—C(O)—, wherein Y is selected from C$_{1-8}$ alkyl, C$_{1-8}$ alkyl-cycloalkyl or linear or linear-cyclic heteroalkyl having 1-8 atoms, the heteroalkyl containing 1-3 atoms selected from N, O or S, the C$_{1-8}$ alkyl, cycloalkyl, straight-chain or straight-chain cyclic heteroalkyl with one or more substitution independently selected from deuterium, halogen, hydroxyl, carboxyl, cyano, nitro, amino, alkane substituted with one or more substituents of a radical, heteroalkyl, substituted alkyl, carboxyl, alkoxy or cycloalkyl;

R is selected from deuterium, C$_{1-6}$ alkyl or substituted alkyl, aryl, substituted aryl or heteroaryl;

R$^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

R$^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl; alternatively, R$^a$, R$^b$ together with the carbon atom to which they are attached constitute C$_{3-6}$ cycloalkyl, cycloalkylalkyl or heterocyclyl;

R$^7$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or hetero aryl;

R$^8$ and R$^9$ are the same or different, and each is independently hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; and n is an integer from 0 to 4. In one embodiment, n is 0 or 1. In one embodiment, n is 0.

In some embodiments, the disclosure provides antibody-drug conjugates or tautomers, mesomers, racemates, enantiomers, diastereomers or mixtures thereof are provided, or a pharmaceutically acceptable salt or solvate thereof. In one embodiment, the antibody-drug conjugate may be represented by the general formula (L-X-Dr) or a pharmaceutically acceptable salt or solvate thereof, selected from, but not limited to:

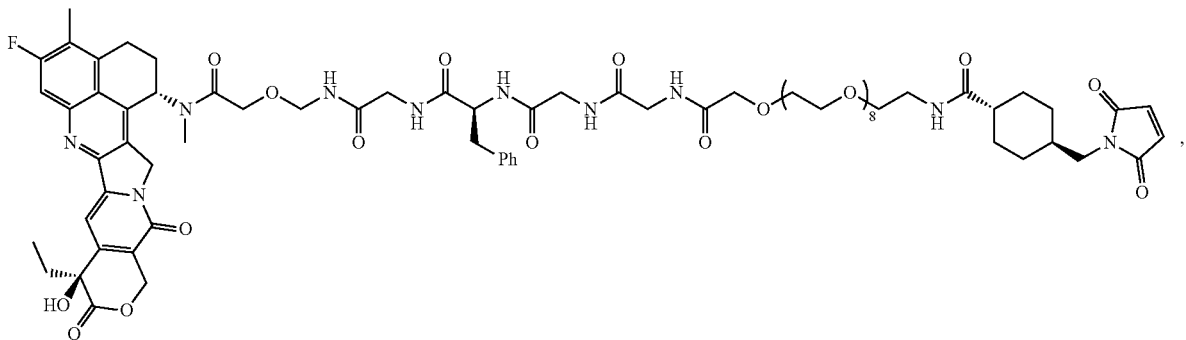

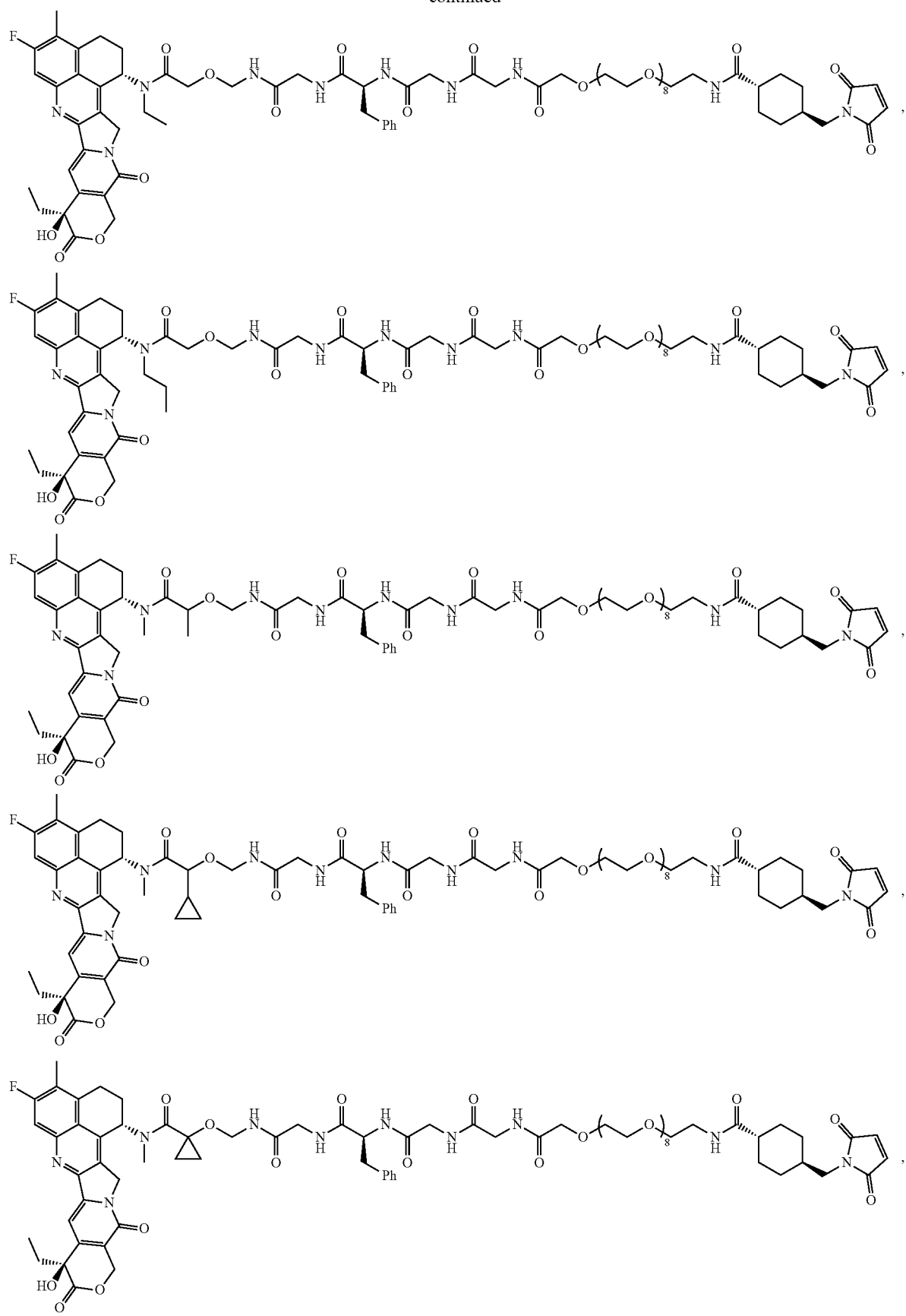

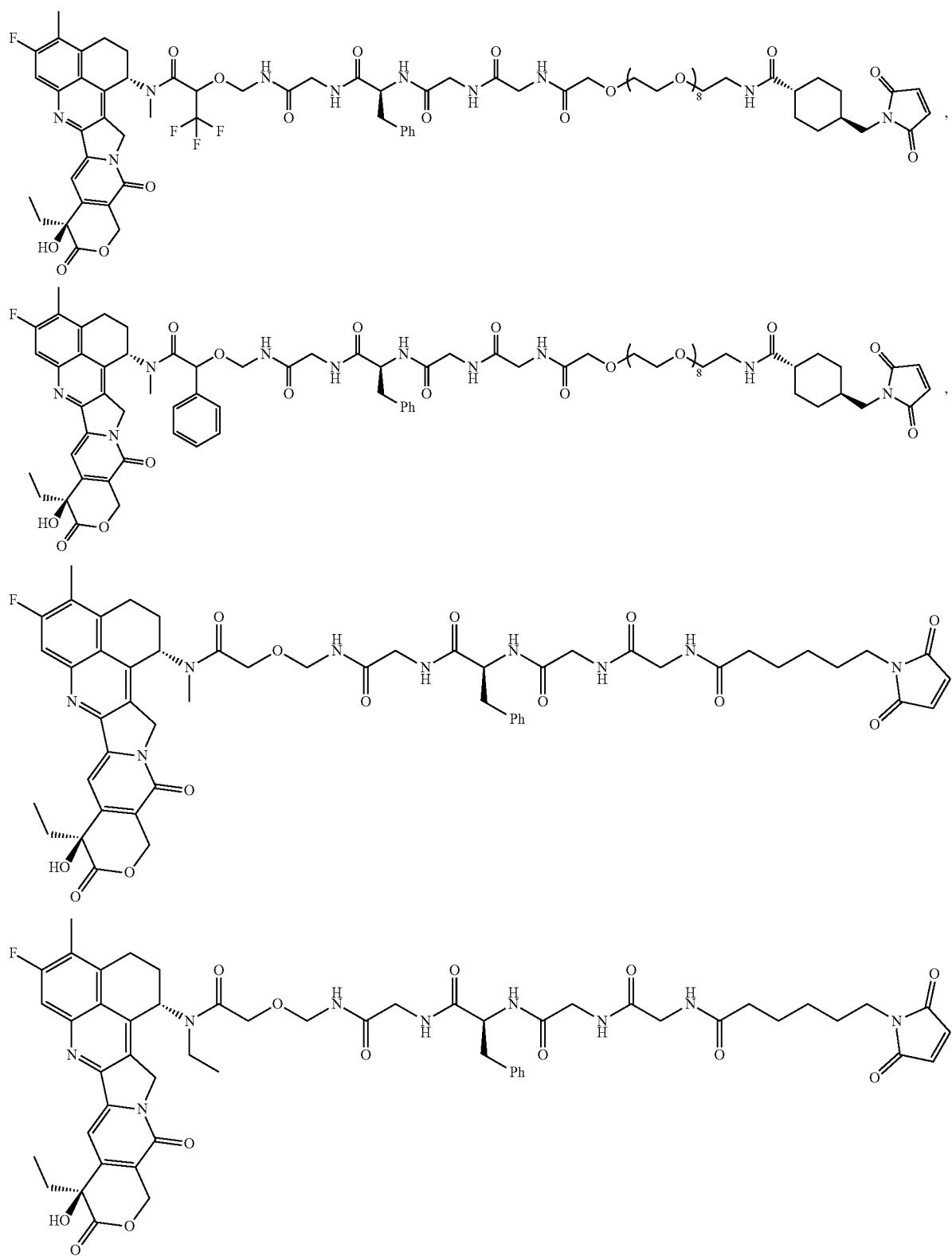

-continued
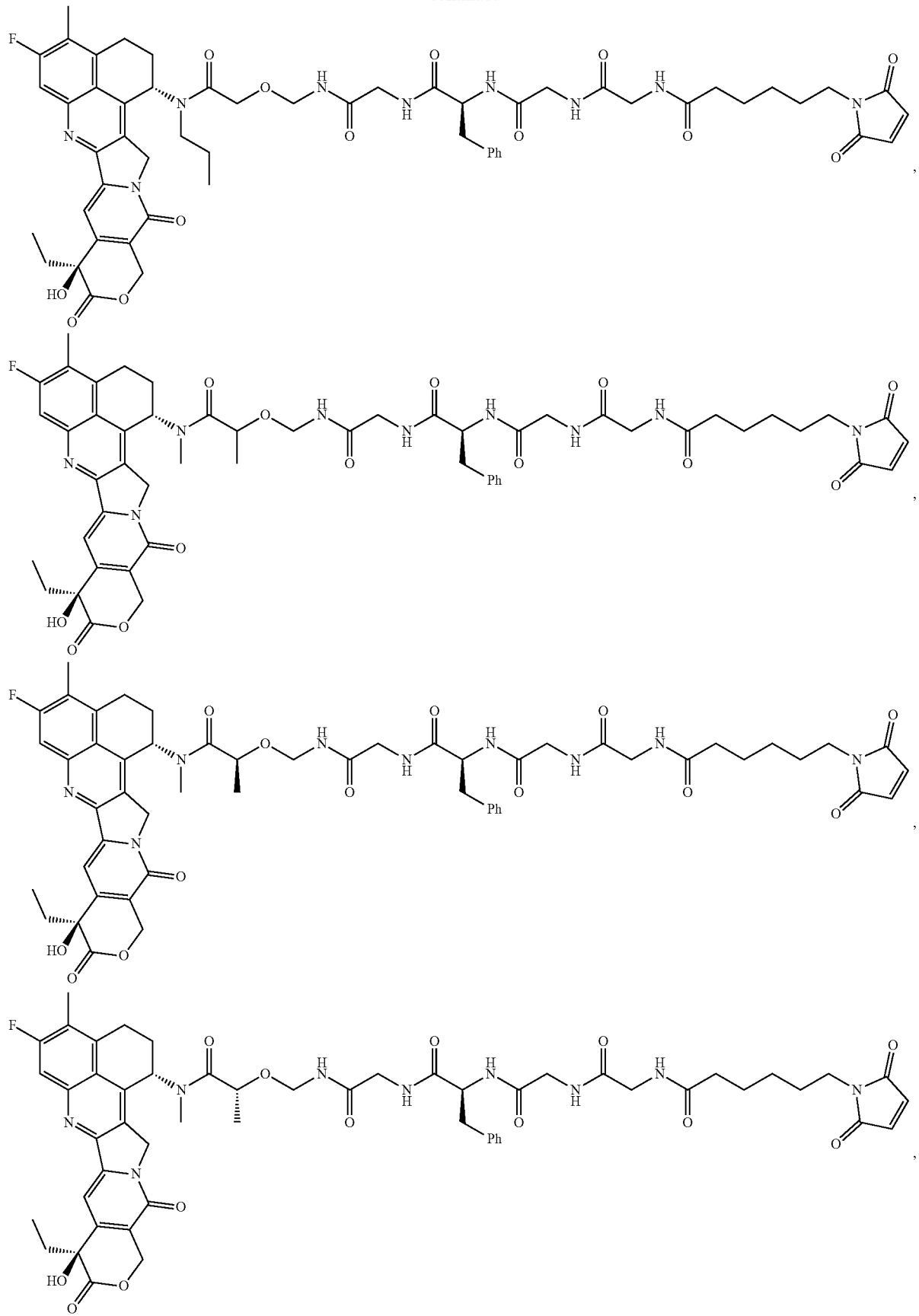

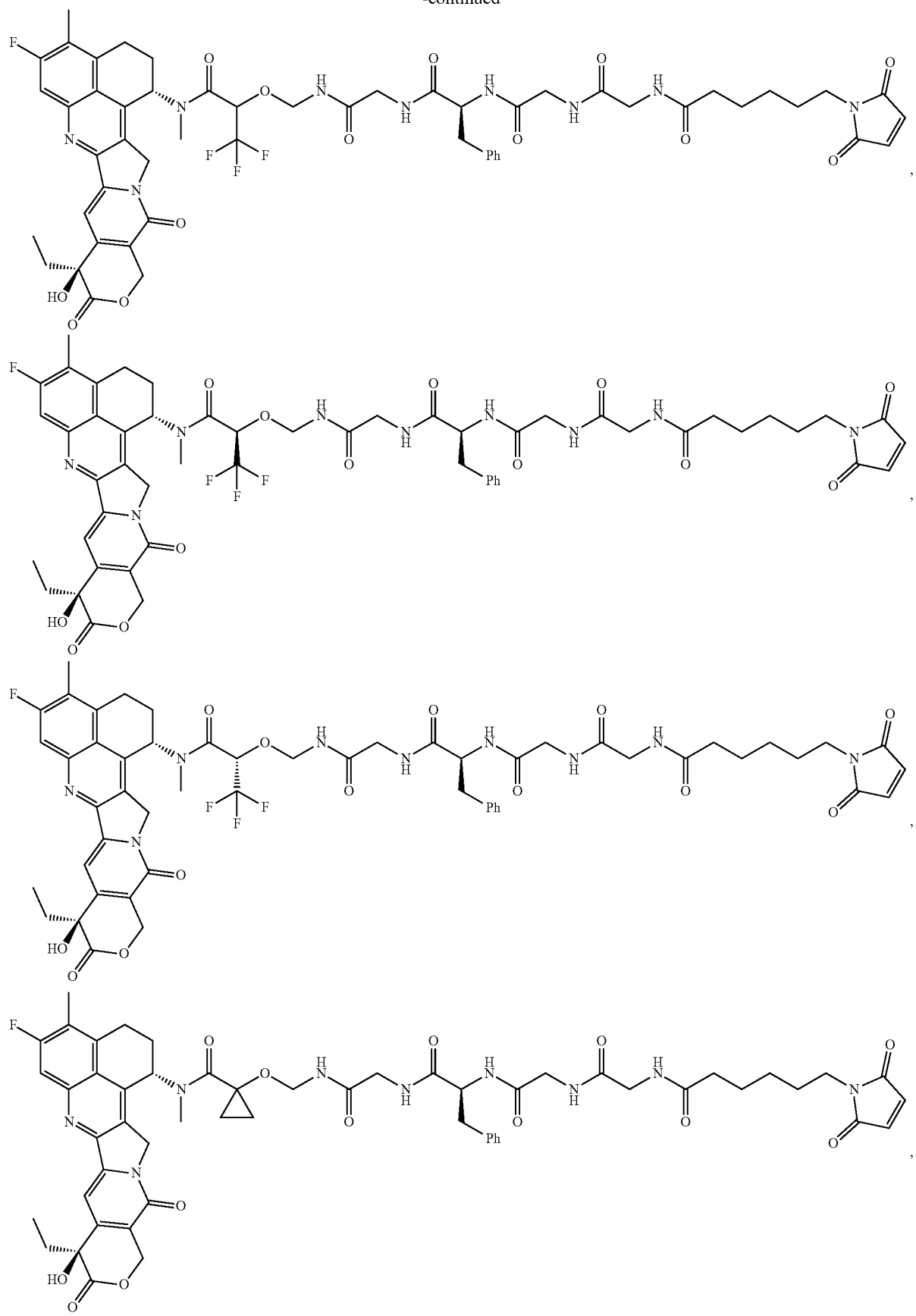

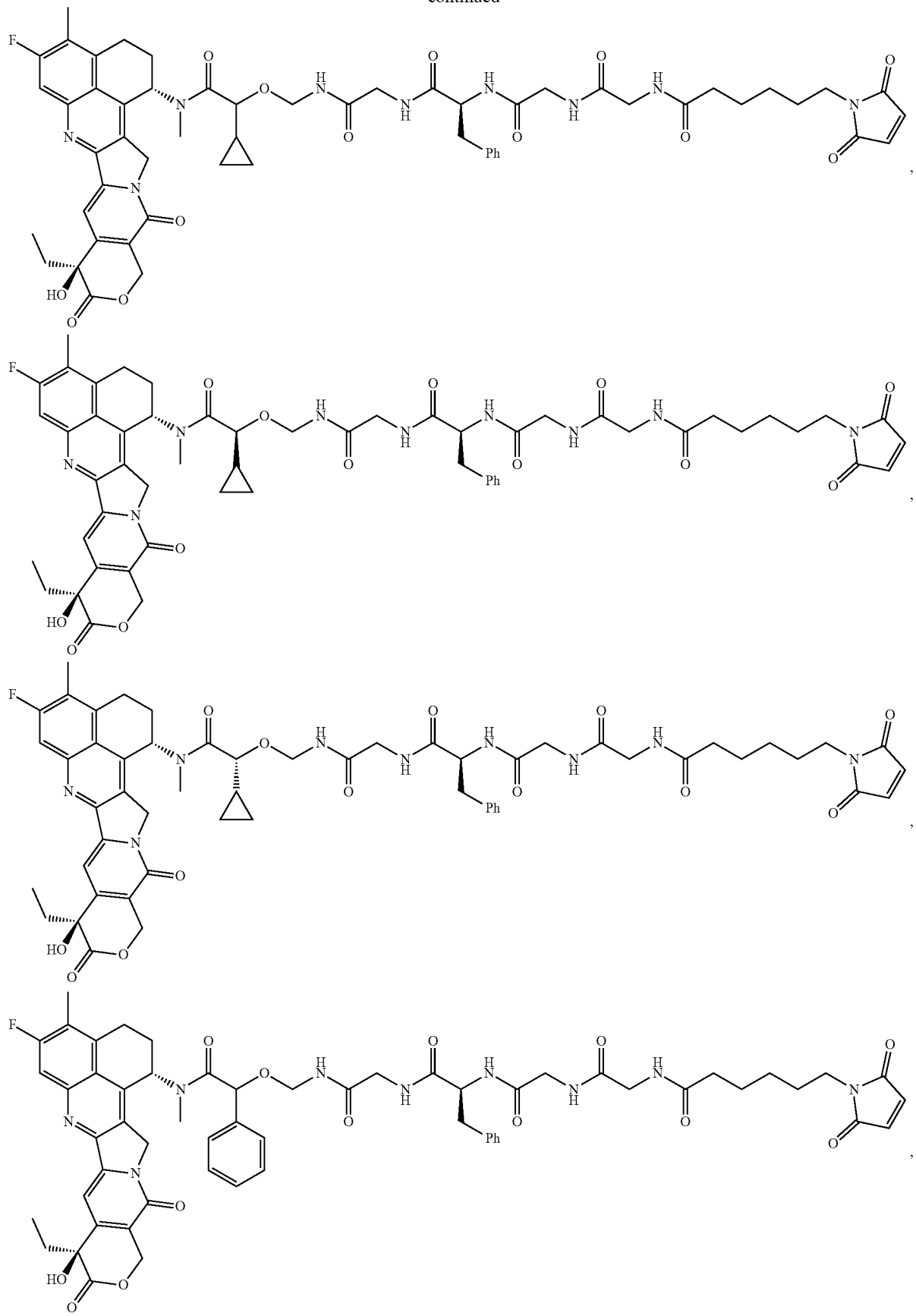

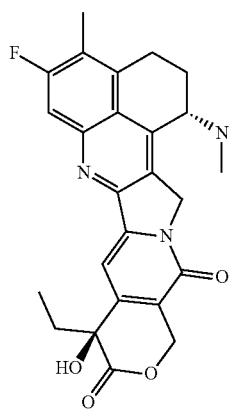
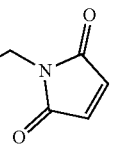

or

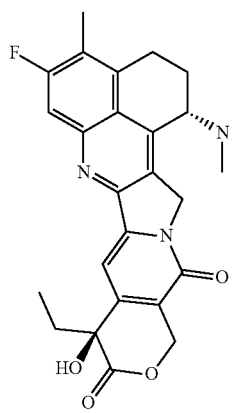

.

In some embodiments, the disclosure provides antibody-drug conjugates or tautomers, mesomers, racemates, enantiomers, diastereomers or mixtures, or a pharmaceutically acceptable salt or solvate thereof. In one embodiment, the antibody-drug conjugate may be represented by the general formula (Ab-L-X-Dr) or a pharmaceutically acceptable salt or solvate thereof:

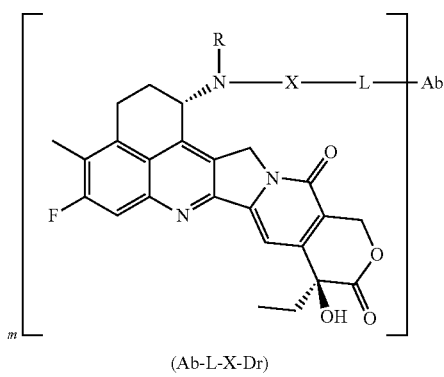

(Ab-L-X-Dr)

wherein:

R is selected from deuterium, $C_{1-6}$ alkyl or substituted alkyl, aryl, substituted aryl or heteroaryl;

X is selected from —C(O)—$CR^aR^b$—O—$(CR^3R^4)_n$—, —C(O)—$CR^aR^b$—NH—$(CR^3R^4)_n$— or —C(O)—$CR^aR^b$—$(CR^3R^4)_n$—S—;

$R^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

$R^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;

alternatively, $R^a$, $R^b$ together with the carbon atom to which they are attached constitute $C_{3-6}$ cycloalkyl, cycloalkylalkyl or heterocyclyl;

$R^3$ and $R^4$ are the same or different, and are independently hydrogen, deuterium, halogen, alkyl, haloalkyl, deuterated alkyl, alkoxy, hydroxyl, amino, cyano, nitro, hydroxyalkyl, cycloalkyl or heterocyclyl;

or $R^3$, $R^4$ together with the carbon atoms to which they are attached constitute $C_{3-6}$ cycloalkyl, cycloalkylalkyl or heterocyclyl;

n is an integer from 0 to 4;

m is an integer or decimal from 1 to 10;

Ab is an antibody, antibody fragment or protein;

L is the linker.

In other embodiments, the disclosure provides antibody-drug conjugate or a pharmaceutically acceptable salt or solvate thereof. In one embodiment, the antibody-drug conjugate may be represented by the general formula (Ab-L-X-$D_2$) or a pharmaceutically acceptable salt or solvate thereof:

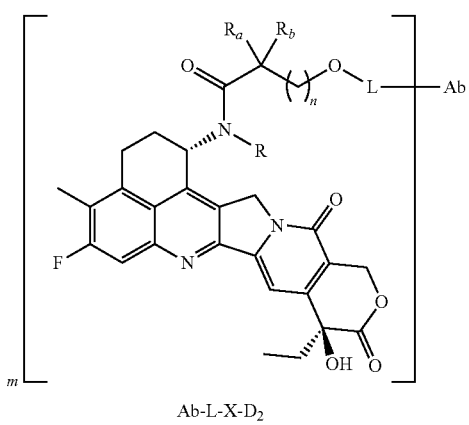

Ab-L-X-D$_2$ wherein:
R is selected from deuterium, C$_{1-6}$ alkyl or substituted alkyl, aryl, substituted aryl or heteroaryl;
R$^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; In one embodiment, R$^a$ is C$_{3-6}$ cycloalkylalkyl or C$_{3-6}$ cycloalkyl;
R$^b$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; In one embodiment, R$^b$ is C$_{3-6}$ cycloalkylalkyl or C$_{3-6}$ cycloalkyl;
alternatively, R$^a$, R$^b$ together with the carbon atom to which they are attached constitute C$_{3-6}$ cycloalkyl, cycloalkylalkyl or heterocyclyl;
n is 0 or 1;
m is an integer or a decimal from 1 to 10. In one embodiment, n is an integer or a decimal from 2 to 8. In one embodiment, n is an integer or a decimal from 3 to 8;
Ab is an antibody; and
L is a linker.

In other embodiments, the disclosure provides antibody-drug conjugates represented by the general formula (Ab-L-X-Dr) or a pharmaceutically acceptable salt or solvate thereof. In one embodiment, the conjugates may have the general formula (Ab-L$_a$-X-D$_2$) or a pharmaceutically acceptable salt or solvate thereof:

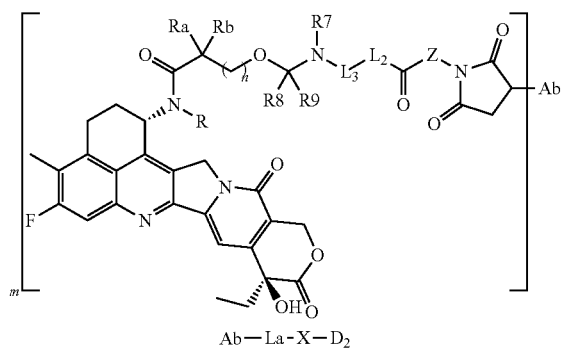

Ab—La—X—D$_2$ wherein:
Z is selected from, but not limited to —Y—C(O)—, —CH$_2$—C(O)—NR$^6$—Y—C(O)— or —C(O)—Y—C(O)—, wherein Y, is selected from C$_{1-8}$ alkyl, C$_{1-8}$ alkyl-cycloalkyl, or linear or linear-cyclic heteroalkyl of 1-8 atoms comprising 1-3 atoms selected from N, O or S, wherein the C$_{1-8}$ alkyl, cycloalkyl, straight-chain or straight-chain cyclic heteroalkyl independently substituted with one or more substituents selected from deuterium, halogen, hydroxyl, carboxyl, cyano, nitro, amino, alkyl, heteroalkyl, substituted alkyl, carboxyl, alkoxy or cycloalkyl;

L$_2$ comprises —NR$^6$(CH$_2$CH$_2$O)$_p$CH$_2$CH$_2$C(O)—, —NR$^6$(CH$_2$CH$_2$O)$_p$CH$_2$C(O)—, —S(CH$_2$)$_p$C(O)— or a chemical bond, wherein p is an integer from 0-20. In one embodiment, L$_2$ is a chemical bond;

L$_3$ comprises peptide residues having 2-7 amino acids, wherein amino acids may be further substituted with one or more substituents selected from deuterium, halogen, hydroxyl, cyano, amino, nitro, alkyl, substituted alkyl, alkoxy, cycloalkyl or substituted cycloalkyl;

R is selected from deuterium, C$_{1-6}$ alkyl or substituted alkyl, aryl, substituted aryl or heteroaryl;

R$^a$ is selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

R$^b$ is selected from hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;

alternatively, R$^a$, R$^b$ together with the carbon atom to which they are attached constitute C$_{3-6}$ cycloalkyl, cycloalkylalkyl or heterocyclyl;

R$^3$ and R$^4$ are the same or different, and is each independently hydrogen, deuterium, halogen, alkyl, haloalkyl, deuterated alkyl, alkoxy, hydroxyl, amino, cyano, nitro, hydroxyalkyl, cycloalkyl or heterocyclyl;

or R$^3$, R$^4$ together with the carbon atom to which they are attached constitute C$_{3-6}$ cycloalkyl or heterocyclyl;

R$^5$, R$^6$ and R$^7$ are the same or different, and is each independently is hydrogen, deuterium, halogen, alkyl, deuterated alkyl, haloalkyl, cycloalkyl, cycloalkylalkyl, alkoxyalkyl, heteroaryl, aryl, substituted aryl or heteroaryl;

R$^8$ and R$^9$ are the same or different, and is each independently hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl.

n is an integer from 0 to 4. In one embodiment, n is 0 or 1. In one embodiment, n is 0;

m is selected from 1-10, which can be an integer or a decimal; and

Ab is an antibody, antibody fragment or protein.

In other embodiments, the antibody-drug conjugate may be represented by the general formula (Ab-L-X-Dr) or a pharmaceutically acceptable salt or solvate thereof, wherein the conjugates may have the general formula (Ab-L$_b$-X-D$_2$) or a pharmaceutically acceptable salt or solvate thereof:

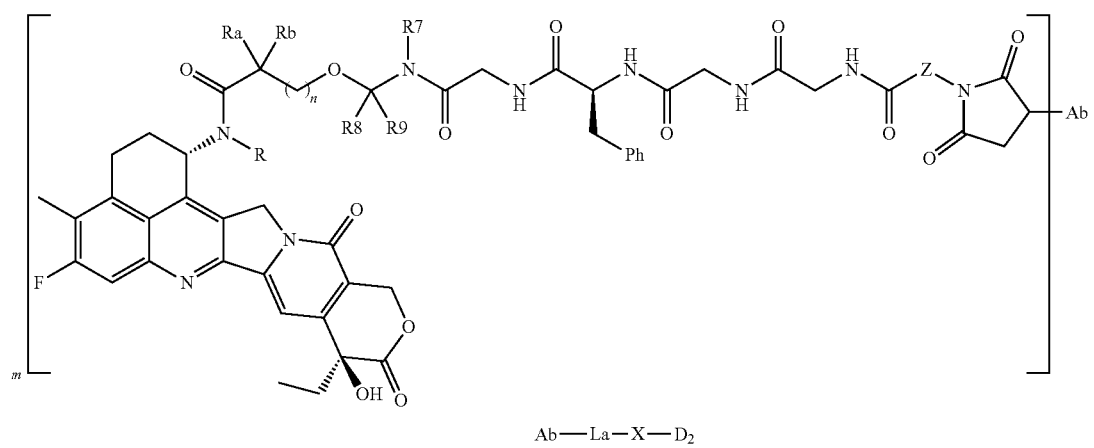
Ab—La—X—D₂
wherein:
Ab, $R^a$, $R^b$, $R^7$-$R^9$, Z, m and n are as described in the general formula (Ab-La—X-Dr).
The antibody-drug conjugate represented by the general formula (Ab-L-X-Dr) may comprise the following structures:
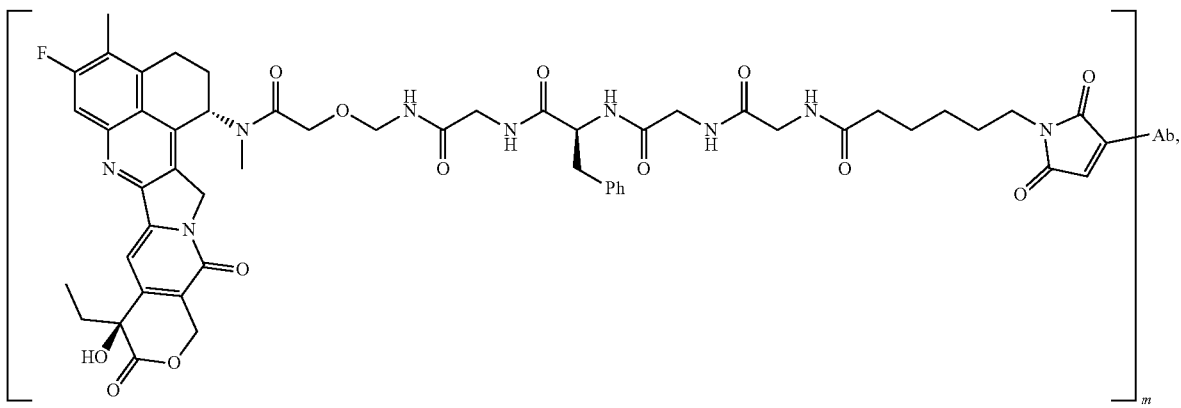
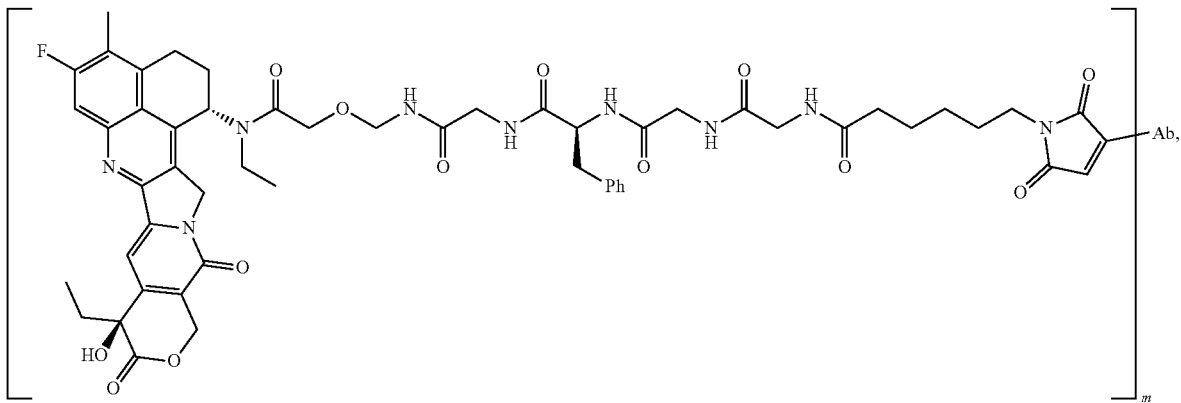

-continued
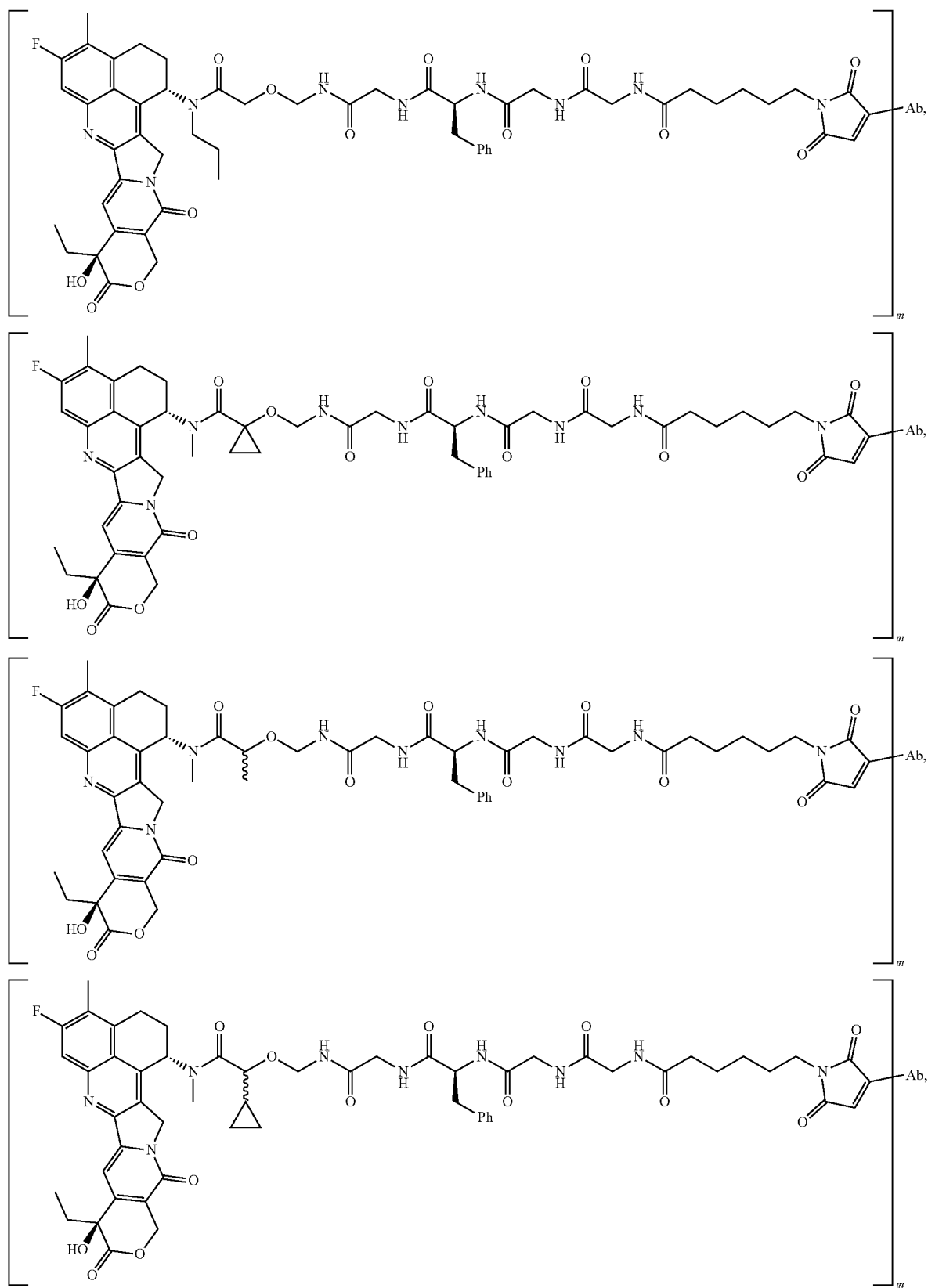

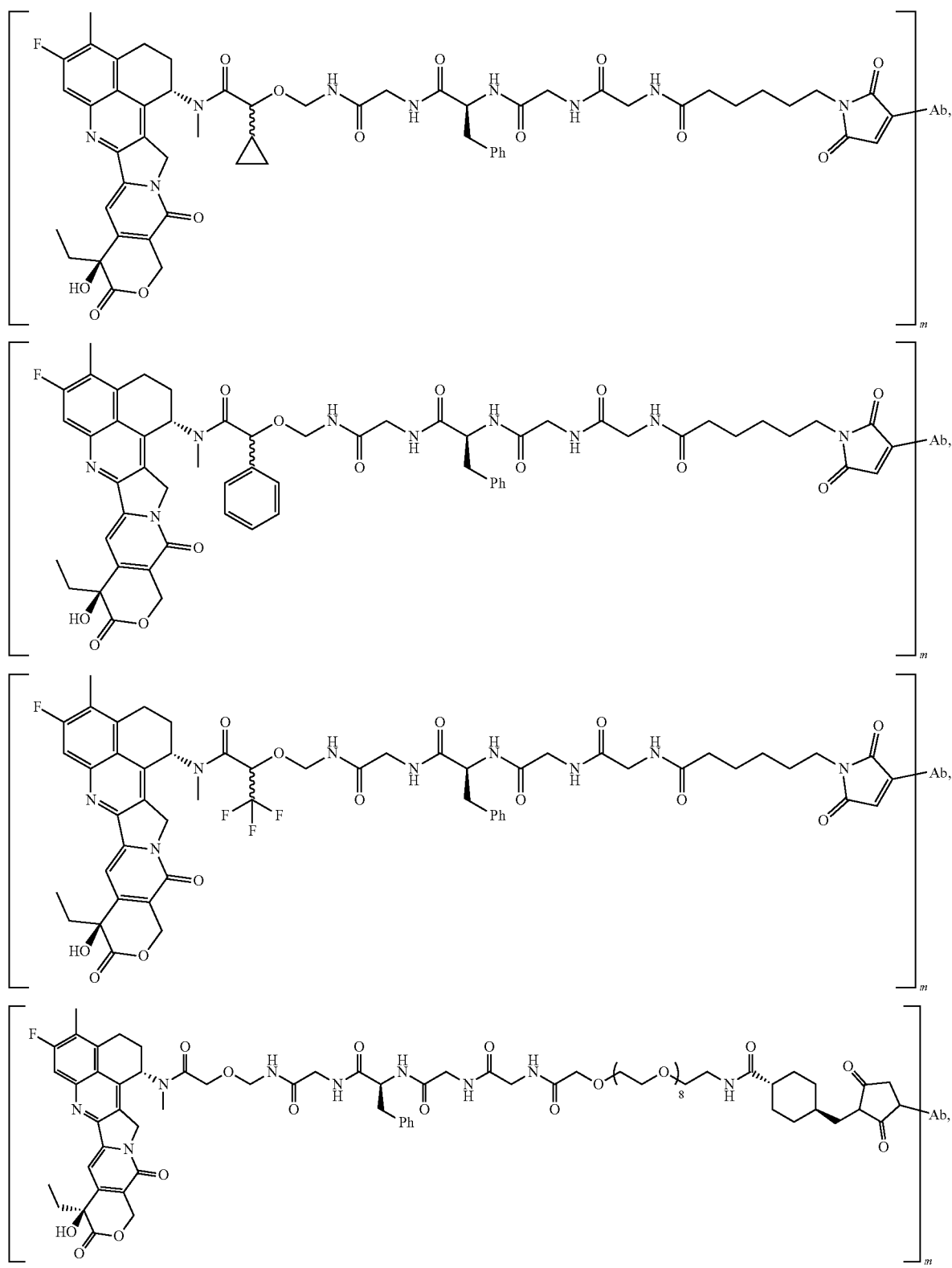

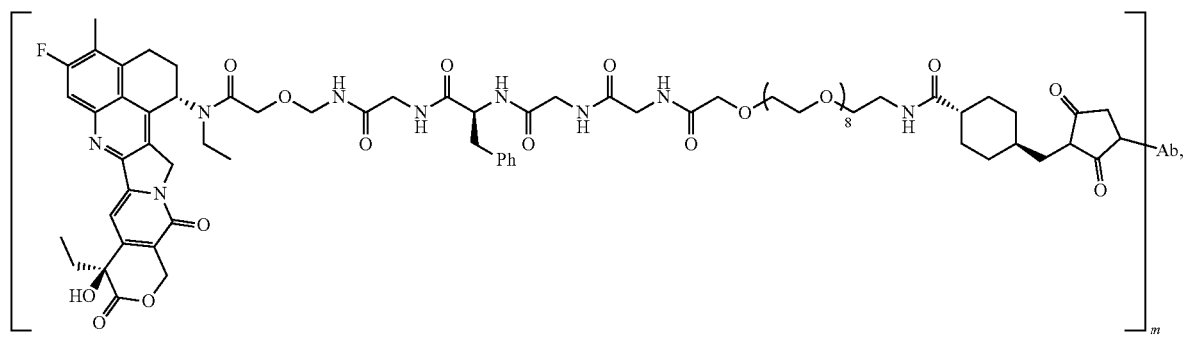
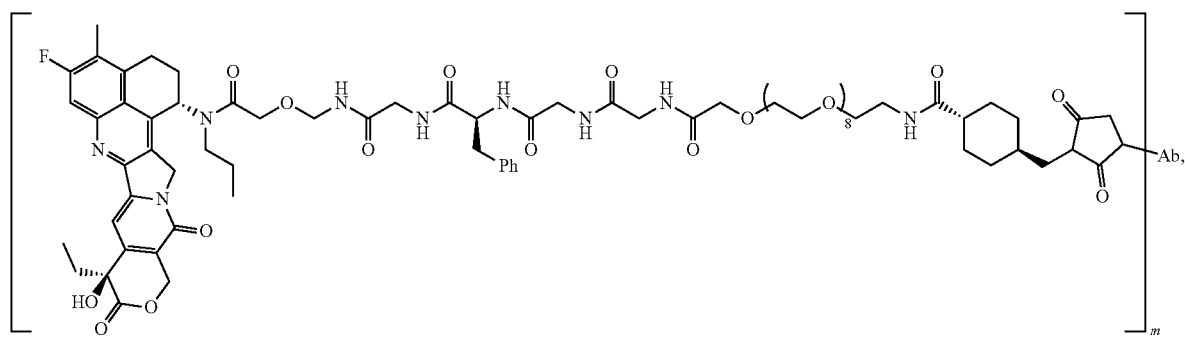
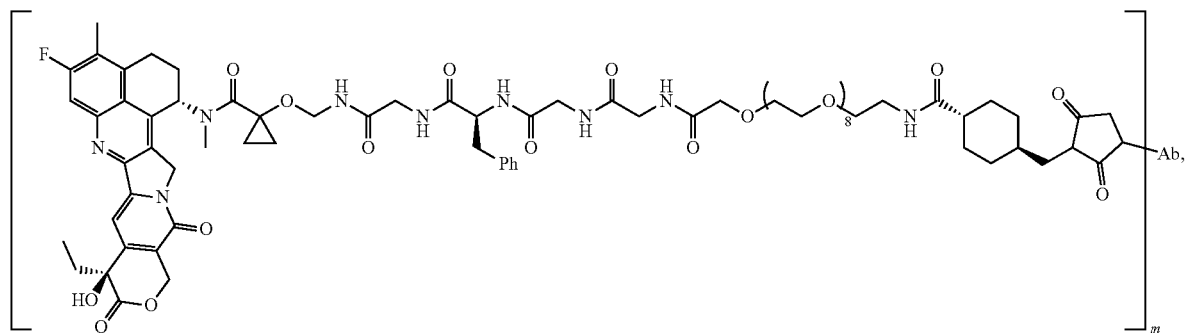
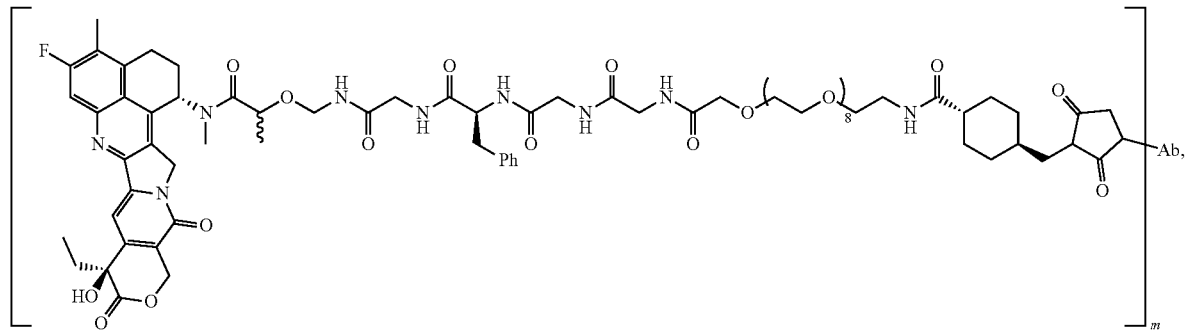

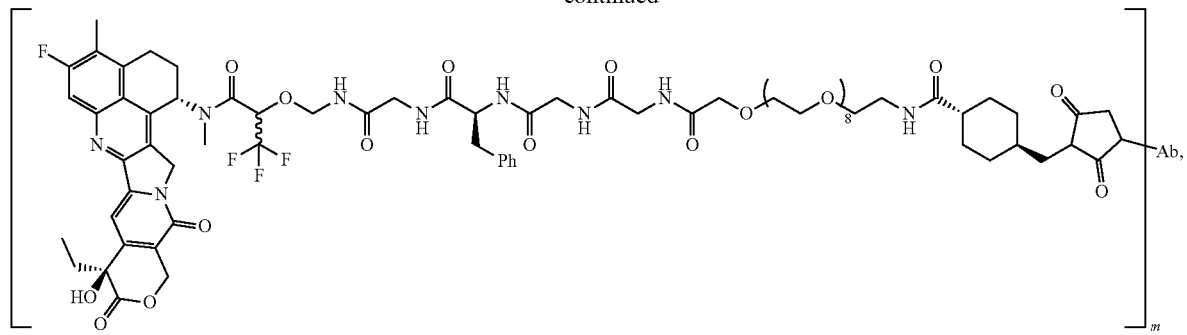

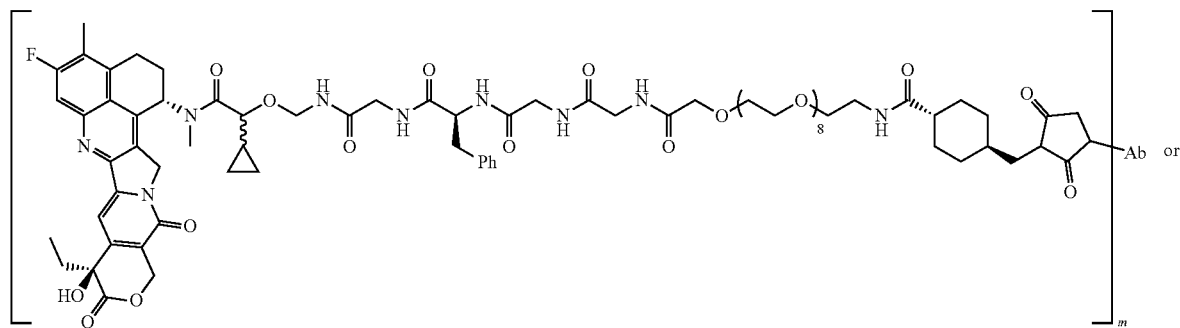

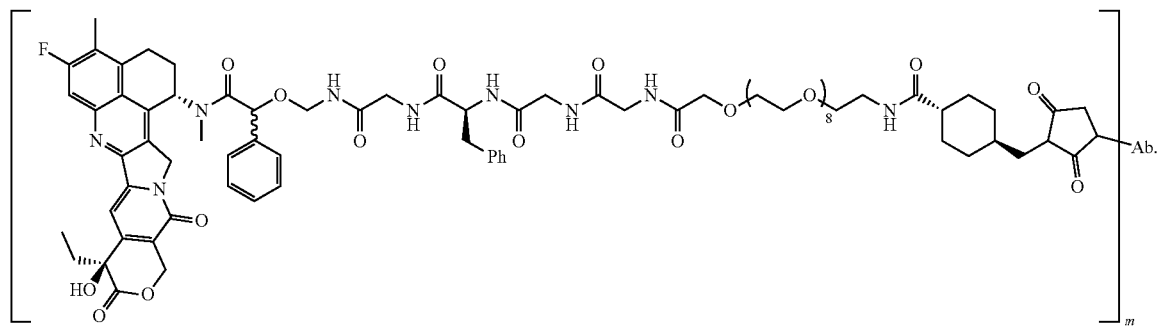

In other embodiments, the disclosure provides the antibody-drug conjugate or a pharmaceutically acceptable salt or solvate thereof, wherein Ab may be an antibody, an antibody fragment or an antigen-binding fragment thereof. In one embodiment, the antibody may be chimeric antibodies, humanized antibodies or fully human antibodies. In one embodiment, the antibody may be monoclonal antibodies.

In other embodiments, the antibody, antibody fragment or antigen-binding fragment may comprise anti-EGFRvIII antibody, anti-DLL-3 antibody, anti-PSMA antibody, anti-CD70 antibody, anti-MUC16 antibody, anti-ENPP3 antibody, anti-TDGF1 antibody, anti-ETBR antibody, anti-MSLN antibody, anti-TIM-1 antibody, anti-LRRC15 antibody, anti-LIV-1 antibody, anti-CanAg/AFP antibody, anti-Claudin 18.2 antibody, anti-Mesothelin antibody, anti-HER2 (ErbB2) antibody, anti-EGFR antibody, anti-c-MET antibody, anti-SLITRK6 antibody, anti-KIT/CD117 antibody, anti-STEAP1 antibody, anti-SLAMF7/CS1 antibody, anti-NaPi2B/SLC34A2 antibody, anti-GPNMB antibody, anti-HER3(ErbB3) antibody, anti-MUC1/CD227 antibody, anti-AXL antibody, anti-CD166 antibody, anti-B7-H3 (CD276) antibody, anti-PTK7/CCK4 antibody, anti-PRLR antibody, anti-EFNA4 antibody, anti-5T4 antibody, anti-NOTCH3 antibody, anti-Nectin 4 antibody, anti-TROP-2 antibody, anti-CD142 antibody, anti-CA6 antibody, anti-GPR20 antibody, anti-CD174 antibody, anti-CD71 antibody, antibody EphA2 antibody, anti-LYPD3 antibody, anti-FGFR2 antibody, anti-FGFR3 antibody, anti-FRα antibody, anti-CEACAMs antibody, anti-GCC antibody, anti-Integrin Av antibody, anti-CAIX antibody, anti-P-Cadherin antibody, anti-GD3 antibody, anti-Cadherin 6 antibody, anti-LAMP1 antibody, anti-FLT3 antibody, anti-BCMA antibody, anti-CD79b antibody, anti-CD19 antibody, anti-CD33 antibody, anti-CD56 antibody, anti-CD74 antibody, anti-CD22 antibody, anti-CD30 antibody, anti-CD37 antibody, anti-CD138 antibody, anti-CD138 antibody CD352 antibody, anti-CD25 antibody or anti-CD123 antibody.

In another aspect, the disclosure provides a method for preparing an antibody-drug conjugate represented by the general formula $(Ab-L_a-X-D_2)$ or a pharmaceutically acceptable salt or solvate thereof. The method may comprise the following step:

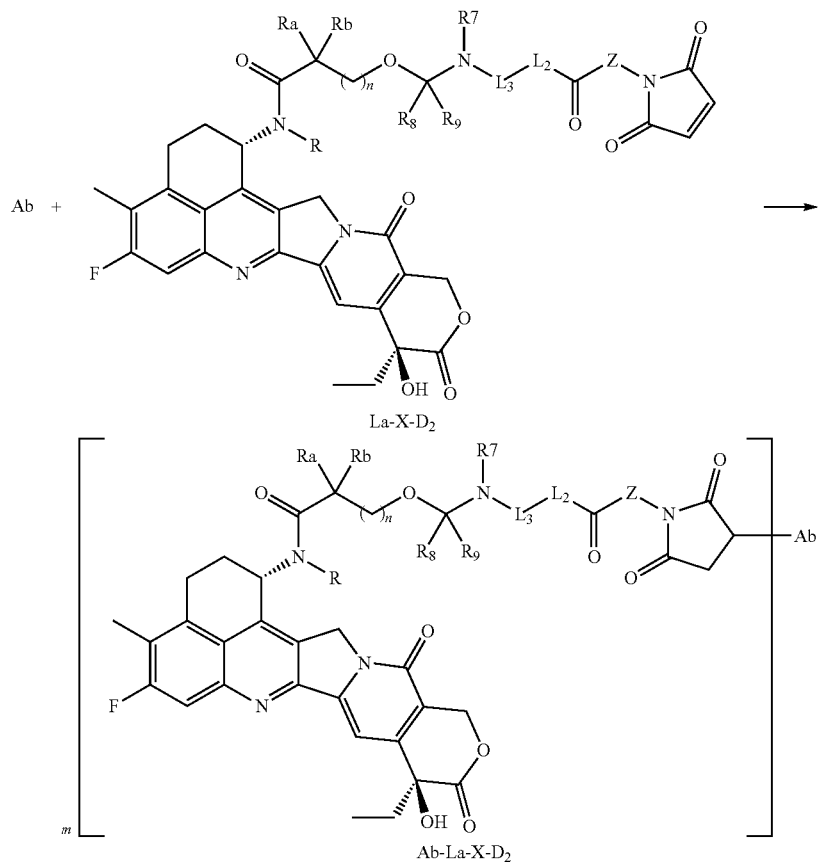

the general formula (Ab-L$_a$-X-D$_2$) is obtained by coupling reaction of the antibody, antibody fragment or its antigen-binding fragment with the general formula (L$_a$-X-D$_2$); wherein: Ab is an antibody, an antibody fragment or an antigen-binding fragment thereof; R, R$^a$, R$^b$, R$^7$, R$^8$, R$^9$, L$_2$, L$_3$, Z and n are as defined in the general formula (Ab-L$_a$-X-D$_2$) above.

In another aspect, the disclosure provides a pharmaceutical composition. The composition may comprise the compound represented by the general formula (D) disclosed herein or its tautomer, mesomer, racemate, enantiomers, diastereomers, or mixtures thereof, or pharmaceutically acceptable salts thereof, and one or more pharmaceutically acceptable carriers, diluents, or excipients.

In another aspect, the disclosure provides an antibody-drug conjugate or a pharmaceutically acceptable salt or solvate thereof comprising a ligand and a drug linked to the ligand, wherein the drug is selected from the group as disclosed herein, including without limitation, the compound represented by the general formula (D), the compound represented by the general formula (L-X-Dr), or its tautomer, mesomer, racemate, enantiomer, asymmetric enantiomer, or a mixture thereof, or a pharmaceutically acceptable salt thereof. In one embodiment, the drug is linked to the ligand via a linker. In one embodiment, the ligand is a monoclonal antibody.

In another aspect, the disclosure provides a method for preparing an antibody-drug conjugate or a pharmaceutically acceptable salt or solvate thereof, comprising the compound represented by the general formula (D) as described herein including, without limitation, the compound represented by the formula (L-X-Dr), or its tautomer, mesomer, racemate, enantiomer, diastereomer, or a mixture thereof, or its step of linking the pharmaceutically acceptable salt. In one embodiment, the ligand is linked through a linker. In one embodiment, the ligand is a monoclonal antibody.

In another aspect, the disclosure further relates to the antibody-drug conjugate or compound as disclosed herein, or a pharmaceutically acceptable salt or solvate thereof, or a pharmaceutical composition thereof, for use as a medicament.

In another aspect, the disclosure further relates to the antibody-drug conjugate or compound as disclosed herein, or a pharmaceutically acceptable salt or solvate thereof, or a pharmaceutical composition thereof in the preparation of a medicament for the treatment or prevention of tumors.

In another aspect, the disclosure further relates to the antibody-drug conjugate or compound as disclosed herein, or a pharmaceutically acceptable salt or solvate thereof, or a pharmaceutical composition in the preparation of a drug for treating and/or preventing cancer. The cancer may be solid tumors or hematological malignancies, such as breast cancer, ovarian cancer, cervical cancer, uterine cancer, prostate cancer, kidney cancer, urethral cancer, bladder cancer, liver cancer, stomach cancer, endometrial cancer, salivary gland cancer, esophageal cancer without limitation, lung cancer, colon cancer, rectal cancer, colorectal cancer, bone cancer, skin cancer, thyroid cancer, pancreatic cancer, melanoma, glioma, neuroblastoma, glioblastoma multiforme, sarcoma, lymphoma, leukemia and so on.

In another aspect, the disclosure further relates to a method for treating and/or preventing tumors, the method comprising administering to a patient in need thereof a therapeutically effective amount of the antibody-drug conjugate or compound as disclosed herein, or a pharmaceutically acceptable salt or solvate thereof, or a pharmaceutical composition comprising the same.

In another aspect, the disclosure further relates to a method for treating or preventing cancer, the method comprising administering to a patient in need thereof a therapeutically effective amount of the antibody-drug conjugate or compound as disclosed herein, or a pharmacy acceptable salt or solvate thereof, or a pharmaceutical composition comprising the same; the cancer may be selected from, without limitation, solid tumors, or hematological malignancies, such as breast cancer, ovarian cancer, cervical cancer, uterine cancer, prostate cancer, kidney cancer, urethral cancer, bladder cancer, liver cancer, stomach cancer, endometrial cancer, salivary gland cancer, esophagus cancer, lung cancer, colon cancer, rectal cancer, colorectal cancer, bone cancer, skin cancer, thyroid cancer, pancreatic cancer, melanoma, glioma, neuroma, glioblastoma multiforme, sarcomas, lymphomas, leukemias, and so on.

The active compound may be formulated in a form suitable for administration by any suitable route, for example, in a unit dosage form, or in a form that the patient can self-administer in a single dose.

A unit dose of a compound or composition as disclosed herein may be expressed as a tablet, capsule, cachet, vial, powder, granule, lozenge, suppository, reconstituted powder, or liquid. The dosage of the compound or composition used in the methods of treatment may generally vary with the severity of the disease, the weight of the patient, and the relative efficacy of the compound. However, as a general guide, a suitable unit dose may range from 0.1 to 1000 mg. In addition to the active compound, the pharmaceutical composition may contain one or more excipients, which may be selected from without limitation the following ingredients: filler (diluent), binder, wetting agent, disintegrant or excipients, etc. Depending on the method of administration, the composition may contain from 0.1 to 99% by weight of active compound.

Pharmaceutical compositions containing the active ingredient may be in a form suitable for oral administration, such as tablets, dragees, lozenges, aqueous or oily suspensions, dispersible powders or granules, emulsions, hard or soft capsules, or syrups or elixirs. Oral compositions may be prepared according to any method known in the art for the preparation of pharmaceutical compositions, which may include binders, fillers, lubricants, disintegrants or pharmaceutically acceptable wetting agents, etc. Such compositions may also contain one or more ingredients selected from the group consisting of sweetening agents, flavoring agents, coloring agents and preservatives, to provide a pleasing and palatable pharmaceutical preparation.

Aqueous suspensions contain the active materials in admixture with excipients suitable for the manufacture of aqueous suspensions. The aqueous suspensions may also contain one or more preservatives, one or more coloring agents, one or more flavoring agents, and one or more sweetening agents.

Oily suspensions can be formulated by suspending the active ingredient in oils such as vegetable oils. The oily suspensions may contain thickening agents. The aforementioned sweetening and flavoring agents may be added to provide a palatable preparation.

The pharmaceutical compositions may also provide the active ingredient as dispersible powders and granules for preparation of aqueous suspensions by admixing with water, one or more of a dispersing agent, wetting agent, suspending agent or preservative. Other excipients, such as sweetening, flavoring and coloring agents, may also be added. These compositions are preserved by the addition of antioxidants such as ascorbic acid.

The pharmaceutical compositions may also be in the form of oil-in-water emulsions.

The pharmaceutical compositions may be in the form of sterile injectable aqueous solutions. Among the acceptable vehicles or solvents that may be employed are without limitation water, Ringer's solution and isotonic sodium chloride solution. The sterile injectable preparation may be a sterile injectable oil-in-water microemulsion in which the active ingredient is dissolved in an oily phase. For example, the active ingredient is dissolved in a mixture of soybean oil and lecithin. The oil solution is then processed into a mixture of water and glycerol to form a microemulsion. Injections or microemulsions can be injected into a patient's bloodstream by local bolus injection. Alternatively, solutions and microemulsions are preferably administered in a manner that maintains a constant circulating concentration of the compounds disclosed herein. To maintain this constant concentration, a continuous intravenous drug delivery device can be used. An example of such a device is the Deltec CADD-PLUS™ 5400 intravenous pump.

The pharmaceutical compositions may be in the form of sterile injectable aqueous or oily suspensions for intramuscular and subcutaneous administration. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent. In addition, sterile fixed oils are conveniently employed as a solvent or suspending medium.

The compounds as disclosed herein may be administered in the form of suppositories for rectal administration. These pharmaceutical compositions can be prepared by mixing the drug with a suitable non-irritating excipient which is solid at ordinary temperatures but liquid in the rectum and therefore will melt in the rectum to release the drug. Such materials include cocoa butter, glycerinated gelatin, hydrogenated vegetable oils, polyethylene glycols of various molecular weights and mixtures of fatty acid esters of polyethylene glycols.

As is well known to those skilled in the art, the dosage of a drug to be administered depends on a variety of factors including, but not limited to, the following factors: the activity of the particular compound used, the age of the patient, the weight of the patient, the health of the patient, the behavior of the patient, the patient's diet, administration time, administration mode, excretion rate, combination of drugs, etc.; in addition, the optimal treatment regime such as the mode of treatment, the daily dosage of the compound of the general formula or the type of pharmaceutically acceptable salt can be determined according to traditional treatment options to verify.

DETAILED DESCRIPTION

Figure 1:
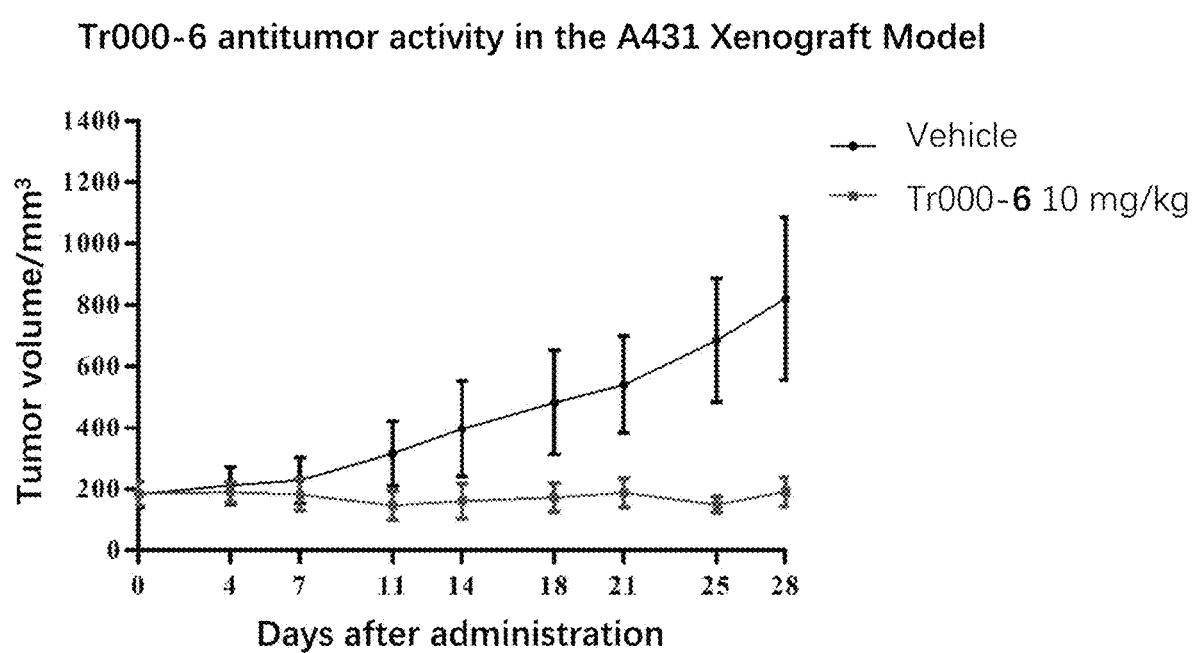
FIG. 1 shows the in vivo efficacy of representative ADC on the A431 tumor-bearing mouse model.
Figure 2:
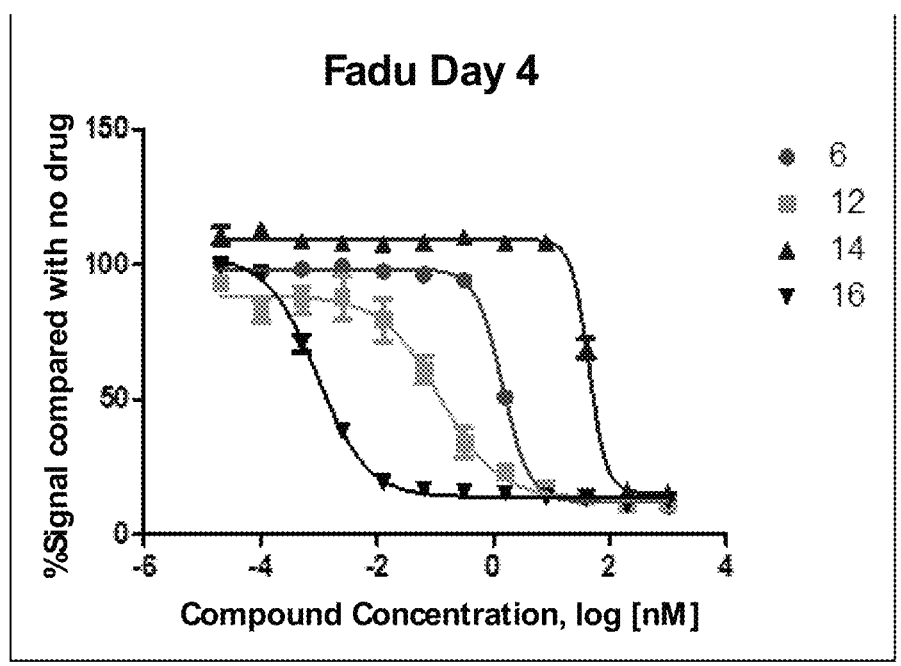
FIG. 2 shows the in vitro activity of representative compounds 6, 12, 14, and 16 on Fadu cells.
Figure 3:
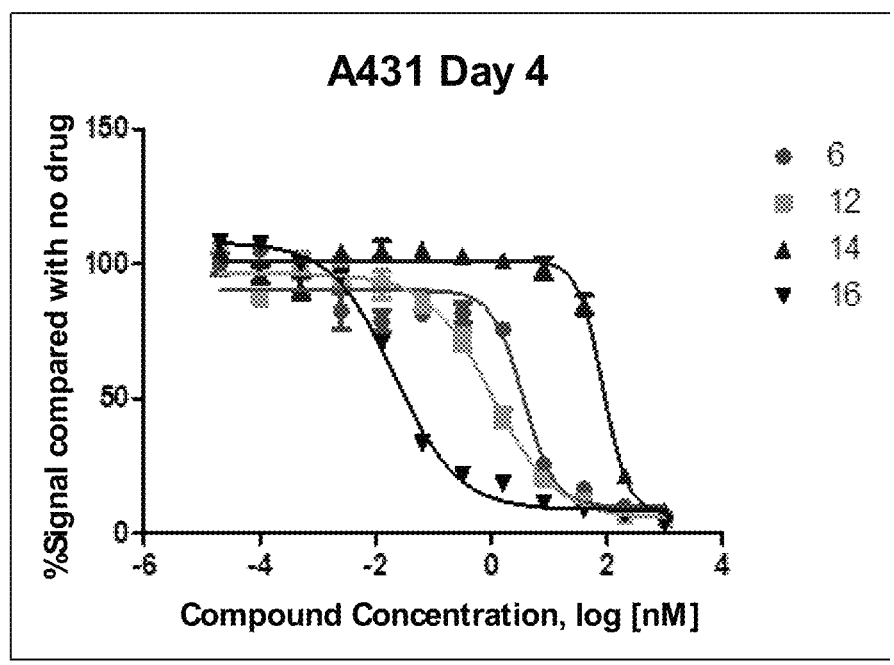
FIG. 3 shows the in vitro activity of representative compounds 6, 12, 14, and 16 on A431 cells.
Figure 4:
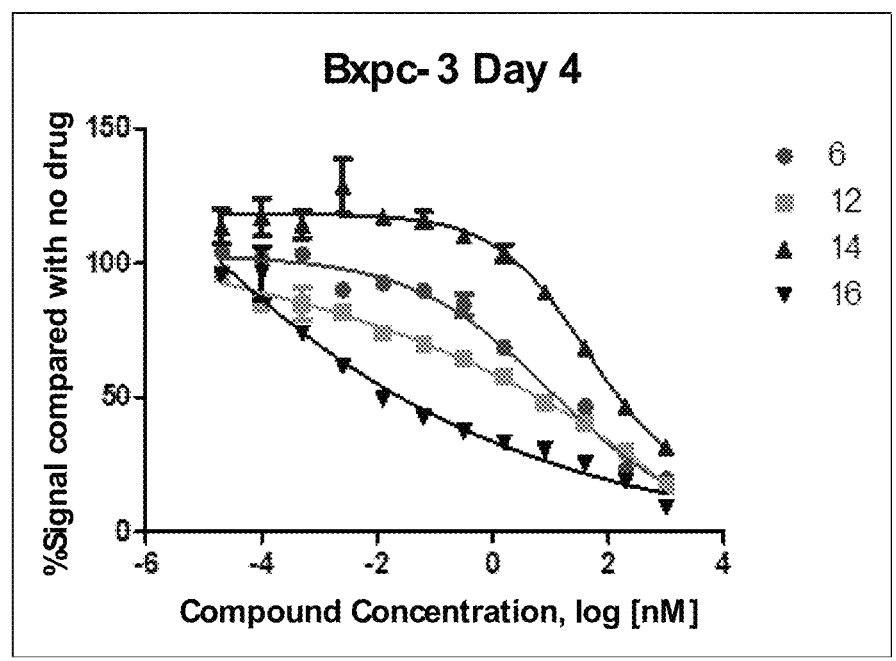
FIG. 4 shows the in vitro activity of representative compounds 6, 12, 14, and 16 on Bxpc-3 cells.
Figure 5:
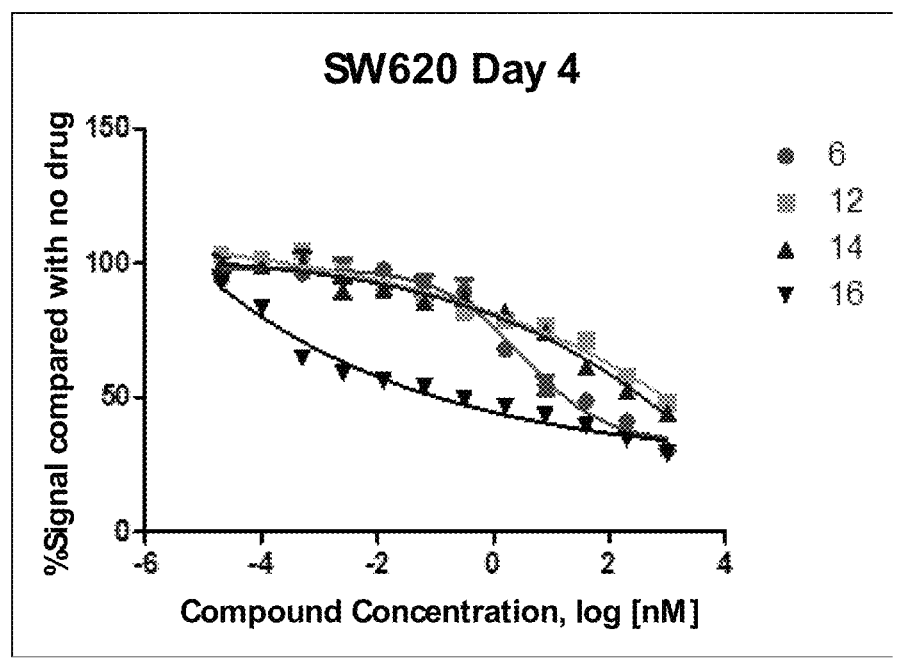
FIG. 5 shows the in vitro activity of representative compounds 6, 12, 14, and 16 on SW620 cells.

Unless otherwise defined, all technical and scientific terms used herein are the same as commonly understood by those of ordinary skill in the art to which this disclosure belongs. Although any methods and materials similar or equivalent to those described herein can also be used in the practice or testing of the present disclosure, the example methods and materials are described herein. In describing and claiming the present disclosure, the following terms are used in accordance with the following definitions.

When a tradename is used, the applicant intends to include the formulation of the tradename product, the portion of generic and active drug ingredient of the tradename product.

Unless stated to the contrary, the terms used in the specification and claims have the same meanings described below.

The term "antibody" refers to a macromolecular compound capable of recognizing and binding to an antigen or receptor associated with a target cell. The role of the antibody is to present the drug to the target cell population to which the antibody binds, including but not limited to, protein hormones, lectins, growth factors, antibodies, or other molecules that can bind to cells. In one embodiment, the antibody is represented as Ab, the antibody may form a connecting bond with the linking unit through its heteroatoms, preferably an antibody or an antigen-binding fragment thereof. The antibody may be selected from a chimeric antibody, a humanized antibody, a natural human antibody, or a murine antibody, preferably a monoclonal antibody.

The term "drug" refers to a cytotoxic drug, may be denoted as D, which is a chemical molecule strongly capable of disrupting normal growth of tumor cells. A cytotoxic drug can, in principle, kill tumor cells at a sufficiently high concentration. But, while killing tumor cells and due to the lack of specificity, it may also lead to apoptosis of normal cells, resulting in serious side effects. The term includes toxins, such as small molecule toxins or enzymatically active toxins of bacterial, fungal, plant or animal origin, radioisotopes (e.g., radioisotopes of $At^{211}$, $I^{131}$, $I^{125}$, $Y^{90}$, $Re^{186}$, $Re^{188}$, $Sm^{153}$, $Bi^{212}$, $P^{32}$ and Lu), toxic drugs, chemotherapeutic drugs, antibiotics and ribolysozyme, preferably toxic drugs.

The term "linker unit", "linking fragment", "linker", or "linking unit" refers to a chemical structural fragment or bond that is connected to a ligand at one end and a drug at the other end or may be connected to a drug after other linkers are connected. They may be represented as L and $L_1$-$L_4$, wherein the $L_1$ end is connected to the ligand, and the $L_4$ end is connected to the structural unit X after being connected with the drug (D).

Linkers, including stretchers, spacers, and amino acid units, may be synthesized by methods known in the art, such as those described in US2005-0238649A1. The linker can be a "cleavable linker" that facilitates the release of drugs in the cell. For example, acid-labile linkers (e.g., hydrazones), protease-sensitive (e.g., peptidase-sensitive) linkers, photo-labile linkers, dimethyl linkers, or disulfide-containing linkers may be used (Chari et al. Cancer Research 52: 127-131, 1992; U.S. Pat. No. 5,208,020).

The term "antibody-drug conjugate" refers to an antibody linked to a biologically active drug through a stable linking unit. In the present disclosure, antibody-drug conjugate (ADC) may refers to linking a monoclonal antibody or antibody fragment with a biologically active toxic drug through a stable linking unit.

The three-letter codes and one-letter codes of amino acids used in the present disclosure are as described in J. biol. Chem., 1968, 243, 3558.

The term "antibody" refers to an immunoglobulin (Ig), which is a tetrapeptide chain structure consisting of two identical heavy chains and two identical light chains linked by interchain disulfide bonds. The amino acid composition and sequence of the constant region of immunoglobulin heavy chain are different, so their antigenicity is also different. Accordingly, immunoglobulins can be divided into five classes or isotypes, namely IgM, IgD, IgG, IgA, and IgE, whose corresponding heavy chains are µ chain, δ chain, γ chain, α chain, and ε chain, respectively. The same type of Ig can be divided into different subclasses according to the difference in the amino acid composition of its hinge region and the number and position of disulfide bonds in the heavy chain. For example, IgG can be divided into IgG1, IgG2, IgG3, and IgG4. Light chains are classified into either kappa (κ) chains or lambda (λ) chains by the difference in the constant region. Each of the five classes of Ig can have either a κ chain or λ chain. The antibodies of the present disclosure may be specific antibodies against cell surface antigens on target cells, and the non-limiting examples include: anti-EGFRvIII antibody, anti-DLL-3 antibody, anti-PSMA antibody, anti-CD70 antibody, anti-MUC16 antibody, anti-ENPP3 antibody, anti-TDGF1 antibody, anti-ETBR antibody, anti-MSLN antibody, anti-TIM-1 antibody, anti-LRRC15 antibody, anti-LIV-1 antibody, anti-CanAg/AFP antibody, anti-Claudin 18.2 antibody, anti-Mesothelin antibody, anti-HER2 (ErbB2) antibody, anti-EGFR antibody, anti-c-MET antibody, anti-SLITRK6 antibody, anti-KIT/CD117 antibody, anti-STEAP1 antibody, anti-SLAMF7/CS1 antibody, anti-NaPi2B/SLC34A2 antibody, anti-GPNMB antibody, anti-HER3(ErbB3) antibody, anti-MUC1/CD227 antibody, anti-AXL antibody, anti-CD166 antibody, anti-B7-H3(CD276) antibody, anti-PTK7/CCK4 antibody, anti-PRLR antibody, anti-EFNA4 antibody, anti-5T4 antibody, anti-NOTCH3 antibody, anti-Nectin 4 antibody, anti-TROP-2 antibody, anti-CD142 antibody, anti-CA6 antibody, anti-GPR20 antibody, anti-CD174 antibody, anti-CD71 antibody, anti-EphA2 antibody, anti-LYPD3 antibody, anti-FGFR2 antibody, anti-FGFR3 antibody, anti-FRα antibody, anti-CEACAMs antibody, anti-GCC antibody, anti-Integrin Av antibody, anti-CAIX antibody, anti-P-Cadherin antibody, anti-GD3 antibody, anti-Cadherin 6 antibody, anti-LAMP1 antibody, anti-FLT3 antibody, anti-BCMA antibody, anti-CD79b antibody, anti-CD19 antibody, anti-CD33 antibody, anti-CD56 antibody, anti-CD74 antibody, anti-CD22 antibody, anti-CD30 antibody, anti-CD37 antibody, anti-CD138 antibody, anti-CD352 antibody, anti-CD25 antibody or anti-CD123 antibody.

The sequences of about 110 amino acids near the N-terminus of the antibody heavy and light chains varies greatly and are known as variable region (Fv region), whereas the remaining amino acid sequences near the C-terminus are relatively stable and are known as constant region. The variable region consists of 3 hypervariable regions (HVRs) and 4 framework regions (FR) with relatively conserved sequences. The 3 hypervariable regions determine the specificity of antibodies, also known as complementarity determining regions (CDRs). Each light chain variable region (LCVR) and heavy chain variable region (HCVR) consists of 3 CDR regions and 4 FR regions. The order from the amino terminus to the carboxy terminus is: FR1, CDR1, FR2, CDR2, FR3, CDR3, FR4. The 3 CDR regions of the light chain are referred as LCDR1, LCDR2, and LCDR3; the 3 CDR regions of the heavy chain are referred as HCDR1, HCDR2 and HCDR3.

Antibodies of the present disclosure may include murine antibodies, chimeric antibodies, humanized antibodies and fully human antibodies, preferably humanized antibodies and fully human antibodies.

The term "murine antibody" in the present disclosure refers to the antibodies prepared by using mice in accordance with the knowledge and skill in the art. For the preparation, a specific antigen is injected into the test subject, and the hybrid expressing an antibody with the desired sequence or functional properties is isolated.

The term "chimeric antibody" refers to the antibodies obtained by fusing the variable region of a murine antibody with the constant region of a human antibody, which may alleviate the immune response induced by the murine antibody. To produce a chimeric antibody, a hybridoma that secretes a mouse-specific monoclonal antibody is first established, followed by isolation of the variable region gene from the hybridoma cells and cloning of the constant region gene from a human antibody as needed. After fusing the two genes into a chimeric gene, it is inserted into an expression vector and expressed in eukaryotic or prokaryotic system to produce the chimeric antibody molecule.

The term "humanized antibody", also known as CDR-grafted antibody, refers to the human antibodies grafted with murine CDR sequences into the human antibody variable region framework, i.e., antibodies of different types of human germline antibody framework sequence. It can overcome the heterologous reaction induced by chimeric antibodies carrying a large number of murine protein components. Such framework sequences can be obtained from the public DNA databases, including germline antibody gene sequences and published references. For example, the germline DNA sequences of human heavy and light chain variable region genes can be found in the "VBase" human germline sequence database (available on the Internet at www.mrccpe.com/ac.uk/vbase, and in Kabat, E A et al., 1991 Sequences of Proteins of Immunological Interest, 5th ed.). To avoid a decrease in immunogenicity leading to decrease in activity, the human antibody variable region framework sequence may be subjected to a minimum reverse mutation or a recovery mutation to maintain activity. Humanized antibodies of the present disclosure also include the humanized antibodies whose affinity maturation of CDR is further carried out by phage display. Literatures that further describe the methods for humanizing mouse antibodies include, for example, Queen et al. Proc., Natl. Acad. Sci. USA, 88, 2869, 1991; and the methods used by Winter and colleagues [Jones, Nature, 321, 522, (1986); Riechmann, et al. Nature, 332, 323-327, 1988; and Verhoeyen, et al. Science, 239, 1534 (1988)].

The terms "fully human antibody", "whole human antibody" or "complete human antibody", also known as "fully human monoclonal antibody", refer to the human antibodies whose variable region and constant region of the antibody are all human, eliminating the issues of immunogenicity and toxic side effects. The development of monoclonal antibodies has gone through four stages, namely: murine monoclonal antibodies, chimeric monoclonal antibodies, humanized monoclonal antibodies and fully human monoclonal antibodies. The present disclosure is related to fully human monoclonal antibodies. The relevant techniques for preparing such human antibodies mainly include human hybridoma, EBV-transformed B lymphocytes, phage display, antibody preparation using transgenic mice, and the antibody preparation from single B cells.

The term "antigen-binding fragment" refers to one or more fragments of an antibody that retain the ability to specifically bind an antigen. Fragments of full-length antibodies have been shown to perform the antigen-binding function of antibodies. Examples of binding fragments contained in "antigen-binding fragments" include (i) Fab fragments, monovalent fragments consisting of VL, VH, CL and CH1 domains; (ii) F(ab')2 fragments, comprising bivalent fragments of two Fab fragments connected by a disulfide bridge over the hinged region, (iii) Fd fragments composed of VH and CH1 domains; (iv) Fv fragments composed of single-arm VH and VL domains of an antibody; (v) single domains or dAb fragments (Ward et al., 1989. Nature 341: 544-546), which consist of VH domains; and (vi) isolated complementarity determining regions (CDRs) or (vii) a combination of two or more optionally isolated CDRs joined by a synthetic linker. In addition, recombinant methods may be used to connect VL and VH domains of Fv fragment by synthetic linkers, even though the two domains are encoded by separate genes, which enable the production of a single protein in which the VL and VH domains are paired to form a monovalent protein chain, also known as a single-chain Fv (scFv) (see Bird et al. 1988. Science 242:423-426; and Huston et al. 1988. Proc. Natl. Acad. Sci. USA 85: 5879-5883). Such single chain antibodies are included under the term "antigen-binding fragment" of an antibody, and may be obtained by using conventional techniques known to those of skill in the art. The fragments are screened for their utilities in the same manner as for intact antibodies. The antigen-binding fragments may be generated by using recombinant DNA techniques or by enzymatic or chemical cleavage of intact immunoglobulins. Antibodies may be of different isotypes, e.g., IgG (having IgG1, IgG2, IgG3, or IgG4 subtype), IgA1, IgA2, IgD, IgE, or IgM antibodies.

Fab may be obtained after treating IgG antibody molecules with the protease papain (which cleaves the amino acid residue at the 224th position of the H chain), which is also an antibody fragment having a molecular weight of about 50,000, having antigen-binding activity, and having the N-terminal half of H chain paired with the entire L chain by disulfide bonds.

F(ab')2 may be obtained after digesting the lower part of the two disulfide bonds in the IgG hinge region with the enzyme pepsin, which is an antigen-binding fragment having a molecular weight of about 100,000, has antigen-binding activity, and containing antibody fragments of the two Fab regions connected within the hinge position.

Fab' is an antibody fragment having a molecular weight of about 50,000 and having antigen-binding activity obtained by cleaving a disulfide bond in the hinge region of the above-mentioned F(ab')2.

Furthermore, the Fab' can be produced by inserting DNA encoding a Fab' fragment of an antibody into a prokaryotic expression vector or eukaryotic expression vector and introducing the vector into a prokaryotic or eukaryotic organism to express the Fab'.

The term "single-chain antibody", "single-chain Fv" or "scFv" refers to the molecule comprising an antibody heavy chain variable domain (or region; VH), an antibody light chain variable domain (or region; VL), and a linker. Such scFv molecules may have the general structure configuration: NH2-VL-linker-VH-COOH or NH2-VH-linker-VL- COOH. There are suitable prior art linkers consisting of GGGGS amino acid repeat sequences or variants thereof, for example, variants with 1-4 repeats (Holliger et al. (1993), Proc. Natl. Acad. Sci. USA 90: 6444-6448). Other linkers used in the present disclosure are described by Alfthan et al. (1995), Protein Eng. 8:725-731; Choi et al. (2001), Eur. J Immuno. 1.31:94-106; Hu et al. (1996), Cancer Res. 56: 3055-3061; Kipriyanov et al. (1999), J Mol. Biol. 293: 41-56; and Roovers et al. (2001), Cancer Immunol.

The term "CDR" refers to one of the six hypervariable regions within the variable domain of an antibody that primarily contribute to antigen binding. The commonly used definition of the six CDRs is provided by Kabat E. A. et al. (see Sequences of proteins of immunological interest. NIH Publication 91-3242, 1991). As used herein, the Kabat definition of CDRs is only applicable to CDR1, CDR2, and CDR3 of the light chain variable domain (CDRL1, CDRL2, CDRL3 or L1, L2, L3), and CDR1, CDR2 and CDR3 of the heavy chain variable domain (CDRH1, CDRH2, CDRH3 or H1, H2, H3).

The term "antibody framework" refers to the portion of a variable domain VL or VH that serves as a scaffold for the antigen binding loops (CDRs) of the variable domain. Essentially, it is a variable structure with no CDRs.

The term "epitope" or "antigenic determinant" refers to the site on an antigen to which an immunoglobulin or antibody specifically binds. Epitopes typically include at least 3, 4, 5, 6, 7, 8, 9, 10, 11, 12, 13, 14 or 15 contiguous or non-contiguous amino acids in a unique spatial conformation (see G. E. Morris, et al. Epitope Mapping Protocols in Methods in Molecular Biology, Vol. 66, 1996).

The terms "specifically binds" or "selectively binds" refers to the binding of an antibody to a predetermined epitope on an antigen. Typically, the antibody binds with an affinity (KD) of about less than $10^{-7}$ M, $10^{-8}$ M, $10^{-9}$ M, or even less than $10^{-10}$ M.

The term "nucleic acid molecule" refers to DNA molecules and RNA molecules. Nucleic acid molecules may be single-stranded or double-stranded but are preferably double-stranded DNA. A nucleic acid is "operably linked" when it is placed in a functional relationship with another nucleic acid sequence. For example, a promoter or enhancer is operably linked to a coding sequence if it affects the transcription of the coding sequence.

The term "vector" refers to a nucleic acid molecule capable of transporting another nucleic acid to which it has been linked. In one embodiment, the vector is a "plasmid," which refers to a circular double-stranded DNA loop into which additional DNA segments may be ligated. In another embodiment, the vector is a viral vector in which additional DNA segments may be ligated into the viral genome. The vectors of the present disclosure are capable of autonomous replication in the host cell into which they have been introduced (e.g., bacterial vectors and episomal mammalian vectors having a bacterial origin of replication) or may integrate into the host cell's genome after introduction into the host cell, thereby following the host genome replication together (e.g., a non-episomal mammalian vector).

Methods for producing and purifying antibodies and antigen-binding fragments are well known in the art, including Cold Spring Harbor's Technical Guide to Antibody Assays, Chapters 5-8 and 15. Likewise, antigen-binding fragments may be prepared by conventional methods. The antibody or antigen-binding fragment of the present disclosure uses genetic engineering to add one or more human FR regions to the non-human CDR regions. Human FR germline sequences may be obtained by using MOE software to align the IMGT human antibody variable region germline DNA database from either the website of lmMunoGeneTics (MGT) at http://imgt.cines.fr, or the Journal of Immunoglobulins, 2001 ISBN012441351.

The term "host cell" refers to a cell into which an expression vector has been introduced. Host cells may include bacterial, microbial, plant or animal cells. Bacteria susceptible to transformation include members of the family Enterobacteriaceae, such as strains of *Escherichia coli* or *Salmonella*; Bacillaceae, such as *Bacillus subtilis*; *Pneumococcus*; *Streptococcus* and *Haemophilus influenzae*. Suitable microorganisms include *Saccharomyces cerevisiae* and *Pichia pastoris*. Suitable animal host cell lines include CHO (Chinese hamster ovary cell line) and NSO cells.

The engineered antibodies or antigen-binding fragments of the present disclosure may be prepared and purified using conventional methods. For example, the cDNA sequences encoding heavy and light chains may be cloned and recombined into a GS expression vector. The recombinant immunoglobulin expression vector may be used to stably transfect CHO cells. As a more preferred prior art, mammalian-like expression systems lead to glycosylation of the antibody, especially at the highly conserved N-terminal site of the Fc region. Positive clones may be expanded in serum-free medium in bioreactors for antibody production. The antibody-producing culture medium may be subjected to purification by using conventional techniques, for example, buffer-adjusted A or G Sepharose FF columns for purification. Non-specifically bound components are washed away. The bound antibody may be eluted and collected by a pH gradient method, and the antibody fragments may be detected by SDS-PAGE. Antibodies may be filtered and concentrated by conventional methods. Soluble mixtures and polymers may also be removed by conventional methods, such as molecular sieves and ion exchange. The obtained product should be frozen immediately, such as below −70° C., or lyophilized.

The term "peptide" refers to a fragment of a compound sized between an amino acid and a protein, consisting of two or more amino acid molecules connected to each other by peptide bonds, and is a structural and functional fragment of a protein, such as hormones, enzymes, etc., all of which are peptides.

The term "sugar" refers to a biological macromolecule composed of three elements, C, H, and O, which may be classified as monosaccharides, disaccharides, and polysaccharides.

The term "fluorescent probe" refers to a class of fluorescent molecules that have characteristic fluorescence in the ultraviolet (UV)—visible (Vis)—near-infrared (NIR) region, and their fluorescence properties (excitation and emission wavelength, intensity, lifetime and polarization, etc.) are sensitive to the characteristic changes in their environment, such as polarity, refractive index, viscosity, etc. They may non-covalently interact with nucleic acids (DNA or RNA), proteins or other macromolecular structures so that one or more fluorescent properties change, which may be used for studying the properties and behavior of large molecule substances.

The term "toxic drug" refers to substances that inhibit or prevent the function of cells and/or cause cell death or destruction, including toxins and other compounds that may be used in tumor therapy.

The term "toxin" refers to any substance capable of having a deleterious effect on the growth or proliferation of cells, which may be small molecule toxins from bacteria, fungi, plants or animals and their derivatives, including camptothecin derivatives such as exatecan, maytansinoids, and their derivatives (CN101573384, e.g. DM1, DM3, DM4), auristatin F (AF) and its derivatives (WO 2016/127790 A1, e.g. MMAF, MMAE, 3024), diphtheria toxin, external toxin, ricin A chain, abrin A chain, modeccin, α-sarcin, *Aleurites fordii* toxin, dianthin toxin, *Phytolacca americana* toxins (e.g. PAPI, PAPII and PAP-S), *Momordica charantia* inhibitor, curcin, crotin, *Saponaria officinalis* inhibitors, gelonin, mitogellin, restrictocin, phenomycin, enomycin, and trichothecenes.

The term "alkyl" refers to a saturated aliphatic hydrocarbon group, which is a straight or branched chain group containing 1 to 20 carbon atoms, preferably an alkyl group containing 1 to 12 carbon atoms, more preferably 1 to 10 carbon atoms atomic alkyl groups, most preferably those containing 1 to 6 carbon atoms. Non-limiting examples include methyl, ethyl, n-propyl, isopropyl, n-butyl, isobutyl, tert-butyl, sec-butyl, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-Methylpropyl, 1,1,2-trimethylpropyl, 1,1-dimethylbutyl, 1,2-dimethylbutyl, 2,2-dimethylbutyl, 1,3-Dimethylbutyl, 2-ethylbutyl, 2-methylpentyl, 3-methylpentyl, 4-methylpentyl, 2,3-dimethylbutyl, n-heptyl, 2-methylhexyl, 3-methylhexyl, 4-methylhexyl, 5-methylhexyl, 2,3-dimethylpentyl, 2,4-dimethylpentyl, 2,2-dimethyl pentyl, 3,3-dimethylpentyl, 2-ethylpentyl, 3-ethylpentyl, n-octyl, 2,3-dimethylhexyl, 2,4-dimethylhexyl, 2,5-dimethylhexyl, 2,2-dimethylhexyl, 3,3-dimethylhexyl, 4,4-dimethylhexyl, 2-ethylhexyl, 3-ethylhexyl, 4-ethylhexyl ethylhexyl, 2-methyl-2-ethylpentyl, 2-methyl-3-ethylpentyl, n-nonyl, 2-methyl-2-ethylhexyl, 2-methyl-3-ethyl alkylhexyl, 2,2-diethylpentyl, n-decyl, 3,3-diethylhexyl, 2,2-diethylhexyl, and various branched isomers thereof, etc. More preferred are lower alkyl groups containing 1 to 6 carbon atoms, non-limiting examples include methyl, ethyl, n-propyl, isopropyl, n-butyl, isobutyl, tert-butyl, sec-butyl base, n-pentyl, 1,1-dimethylpropyl, 1,2-dimethylpropyl, 2,2-dimethylpropyl, 1-ethylpropyl, 2-methylbutyl, 3-methylbutyl, n-hexyl, 1-ethyl-2-methylpropyl, 1,1,2-trimethylpropyl, 1,1-dimethylbutyl, 1,2-dimethylpropyl butyl, 2,2-dimethylbutyl, 1,3-dimethylbutyl, 2-ethylbutyl, 2-methylpentyl, 3-methylpentyl, 4-methylpentyl base, 2,3-dimethylbutyl, etc. Alkyl groups may be substituted or unsubstituted, and when substituted, substituents may be substituted at any available point of attachment, preferably one or more of the following groups, independently selected from alkanes group, alkenyl, alkynyl, alkoxy, alkylthio, alkylamino, halogen, mercapto, hydroxyl, nitro, cyano, cycloalkyl, heterocycloalkyl, aryl, heteroaryl, cycloalkane oxy, heterocycloalkoxy, cycloalkylthio, heterocycloalkylthio, oxo.

The term "heteroalkyl" refers to an alkyl group containing one or more heteroatoms selected from N, O, or S, wherein alkyl is as defined above.

The term "alkylene" refers to a saturated straight or branched chain aliphatic hydrocarbon group having 2 residues derived by removing two hydrogen atoms from the same or two different carbon atoms of the parent alkane, which are straight or branched chain group containing 1 to 20 carbon atoms, preferably an alkylene group containing 1 to 12 carbon atoms, more preferably 1 to 6 carbon atoms. Non-limiting examples of alkylene groups include, but are not limited to, methylene (—$CH_2$—), 1,1-ethylene [-CH($CH_3$)—], 1,2-ethylene (—$CH_2CH_2$)—, 1,1-propylene [-CH($CH_2CH_3$)—], 1,2-propylene [-$CH_2$CH($CH_3$)—], 1,3-propylene (—$CH_2CH_2CH_2$—), 1,4-butylene base (—$CH_2CH_2CH_2CH_2$—) and 1,5-butylene (—$CH_2CH_2CH_2CH_2CH_2$—) and so on. Alkylene may be substituted or unsubstituted, and when substituted, substituents may be substituted at any available point of attachment, preferably independently optionally selected from alkyl, alkenyl, alkynyl, alkoxy, alkylthio, alkylamino, halogen, mercapto, hydroxyl, nitro, cyano, cycloalkyl, heterocyclyl, aryl, heteroaryl, cycloalkoxy, heterocycloalkoxy, cycloalkylthio, heterocycloalkylthio and one or more substituents of oxo.

The term "alkoxy" refers to —O-(alkyl) and —O-(unsubstituted cycloalkyl), wherein alkyl or cycloalkyl is as defined above. Non-limiting examples of alkoxy groups include: methoxy, ethoxy, propoxy, butoxy, cyclopropoxy, cyclobutoxy, cyclopentyloxy, cyclohexyloxy. Alkoxy may be optionally substituted or unsubstituted, and when substituted, the substituents are preferably one or more of the following groups independently selected from alkyl, alkenyl, alkynyl, alkoxy, alkoxy thio, alkylamino, halogen, mercapto, hydroxyl, nitro, cyano, cycloalkyl, heterocycloalkyl, aryl, heteroaryl, cycloalkoxy, heterocycloalkoxy, cycloalkylthio, heterocycloalkylthio.

The term "cycloalkyl" refers to a saturated or partially unsaturated monocyclic or polycyclic cyclic hydrocarbon substituent, the cycloalkyl ring containing 3 to 20 carbon atoms, preferably 3 to 12 carbon atoms, more preferably 3 to 10 carbon atoms carbon atoms, most preferably 3 to 8 carbon atoms. Non-limiting examples of monocyclic cycloalkyl groups include cyclopropyl, cyclobutyl, cyclopentyl, cyclopentenyl, cyclohexyl, cyclohexenyl, cyclohexadienyl, cycloheptyl, cycloheptatriene polycyclic cycloalkyl groups include spiro, fused and bridged cycloalkyl groups.

The term "heterocyclyl" refers to a saturated or partially unsaturated monocyclic or polycyclic cyclic hydrocarbon substituent containing from 3 to 20 ring atoms, one or more of which is selected from nitrogen, oxygen or S(O) heteroatoms of u (where u is an integer from 0 to 2), excluding ring moieties of —OO—, —OS— or —SS—, the remaining ring atoms being carbon. In one embodiment, it contains 3 to 12 ring atoms, of which 1 to 4 are heteroatoms; more preferably, the cycloalkyl ring contains 3 to 10 ring atoms. Non-limiting examples of monocyclic heterocyclyl groups include pyrrolidinyl, piperidinyl, piperazinyl, morpholinyl, thiomorpholinyl, homopiperazinyl, and the like. Polycyclic heterocyclyls include spiro, fused and bridged heterocyclyls. The heterocyclyl ring can be fused to an aryl, heteroaryl or cycloalkyl ring, wherein the ring attached to the parent structure is a heterocyclyl, non-limiting examples of which include:

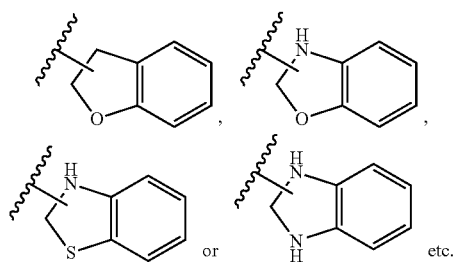

Heterocyclyl may be optionally substituted or unsubstituted, and when substituted, the substituents are preferably one or more of the following groups independently selected from alkyl, alkenyl, alkynyl, alkoxy, alkane thio, alkylamino, halogen, mercapto, hydroxyl, nitro, cyano, cycloalkyl, heterocycloalkyl, aryl, heteroaryl, cycloalkoxy, heterocycloalkoxy, cycloalkylthio, heterocycloalkylthio, oxo.

The term "aryl" refers to a 6- to 14-membered all-carbon monocyclic or fused polycyclic (that is, rings that share adjacent pairs of carbon atoms) groups, preferably 6 to 10 membered, with a conjugated electron system, such as benzene and naphthyl, in one embodiment, phenyl. The aryl ring may be fused to a heteroaryl, heterocyclyl or cycloalkyl ring, wherein the ring linked to the parent structure is an aryl ring, non-limiting examples of which include:

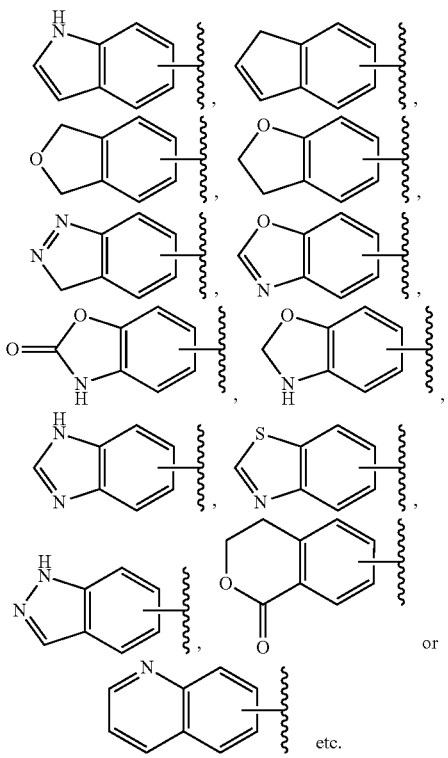

etc.

Aryl may be substituted or unsubstituted, and when substituted, the substituents are preferably one or more of the following groups independently selected from alkyl, alkenyl, alkynyl, alkoxy, alkylthio, alkylamino, halogen, hydroxyl, nitro, cyano, cycloalkyl, heterocycloalkyl, aryl, heteroaryl, cycloalkoxy, heterocycloalkoxy, cycloalkylthio, heterocycloalkanethio base.

The term "heteroaryl" refers to a heteroaromatic system comprising 1 to 4 heteroatoms, 5 to 14 ring atoms, wherein the heteroatoms are selected from oxygen, sulfur and nitrogen. Heteroaryl is preferably 5 to 10-membered, more preferably 5- or 6-membered, such as furyl, thienyl, pyridyl, pyrrolyl, N-alkylpyrrolyl, pyrimidinyl, pyrazinyl, imidazolyl, tetra azolyl, etc. The heteroaryl ring may be fused to an aryl, heterocyclyl or cycloalkyl ring, wherein the ring linked to the parent structure is a heteroaryl ring, non-limiting examples of which include:

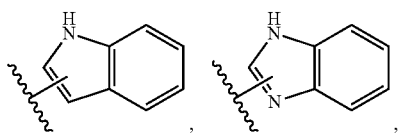

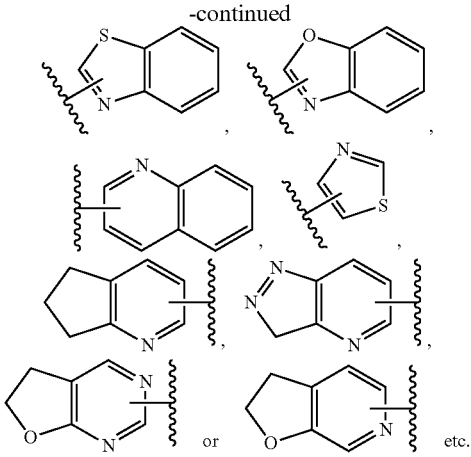

etc.

Heteroaryl groups may be optionally substituted or unsubstituted, and when substituted, the substituents are preferably one or more of the following groups independently selected from alkyl, alkenyl, alkynyl, alkoxy, alkane thio, alkylamino, halogen, mercapto, hydroxyl, nitro, cyano, cycloalkyl, heterocycloalkyl, aryl, heteroaryl, cycloalkoxy, heterocycloalkoxy, cycloalkylthio, heterocycloalkylthio.

The term "amino protecting group" is used to protect the amino group with a group that is easy to remove in order to keep the amino group unchanged when other parts of the molecule are reacted. Non-limiting examples include 9-fluorenylmethoxycarbonyl, t-butoxycarbonyl, acetyl, benzyl, allyl, p-methoxybenzyl, and the like. These groups may be optionally substituted with 1-3 substituents selected from halogen, alkoxy or nitro. In one embodiment, the amino protecting group is 9-fluorenemethoxycarbonyl.

The term "cycloalkylalkyl" refers to an alkyl group substituted with one or more cycloalkyl groups, preferably one cycloalkyl group, wherein alkyl is as defined above, wherein cycloalkyl is as defined above.

The term "haloalkyl" refers to an alkyl group substituted with one or more halogens, wherein alkyl is as defined above.

The term "deuterated alkyl" refers to an alkyl group substituted with one or more deuterium atoms, wherein alkyl is as defined above. The term "hydroxy" refers to the —OH group.

The term "halogen" refers to fluorine, chlorine, bromine or iodine. The term "amino" refers to —NH2. The term "nitro" refers to —NO2.

The term "amido" refers to —C(O)N-(alkyl) or (cycloalkyl), wherein alkyl, cycloalkyl are as defined above.

The term "carboxylate" refers to —C(O)O-(alkyl) or (cycloalkyl), wherein alkyl, cycloalkyl are as defined above.

The present disclosure also includes various deuterated forms of the compound of formula (D). Each available hydrogen atom attached to a carbon atom may be independently replaced by a deuterium atom. Those skilled in the art may refer to relevant literature to synthesize the compound of formula (D) in deuterated form. Commercially available deuterated starting materials may be used in preparing deuterated forms of the compound of formula (D), or they may be synthesized by conventional techniques using deuterated reagents, including but not limited to, deuterated borane, trideuterated Borane tetrahydrofuran solution, deuterated lithium aluminum hydride, deuterated iodoethane and deuterated iodomethane, etc.

"Optional" or "optionally" means that the subsequently described event or circumstance can but need not occur, and that the description includes instances where the event or circumstance occurs or instances where it does not. For example, "a heterocyclic group optionally substituted with an alkyl group" means that an alkyl group may, but need not, be present, and the description includes the case where the heterocyclic group is substituted with an alkyl group and the case where the heterocyclic group is not substituted with an alkyl group.

"Substituted" or "substituted" means that one or more hydrogen atoms in a group, preferably up to 5, more preferably 1 to 3 hydrogen atoms, independently of each other, are substituted by the corresponding number of substituents. It goes without saying that the substituents are only in their possible chemical positions, and the person skilled in the art can determine (either experimentally or theoretically) possible or impossible substitutions without undue effort. For example, amino or hydroxyl groups with free hydrogens may be unstable when bound to carbon atoms with unsaturated (e.g., olefinic) bonds.

The term "pharmaceutical composition" means a mixture containing one or more of the compounds described herein, or a physiologically/pharmaceutically acceptable salt or prodrug thereof, with other chemical components, as well as other components such as physiological/pharmaceutically acceptable carriers and excipients. The purpose of the pharmaceutical composition is to facilitate the administration to a subject, facilitate the absorption of the active ingredient and exert the biological activity.

The term "pharmaceutically acceptable salts" or "pharmaceutically acceptable salts" refers to salts of the antibody-drug conjugates as disclosed herein, or salts of the compounds as disclosed herein, which when used in mammals have Safety and efficacy, and have due biological activity, the antibody-drug conjugate compound of the present disclosure contains at least one amino group, so it can form salt with acid, non-limiting examples of pharmaceutically acceptable salt include: hydrochloride, hydrobromide, hydroiodide, sulfate, bisulfate, citrate, acetate, succinate, ascorbate, oxalate, nitrate, pearate, hydrogen phosphate, diphosphoric acid hydrogen salt, salicylate, hydrogen citrate, tartrate, maleate, fumarate, formate, benzoate, mesylate, ethanesulfonate, benzenesulfonate, p-toluenesulfonate.

The term "solvate" or "solvate" refers to the formation of a pharmaceutically acceptable solvate of an antibody-drug conjugate compound of the disclosure with one or more solvent molecules, non-limiting examples of solvent molecules including water, ethanol, acetonitrile, Isopropanol, DMSO, ethyl acetate.

The term "drug load" is the average amount of cytotoxic drug loaded on each antibody in the molecule and can also be expressed as the ratio of the amount of drug to the amount of antibody. The drug load can range from 0-12 per antibody (Ab) linkage. one, preferably 1-10 cytotoxic drugs (D). In one embodiment, the drug loading is expressed as m, which can be the mean value of 1, 2, 3, 4, 5, 6, 7, 8, 9, and 10 for example. The average amount of drug product per ADC molecule after the conjugation reaction can be characterized by conventional methods, such as UV/Vis spectroscopy, mass spectrometry, ELISA assay and HPLC.

In one embodiment, the cytotoxic drug may be coupled to the N-terminal amino group of the ligand and/or the ε-amino group of the lysine residue through a linker. Generally, the cytotoxic drug can be coupled to the antibody in the coupling reaction. The number of drug molecules may be less than the theoretical maximum.

Ligand cytotoxic drug conjugate loading can be controlled by the following non-limiting methods, including:
(1) control the molar ratio of ligation reagent and monoclonal antibody,
(2) control the reaction time and temperature, and
(3) choose different reaction reagents.

For the preparation of conventional pharmaceutical compositions, see Chinese Pharmacopoeia.

The term "carrier" used in the drug of the present disclosure refers to a system capable of changing the way the drug enters the human body and its distribution in the body, controlling the release rate of the drug, or delivering the drug to the targeted organs. Drug carrier release and targeting systems may reduce drug degradation and loss, reduce side effects, and improve bioavailability. For example, polymer surfactants that may be used as carriers may self-assemble to form aggregates in various forms due to their unique amphiphilic structure. Useful examples are micelles, microemulsions, gels, liquid crystals, vesicles, etc. These aggregates have the ability to encapsulate drug molecules while having good permeability to the membrane and may be used as excellent drug carriers.

The term "excipient" refers to the additional substance in a pharmaceutical formulation other than the main drug, which may also be called adjuvant, such as binders, fillers, disintegrants, lubricants in tablets; the part of matrix base in semi-solid preparation of ointments and creams; and preservatives, antioxidants, flavoring agents, fragrances, adjuvants, solvents, emulsifiers, solubilizers, osmotic pressure regulators, colorants in liquid preparations, all of which may be called excipients.

The term "diluent" is also known as filler, the main purpose of which is to increase the weight and volume of the tablet. The addition of the diluent not only ensures a certain volume, but also reduces the dosage deviation of the main ingredients and improves the compression moldability of the drug. When the drug in the tablet contains oily components, it is necessary to add an absorbent to absorb the oily substances and keep them in a "dry" state to facilitate the production of tablets, such as starch, lactose, inorganic calcium salts, microcrystalline cellulose, etc.

The pharmaceutical compositions may be in the form of sterile injectable aqueous solutions. Among the acceptable vehicles and solvents that may be employed are water, Ringer's solution, and isotonic sodium chloride solution. Sterile injection formulation may be a sterile injectable oil-in-water microemulsion in which the active ingredient is dissolved in the oily phase. For example, the active ingredient may be dissolved in a mixture of soybean oil and lecithin. The oil solution is then processed into a mixture of water and glycerol to form microemulsions. Injections or microemulsions may be injected into a patient's bloodstream by local bolus injection and in a large quantity. Alternatively, solutions and microemulsions are preferably administered in a manner that maintains a constant circulating concentration of the compounds as disclosed herein. To maintain this constant concentration, a continuous intravenous drug delivery device may be used. An example of such a device is the Deltec CADD-PLUS™, Model 5400 intravenous pump.

The pharmaceutical compositions may be in the form of sterile injectable aqueous or oily suspensions for intramuscular and subcutaneous administration. This suspension may be formulated according to the known art using those suitable dispersing or wetting agents and suspending agents which have been mentioned above. The sterile injectable formulation may also be a sterile injectable solution or suspension in a nontoxic parenterally acceptable diluent or solvent, such as a solution in 1,3-butanediol. In addition, sterile fixed oils are conveniently employed as a solvent or suspending medium. For this purpose, any blended fixing oil may be employed, including synthetic mono- or diglycerides. In addition, fatty acids, such as oleic acid, may also be used in the preparation of injectables.

The present disclosure relates to a class of cleavable linkers with specific structure, drugs with specific structure, and antibody drug conjugates (ADCs) composed of a linker, a drug, and an antibody. Such ADCs are complexes formed by attaching a toxic substance to an antibody via a linker. The antibody-drug conjugate (ADC) is degraded in vivo to release active molecules, thereby playing a corresponding role.

Methods of Synthesis

Abbreviations and Definitions

Unless otherwise specified, the following terms and phrases as used herein are intended to have the following meanings. When a trade name is used herein, unless the context indicates otherwise, the trade name includes the product formulation, generic drug and active pharmaceutical ingredient of the trade name product.

The term "alkyl" refers to a saturated hydrocarbon group having 1-20 carbon atoms. Examples of alkylene groups include, but are not limited to, methyl (—$CH_3$), ethyl (—$CH_2$—$CH_3$), n-propyl, n-butyl, n-pentyl, and n-hexyl.

The term "substituted alkyl" means that the hydrogen in the alkyl group is replaced by a substituted group, and unless otherwise specified in the context, the substituent group of the alkyl group may be a variety of groups selected from the group consisting of: -halogen, —OR', —NR'R", —SR', —SiR'R"R''', —OC(O)R', —C(O)R', —$CO_2$R', —CONR'R", —OC(O)NR'R", —NR"C(O)R', —NR'—C(O)NR"R''', —NR"C(O)$_2$R', —NH—C($NH_2$)=NH, —NR'C($NH_2$)=NH, —NH—C($NH_2$)=NR', —S(O)R', —S(O)$_2$R', —S(O)$_2$NR'R", —NR'S(O)$_2$R", —CN and —$NO_2$, the number of substituents is 0 to (2m'+1), where m' is the total number of carbon atoms in the group. R', R" and R''' each independently refer to hydrogen, unsubstituted $C_{1-8}$ alkyl, unsubstituted aryl, aryl substituted with 1-3 halogens, unsubstituted $C_{1-8}$ alkyl, $C_{1-8}$ alkoxy or $C_{1-8}$ thioalkoxy, or unsubstituted aryl-$C_{1-4}$ alkyl. When R' and R" are attached to the same nitrogen atom, they may together with the nitrogen atom form a 3-, 4-, 5-, 6- or 7-membered ring. For example, —NR'R" may include 1-pyrrolidinyl and 4-morpholinyl.

"Acid amino acid" means that the isoelectric point of the amino acid is less than 7, and the acidic amino acid molecule often has one or more acid groups such as carboxyl groups, which can be effectively ionized into negative ions in the structure to increase hydrophilicity. Acidic amino acids may be natural or unnatural amino acids.

"Natural amino acid" refers to an amino acid that is biosynthesized. Natural amino acids are generally L-form, but there are a few exceptions, such as glycine, both natural and biosynthetic.

"Unnatural amino acid" refers to an amino acid obtained by synthetic means.

Ligand units are targeting agents that specifically bind to the target moiety. The ligands are capable of specifically binding to cellular components or to cellular components or to other target molecules of interest. The target moiety or target is usually on the cell surface. In some embodiments, the function of the ligand unit is to deliver the drug unit to a specific target cell population with which the ligand unit interacts. Ligands include, but are not limited to, proteins, polypeptides and peptides, as well as non-proteins, such as sugars. Suitable ligand units include, for example, antibodies, such as full-length (intact) antibodies and antigen-binding fragments thereof. In embodiments where the ligand unit is a non-antibody targeting agent, it may be a peptide or polypeptide, or a non-proteinaceous molecule. Examples of such targeting agents include interferons, lymphokines, hormones, growth and colony stimulating factors, vitamins, nutrient transport molecules, or any other cell binding molecule or substance. In some embodiments, the linker is covalently attached to the sulfur atom of the ligand. In some embodiments, the sulfur atom is that of a cysteine-SH residue, which forms an interchain disulfide bond of the antibody. In another aspect, the sulfur atom is one that has been introduced into a cysteine-SH residue of the ligand unit, which forms an interchain disulfide bond of the antibody. In another aspect, the sulfur atom is one that has been introduced into a cysteine-SH residue of the ligand unit (e.g., by site-directed mutagenesis or chemical reaction). In other aspects, the sulfur atom to which the linker binds is selected from cysteine-SH residues that form interchain disulfide bonds of the antibody or frontal cysteine-SH residues that have been introduced into the ligand unit (e.g., by site-directed mutagenesis or chemical reaction). In some embodiments, according to the EU index numbering system is used according to Kabat as described in Kabat E A et al., (1991), Sequences of proteins of Immunological Interest, Fifth Edition, NIH publication 91-3242.

As used herein, an "antibody" or "antibody unit" is within its scope to include any portion of an antibody structure. This unit may bind, reactively associate, or complex a receptor, antigen, or other receptor unit possessed by the targeted cell population. An antibody can be any protein or protein-like molecule that can bind, complex, or otherwise react with a portion of the cell population to be treated or bioengineered.

In the present disclosure, the antibody constituting the antibody-drug conjugate may maintain the antigen-binding ability of the original wild state. Therefore, the antibody of the present disclosure can, preferably, specifically bind to the antigen. Antigens involved include, for example, tumor-associated antigens (TAAs), cell surface receptor proteins and other cell surface molecules, regulators of cell survival, regulators of cell proliferation, molecules associated with tissue growth and differentiation (as known or predicted functional), lymphokines, cytokines, molecules involved in cell cycle regulation, molecules involved in angiogenesis, and molecules involved in angiogenesis (as known or predicted to be functional). Tumor-associated factors can be cluster differentiation factors (e.g., CD proteins). as described in the present disclosure.

Antibodies for use in antibody drug conjugates include, but are not limited to, antibodies directed against cell surface receptors and tumor-associated antigens. Such tumor-associated antigens are well known in the art and can be prepared by methods and information well known in the art for preparing antibodies. To develop effective cellular-level targets for cancer diagnosis and therapy, researchers seek to find transmembrane or other tumor-associated polypeptides. These targets can be specifically expressed on the surface of one or more cancer cells with little or no expression on the surface of one or more non-cancer cells. Typically, such tumor-associated polypeptides are more overexpressed on the surface of cancer cells relative to the surface of non-cancer cells. Identifying such tumor-associated factors could greatly improve the specific targeting properties of antibody-based cancer therapy.

Tumor-associated antigens include, but are not limited to, the tumor-associated antigens (1)-(36) listed below. For convenience, antigen-related information that is well known in the industry is indicated below, including name, other names, and GenBank accession numbers. Nucleic acid and protein sequences corresponding to tumor-associated antigens can be found in public databases, such as GenBank. Antibodies targeting corresponding tumor-associated antigens include all amino acid sequence variants and isotypes that are at least 70%, 80%, 85%, 90%, or 95% homologous to sequences identified in the reference, or have homology with the tumor-associated antigen sequences in the cited literature have completely identical biological properties and characteristics.

The terms "inhibit" or "inhibit" refer to reducing by a detectable amount or preventing completely.

The term "cancer" refers to a physiological condition or disease characterized by unregulated cell growth. "Tumor" includes cancer cells.

The term "autoimmune disease" is a disease or disorder that results from targeting an individual's own tissues or proteins.

As used herein, the phrase "pharmaceutically acceptable salt" refers to a pharmaceutically acceptable organic or inorganic salt of a compound (e.g., drug, drug-linker or ligand-linker-drug conjugate). The compounds may contain at least one amino or carboxyl group and thus may form addition salts with the corresponding acids or bases. Exemplary salts include, but are not limited to: sulfate, trifluoroacetate, citrate, acetate, oxalate, chloride, bromide, iodide, nitrate, bisulfate, phosphate, acid phosphate, isonicotinate, lactate, salicylate, acid citrate, tartrate, oleate, tannin, pantothenate, bitartrate, ascorbate, salicylate, formate, this formate, glutamate, methanesulfonate, ethanesulfonate, benzenesulfonate, p-toluenesulfonate, potassium salt, sodium salt, etc. Additionally, pharmaceutically acceptable salts have more than one charged atom in the structure. Examples where multiple charged atoms are part of a pharmaceutically acceptable salt can have multiple counter-atoms. For example, a pharmaceutically acceptable salt has one or more charged atoms and/or one or more counter atoms.

According to the mechanism of intracellular drug release, as used herein, "linkers" or "linkers of antibody drug conjugates" can be divided into two categories: non-cleavable linkers and cleavable linkers.

For antibody-drug conjugates containing non-cleavable linkers, the drug release mechanism is as follows: after the conjugate binds to the antigen and is endocytosed by the cell, the antibody is enzymatically hydrolyzed in the lysosome to release the small molecule drug, which is linked to the It is an active molecule composed of amino acid residues of antibodies. The resulting changes in the molecular structure of the drug do not reduce its cytotoxicity, but because the active molecule is charged (amino acid residues), it cannot penetrate adjacent cells. Therefore, such active drugs cannot kill adjacent tumor cells that do not express the target antigen (antigen-negative cells) (bystander effect) (Ducry et al., 2010, Bioconjugate Chem. 21:5-13).

EXAMPLES

The present disclosure will be further described below in conjunction with specific embodiments. These examples are only intended to illustrate the present disclosure and not to limit the scope of the present disclosure. Unless otherwise defined, all professional and scientific terms used herein have the same meanings as those familiar to those skilled in the art. In addition, any methods and materials similar or equivalent to those described can be used in the methods of the present disclosure. Methods and materials for preferred embodiments described herein are provided for illustrative purposes only.

Example 1

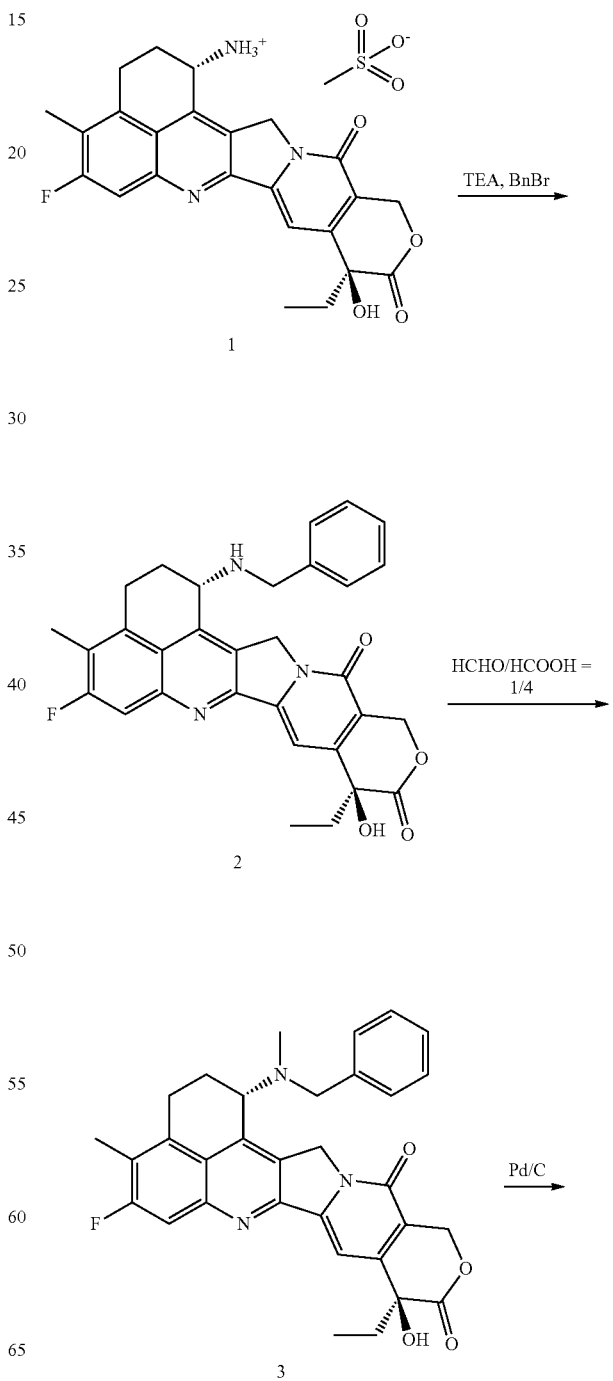

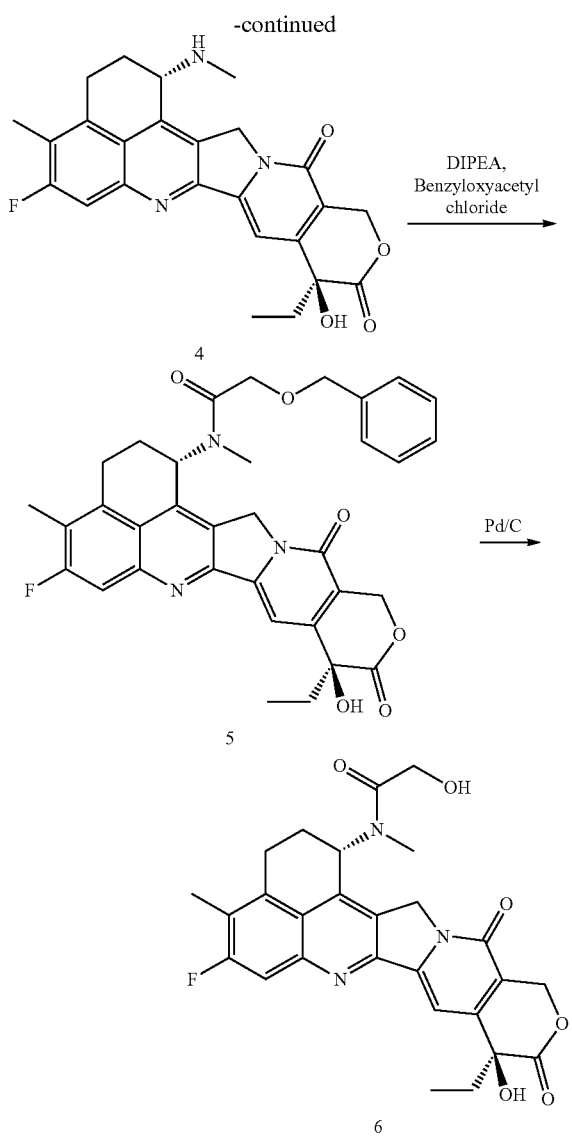

Synthesis of Compound 2

To exatecan mesylate 1 (150.0 mg, 282.4 umol, prepared by the method disclosed in the patent application "EP0737683A1"), 8 mL of DMF was added, cooled to 0° C. in an ice-water bath, and 5 drops of triethylamine were added dropwise, the pH was adjusted to 7-8, 2 drops of benzyl bromide were added dropwise in an ice-water bath, the temperature was raised to room temperature (25° C.), and the reaction was carried out for 1 hour. TLC monitored the reaction to complete the reaction. The reaction solution was concentrated under reduced pressure and purified by preparative HPLC (acetonitrile/pure water system), and the target peak was collected, and acetonitrile was removed under reduced pressure, the solution of product was lyophilized. About 110 mg Compound 2 was obtained as yellow solid, and the yield was about 74%, MS m/z: [M+H]+ 526.3.

Synthesis of Compound 3

At room temperature, Compound 2 (110 mg, 209.4 umol) was sequentially added to a 25 mL single-necked flask, 4 mL of formic acid was dissolved, 1 mL of formaldehyde (40% aqueous solution) was added to the resulting bright yellow solution, and the temperature was raised to 50° C. and reacted for 1 hour, TLC monitored the completion of the reaction. Cooled to room temperature, the reaction solution was purified by preparative high performance liquid chromatography (acetonitrile/pure water system), the target peak was collected, and acetonitrile was removed under reduced pressure, and lyophilized to obtain about 45 mg of Compound 3, yellow powdery solid, about 40% yield, MS m/z: [M+H]+ 540.6.

Synthesis of Compound 4

At room temperature, Compound 3 (23 mg, 42.7 umol) was added to a 25 mL single-neck flask, 2 mL of DMF was added to dissolve, 23 mg of 5% Pd/C was added to the resulting bright yellow solution, and the atmosphere in the system was replaced by a hydrogen balloon, and the room temperature was maintained. After 1.5 hours of reaction, HPLC monitored the completion of the reaction, filtered to remove Pd/C, the obtained reaction solution was concentrated, purified by preparative high performance liquid chromatography (acetonitrile/pure water system), the target peak was collected, and acetonitrile was removed under reduced pressure, lyophilized to obtain about 10 mg of Compound 4, yellow powdery solid, yield about 52%, MS m/z: [M+H]+ 450.5.

Synthesis of Compound 5

At room temperature, Compound 4 (10 mg, 22.3 umol) was added to a 5 mL bottle, 2 mL of DMF was added to dissolve, and DIPEA (7.8 μL, 2 eq), benzyloxyacetyl chloride (8.2 mg, 2 eq) were added to the resulting solution in turn. eq), maintained at room temperature for 0.5 hours, TLC monitored the completion of the reaction, the obtained reaction solution was concentrated, purified by preparative high performance liquid chromatography (acetonitrile/pure water system), collected the target peak, removed acetonitrile under reduced pressure, and lyophilized, about 11 mg of Compound 5 was obtained, yellow powdery solid, the yield was about 83%, MS m/z: [M+H]+ 598.3.

Synthesis of Compound 6

At room temperature, Compound 5 (11 mg, 18.4 umol) was added to a 25 mL single-neck flask, 1 mL of DMF was added to dissolve, 11 mg of 10% Pd/C was added to the obtained solution, and the atmosphere in the system was replaced by a hydrogen balloon, and the reaction was maintained at room temperature. After 1 hour, TLC monitored the completion of the reaction, filtered to remove Pd/C, the obtained reaction solution was concentrated, purified by preparative high performance liquid chromatography (acetonitrile/pure water system), collected the target peak, removed acetonitrile under reduced pressure, lyophilized, about 2.6 mg of Compound 6 was obtained, yellow powdery solid, yield about 28%, MS m/z: [M+H]+ 508.2.

Example 2

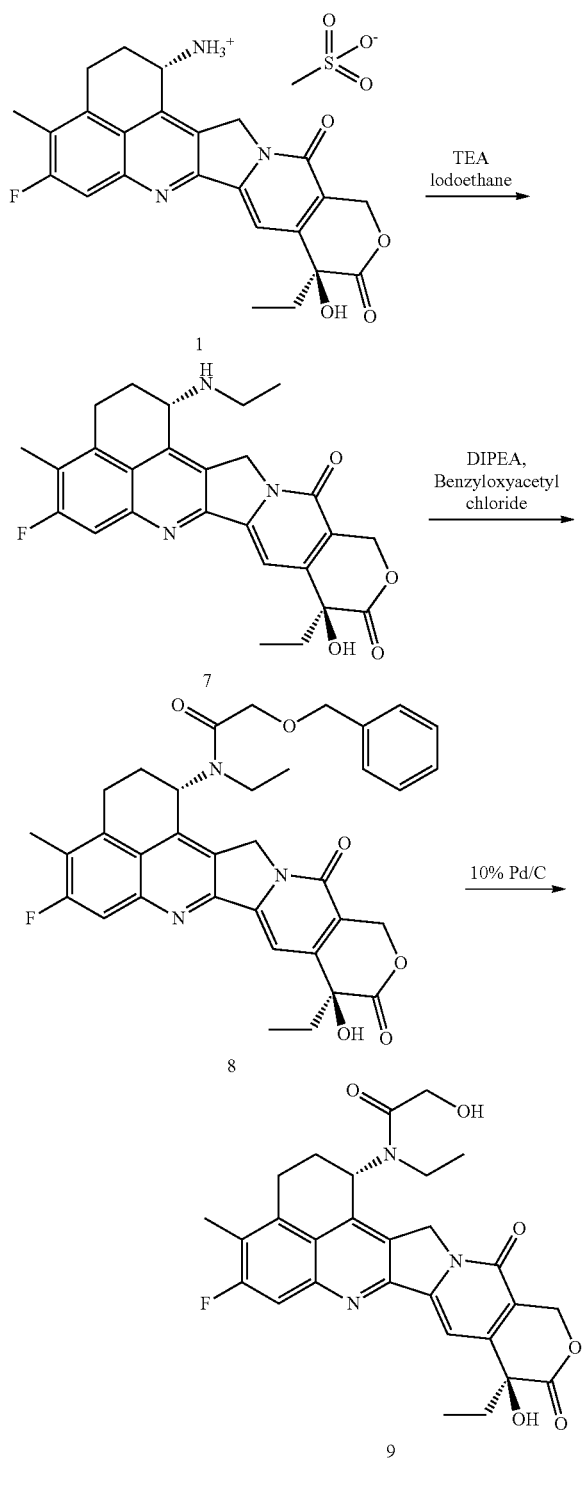

Synthesis of Compound 7

To exatecan mesylate 1 (100.0 mg, 188.3 umol, prepared by the method disclosed in the patent application "EP0737683A1"), add 4 mL of DMF, cool it to 0° C. in an ice-water bath, add dropwise triethylamine (105 μL, 4 eq), iodoethane (34 μL, 1.5 eq) was added dropwise in an ice-water bath, the temperature was raised to room temperature (25° C.) and reacted for 4 hours, the reaction solution was concentrated under reduced pressure, and the obtained crude product was subjected to preparative high performance liquid chromatography. Purified (acetonitrile/pure water system), collected the target peak, removed acetonitrile under reduced pressure, and lyophilized to obtain about 11 mg of Compound 7, yellow solid, yield about 13%, MS m/z: [M+H]+ 464.2.

Synthesis of Compound 8

At room temperature, Compound 7 (10 mg, 22 umol) was added to a 25 mL bottle, 2 mL of DMF was added to dissolve, and DIPEA (8 μL, 2 eq), benzyloxyacetyl chloride (8 mg, 2 eq) were added to the resulting solution in turn eq), maintained at room temperature for 0.5 hours, TLC monitored the completion of the reaction, the obtained reaction solution was concentrated, purified by preparative high performance liquid chromatography (acetonitrile/pure water system), collected the target peak, removed acetonitrile under reduced pressure, and lyophilized, about 8 mg of Compound 8 was obtained, yellow solid, yield about 60%, MS m/z: [M+H]+ 612.7.

Synthesis of Compound 9

At room temperature, Compound 8 (8 mg, 13.1 umol) was added to a 25 mL single-neck flask, 2 mL of DMF was added to dissolve, 8 mg of 10% Pd/C was added to the obtained solution, and the atmosphere in the system was replaced by a hydrogen balloon, and the reaction was maintained at room temperature. After 3 hours, Pd/C was removed by filtration, and TLC monitored the completion of the reaction. After the reaction solution was concentrated, it was purified by preparative-grade high performance liquid chromatography (acetonitrile/pure water system), and the target peak was collected, and after acetonitrile was removed under reduced pressure, lyophilized, about 3.5 mg of Compound 9 was obtained, yellow solid, yield about 51%, MS m/z: [M+H]+ 522.2.

Example 3

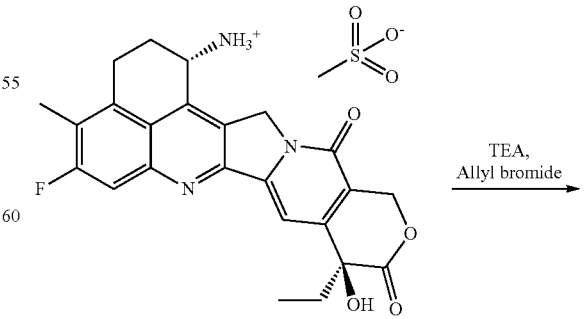

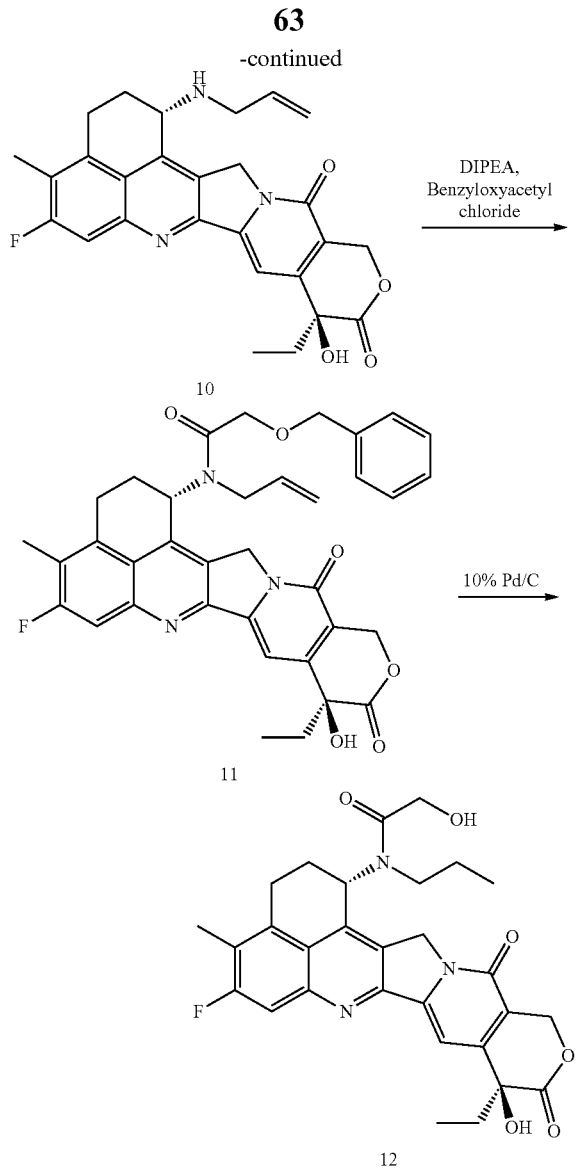

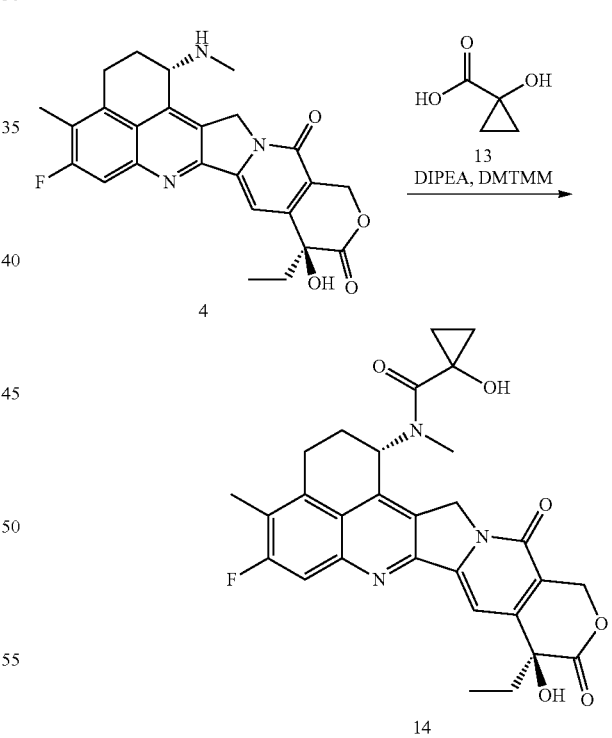

Synthesis of Compound 10

To exatecan mesylate 1 (100.0 mg, 188.3 umol, prepared by the method disclosed in the patent application "EP0737683A1"), add 4 mL of DMF, cool it to 0° C. in an ice-water bath, add dropwise triethylamine (105 μL, 4 eq), allyl bromide (24.4 μL, 1.5 eq) was added dropwise in an ice-water bath, the temperature was raised to room temperature (25° C.) and reacted for 4 hours, the reaction solution was concentrated under reduced pressure, and the obtained crude product was subjected to preparative high performance liquid chromatography. Purified (acetonitrile/pure water system), collected the target peak, removed acetonitrile under reduced pressure, and lyophilized to obtain Compound 10 about 13 mg, yellow solid, yield about 15%, MS m/z: [M+H]+ 476.2.

Synthesis of Compound 11

At room temperature, Compound 10 (10 mg, 21 umol) was added to a 25 mL bottle, 2 mL of DMF was added to dissolve, and DIPEA (8 μL, 2 eq), benzyloxyacetyl chloride (8 mg, 2 eq) were added to the resulting solution in turn eq), maintained at room temperature for 0.5 hours, HPLC monitored the completion of the reaction, the obtained reaction solution was concentrated, purified by preparative high performance liquid chromatography (acetonitrile/pure water system), collected the target peak, removed acetonitrile under reduced pressure, and lyophilized, about 7 mg of Compound 11 was obtained, yellow solid, yield about 53%, MS m/z: [M+H]+ 624.6.

Synthesis of Compound 12

At room temperature, Compound 11 (6 mg, 10 umol) was added to a 25 mL single-neck flask, 2 mL of DMF was added to dissolve, 6 mg of 10% Pd/C was added to the obtained solution, and the atmosphere in the system was replaced by a hydrogen balloon, and the reaction was maintained at room temperature. After 3 hours, Pd/C was removed by filtration, and TLC monitored the completion of the reaction. After the reaction solution was concentrated, it was purified by preparative-grade high performance liquid chromatography (acetonitrile/pure water system), and the target peak was collected, and after acetonitrile was removed under reduced pressure, lyophilized, about 2.7 mg of Compound 12 was obtained, yellow solid, about 50% yield, MS m/z: [M+H]+ 536.2.

Example 4

Synthesis of Compound 14

At room temperature, Compound 4 (3 mg, 6.7 umol) was added to a 10 mL flask, 2 mL of DMF was added to dissolve, cooled to 0° C. in an ice-water bath, and DIPEA (2.2 μL, 2 eq), 1-hydroxycyclopropyl formic acid 13 (1.4 mg, 2 eq) and 4-(4,6-dimethoxy-1,3,5-triazin-2-yl)-4-methylmorpholine chloride (DMTMM), (4 mg, 2 eq), were added to the solution in turn. Then maintained the reaction at 0° C. for 2 hours, TLC monitored the completion of the reaction, 5 mL of saturated NaCl aqueous solution was added to the resulting reaction solution at 0° C. to quench the reaction, and the aqueous phase was washed with ethyl acetate (10 mL×3) extraction, combined the organic phases, dried over anhydrous sodium sulfate, filtered, the filtrate was concentrated under reduced pressure, purified by preparative high performance liquid chromatography (acetonitrile/pure water system), collected the target peak, removed acetonitrile under reduced pressure, and lyophilized, about 1.6 mg of Compound 14 was obtained, yellow solid, yield about 45%, MS m/z: [M+H]+ 534.2.

Example 5

Compound 16

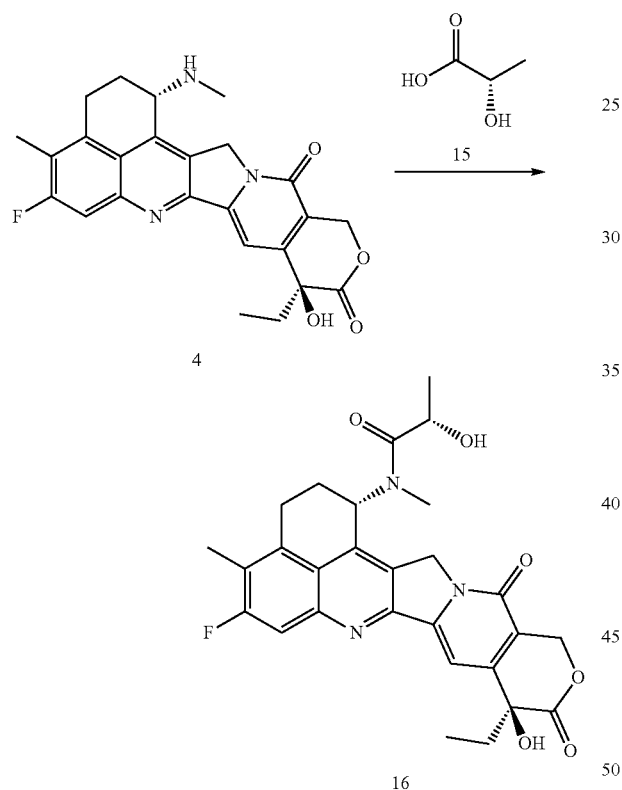

Synthesis of Compound 16

At room temperature, Compound 4 (3 mg, 6.7 umol) was added to a 10 mL bottle, 1 mL of absolute ethanol, 0.2 mL of DMF and 0.15 mL of NMM were added to dissolve, cooled to 0° C. in an ice-water bath, and L- (+)-lactic acid (2.4 mg, 4 eq), 1-hydroxybenzotriazole (HOBt) (3.7 mg, 4 eq) and N-(3-dimethylaminopropyl)-N'-ethylcarbodiimide hydrochloride (EDCl) (5.1 mg, 4 eq) was added in turn, then naturally warmed to room temperature and reacted for 2 hours. HPLC monitored the end of the reaction. The reaction solution was directly concentrated under reduced pressure, and purified by preparative high performance liquid chromatography (acetonitrile/pure water system), the target peak was collected, acetonitrile was removed under reduced pressure, and then lyophilized to obtain about 2 mg of Compound 16, a yellow solid with a yield of about 60%, MS m/z: [M+H]+ 522.2.

Example 6

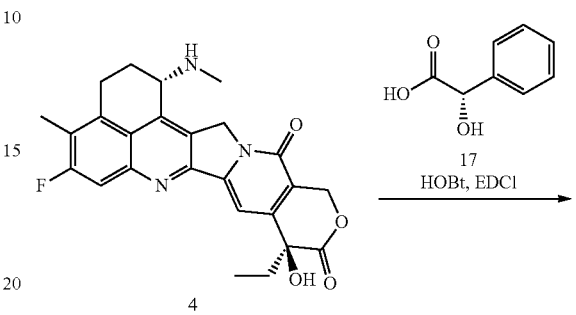

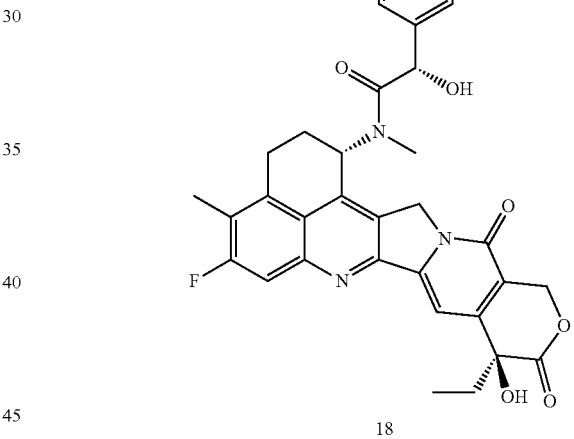

Synthesis of Compound 18

At room temperature, Compound 4 (3 mg, 6.7 umol) was added to a 10 mL flask, 1 mL of anhydrous ethanol, 0.2 mL of DMF and 0.15 mL of NMM were added to dissolve, cooled to 0° C. in an ice-water bath, and L-mandelic acid (4.1 mg, 4 eq), 1-hydroxybenzotriazole HOBt (3.7 mg, 4 eq) and N-(3-dimethylaminopropyl)-N'-ethylcarbodiimide hydrochloride EDCl (5.1 mg, 4 eq) were added to the resulting solution in turn, naturally warmed up to room temperature and reacted for 4 hours. TLC detected the end of the reaction. The reaction solution was directly concentrated under reduced pressure, purified by preparative-grade high performance liquid chromatography (acetonitrile/pure water system), and the target peak was collected, after removing acetonitrile under reduced pressure, lyophilized to obtain Compound 18 about 2.4 mg, yellow powdery solid, yield about 61%, MS m/z: [M+H]+ 584.1.

Example 7

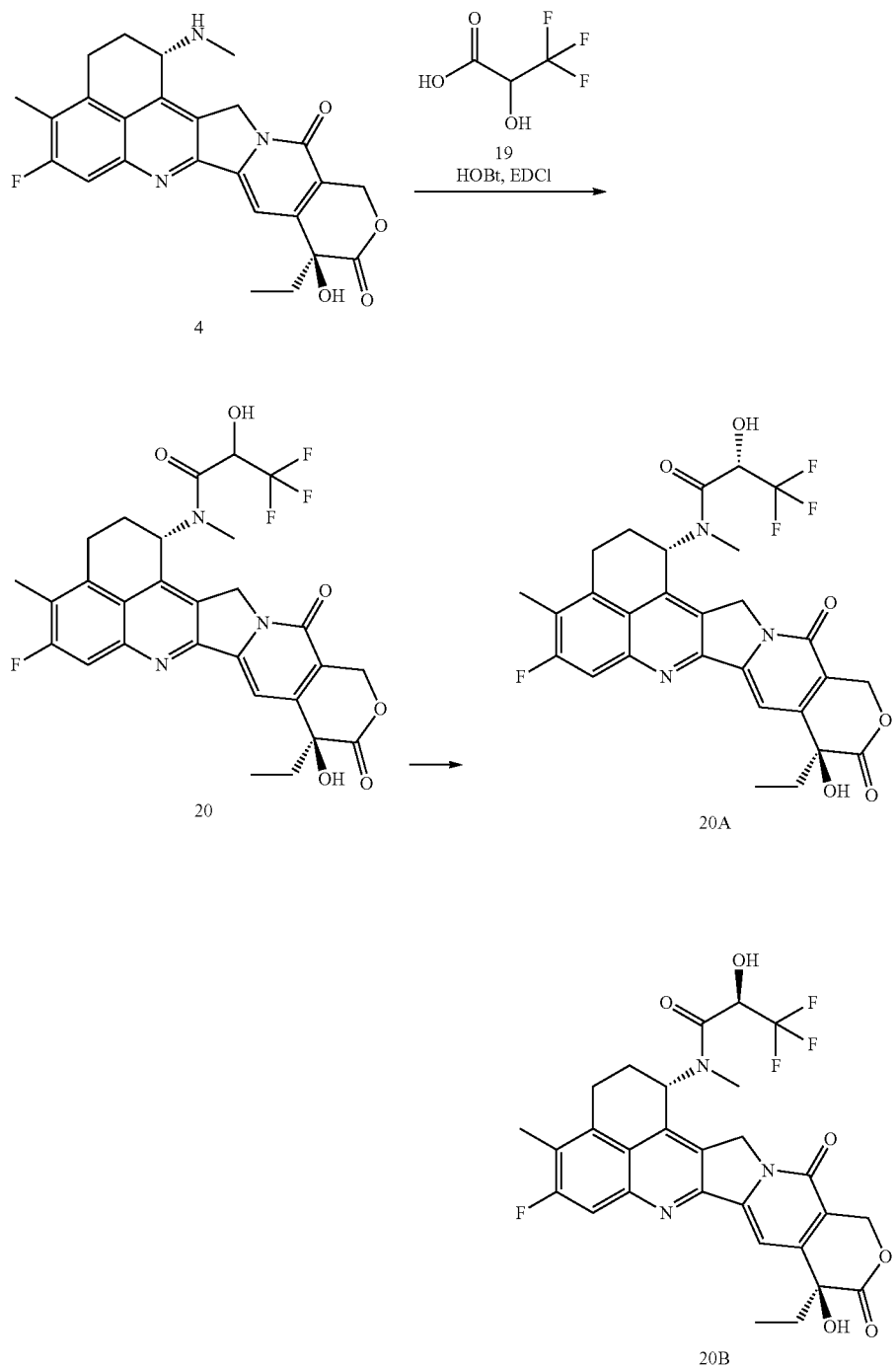

Synthesis of Compound 20

At room temperature, Compound 4 (3 mg, 6.7 umol) was added to a 10 mL flask, 1 mL of anhydrous ethanol, 0.2 mL of DMF and 0.15 mL of NMM were added to dissolve, cooled to 0° C. in an ice-water bath, and trifluoroacetic acid (3.9 mg, 4 eq), 1-hydroxybenzotriazole HOBt (3.7 mg, 4 eq) and N-(3-dimethylaminopropyl)-N'-ethylcarbodiimide hydrochloride EDCl (5.1 mg, 4 eq) were added to the resulting solution in turn, naturally warmed to room temperature and reacted for 1 hour, the reaction solution was directly concentrated under reduced pressure, purified by preparative-grade high performance liquid chromatography (acetonitrile/pure water system), the target peak was collected, and the acetonitrile was removed under reduced pressure, lyophilized to obtain Compound 20A about 1.2 mg, yellow powdery solid, Compound 20B about 1.2 mg, yellow powdery solid, yield about 61%, MS m/z: [M+H]+ 576.4.

Example 8

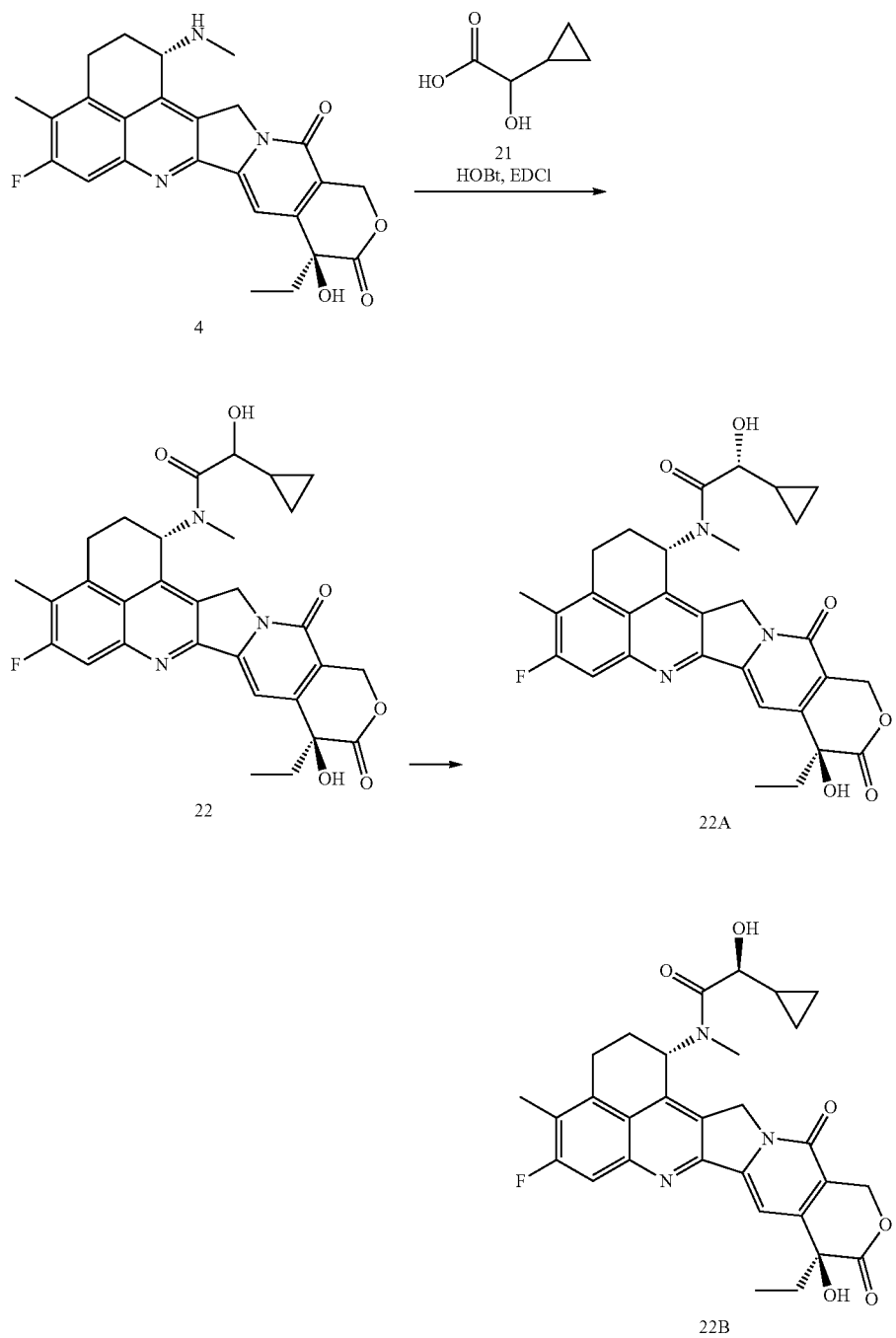

Synthesis of Compound 22

At room temperature, Compound 4 (4 mg, 8.9 umol) was added to a 10 mL flask, 1 mL of anhydrous ethanol, 0.2 mL of DMF and 0.15 mL of NMM were added to dissolve, cooled to 0° C. in an ice-water bath. Compound 21 (4.1 mg, 4 eq, prepared by the method disclosed in patent application "WO2013106717"), 1-hydroxybenzotriazole HOBt (3.7 mg, 4 eq) and N-(3-dimethylaminopropyl)-N'-ethylcarbodiimide hydrochloride EDCl (5.1 mg, 4 eq) were added to the solution in turn. Then the reaction was naturally warmed to room temperature and reacted for 2 hours. TLC monitored the end of the reaction. The reaction solution was directly concentrated under reduced pressure and purified by preparative high performance liquid chromatography (acetonitrile/pure water system), collect the target peak, remove acetonitrile under reduced pressure, and lyophilized to obtain about 1.5 mg of Compound 22A, yellow solid, about 1.5 mg of Compound 22B, yellow solid, yield about 59%, MS m/z: [M+H]+ 576.1.

Example 9
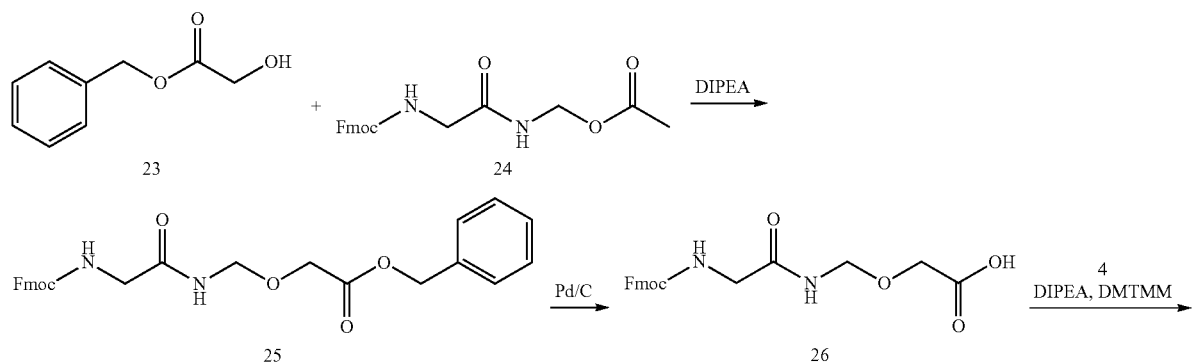
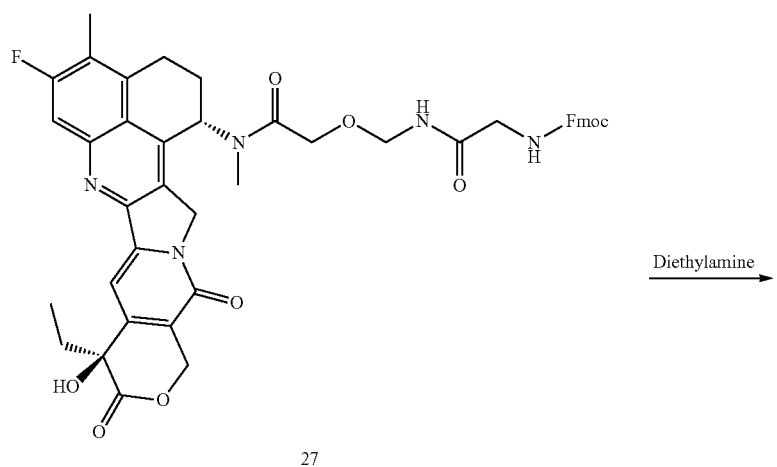
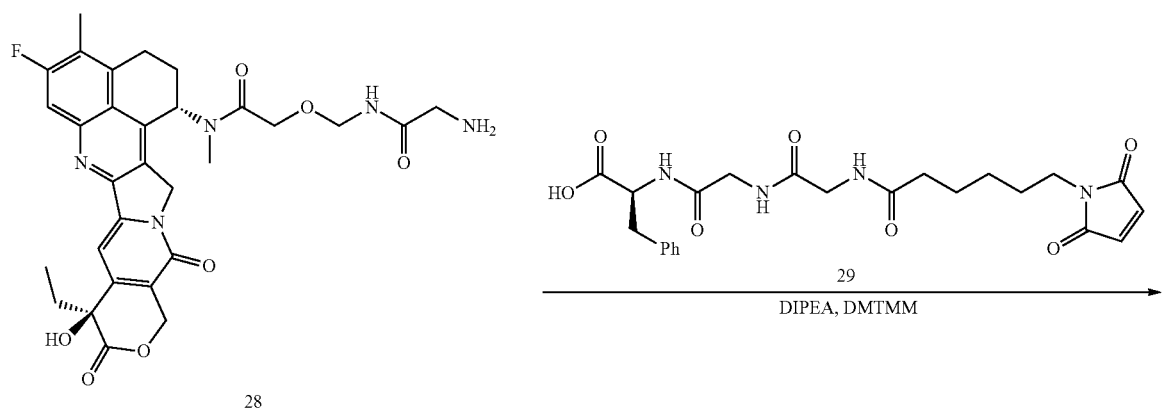

-continued

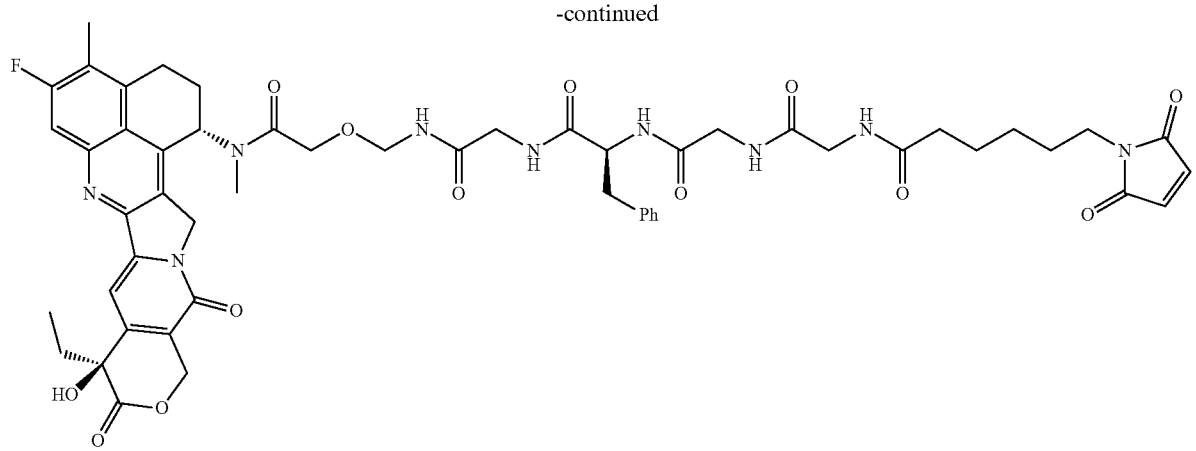

Synthesis of Compound 25

At 0° C., Compound 23 (800 mg, 4.8 mmol) was added to a 50 mL single-neck flask, 50 mL of DMF was added, DIPEA (0.8 mL, 1 eq) and compound 24 (1767.0 mg, 1 eq) were added to the resulting solution. After naturally warming up to room temperature and reacting for 2 hours, the reaction solution was directly concentrated under reduced pressure, purified by preparative high performance liquid chromatography (acetonitrile/pure water system), collected the target peak, removed acetonitrile under reduced pressure, and lyophilized to obtain Compound 25 About 727 mg, yellow solid, about 32% yield, MS m/z: [M+H]+ 475.5.

Synthesis of Compound 26

At room temperature, Compound 25 (727 mg, 1.5 mmol) was added to a 25 mL single-neck flask, 15 mL of DMF was added to dissolve, 750 mg of 5% Pd/C was added to the obtained solution, and the atmosphere in the system was replaced by a hydrogen balloon, and the reaction was maintained at room temperature. After 3 hours, after monitoring the completion of the reaction by TLC, the Pd/C was removed by filtration, and the obtained reaction solution was concentrated and used directly for the next reaction.

Synthesis of Compound 27

At room temperature, Compound 26 was added to a 25 mL flask, 15 mL of DMF was added to dissolve, cooled to 0° C. in an ice-water bath, and DIPEA (47 µL, 2 eq), compound 4 (1343.3 mg, 2 eq) and 4-(4,6-Dimethoxy-1,3,5-triazin-2-yl)-4-methyl morpholine chloride salt (DMTMM, 884 mg, 2 eq) were added to the resulting solution in sequence. Then maintained at 0° C. for reaction 2 5 mL of saturated aqueous NaCl solution was added to the obtained reaction solution to quench the reaction, the aqueous phase was extracted with ethyl acetate (10 mL×3), the organic phases were combined, dried over anhydrous sodium sulfate, filtered, and the filtrate was Concentrated under reduced pressure, purified by preparative high performance liquid chromatography (acetonitrile/pure water system), collected the target peak, removed acetonitrile under reduced pressure, and lyophilized to obtain about 311 mg of Compound 27 as a yellow solid, with a two-step yield of about 25%, MS m/z: [M+H]+ 816.9.

Synthesis of Compound 28

At 0° C., Compound 27 (310 mg, 0.38 mmol) was added to a 25 mL single-neck flask, 5 mL of DMF was added to dissolve, and Diethylamine (80 µL, 0.76 mmol) was added to the resulting solution, and the temperature was naturally raised to room temperature, and the reaction was maintained at room temperature. After 3 hours, the obtained reaction solution was concentrated and used directly for the next reaction.

Synthesis of Compound 30

At room temperature, Compound 28 was added to a 10 mL single-neck flask, 5 mL of DMF was added to dissolve, cooled to 0° C. in an ice-water bath, and DIPEA (126 µL, 2 eq), Compound 29 (178 mg, 1 eq) and 4-(4,6-dimethoxy-1,3,5-triazin-2-yl)-4-methylmorpholine chloride (DTMMM, 224 mg, 2 eq) were sequentially added to the resulting solution. Maintained at 0° C. The reaction was completed for 2 hours, TLC monitoring was completed, 10 mL of saturated NaCl aqueous solution was added to the obtained reaction solution to quench the reaction, the aqueous phase was extracted with ethyl acetate (20 mL×3), the organic phases were combined, dried over anhydrous sodium sulfate, filtered. The filtrate was concentrated under reduced pressure, purified by preparative high performance liquid chromatography (acetonitrile/pure water system), collected the target peak, removed acetonitrile under reduced pressure, and lyophilized to obtain about 15 mg of Compound 30 as a yellow solid, two-step yield about 1.4%, MS m/z: [M+H]+ 1048.1.

Example 10

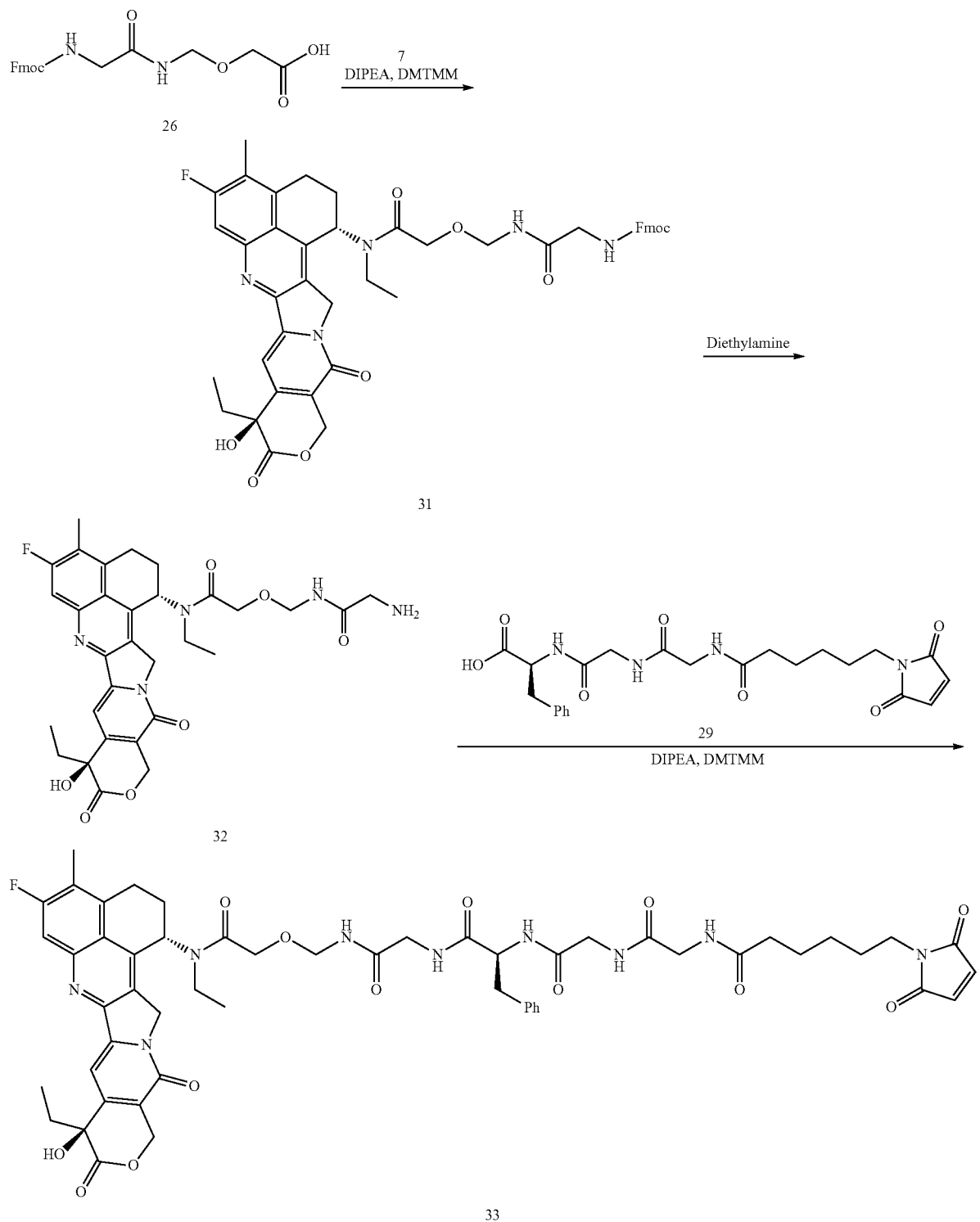

Synthesis of Compound 31

At room temperature, Compound 26 (50 mg, 0.13 mmol) was added to a 25 mL bottle, 5 mL of DMF was added to dissolve, cooled to 0° C. in an ice-water bath, and DIPEA (43 µL, 2 eq), compound 7 (60 mg, 1 eq) and 4-(4,6-dimethoxy-1,3,5-triazin-2-yl)-4-methylmorpholine chloride (DTMMM, 77 mg, 2 eq) were sequentially added, the reaction was maintained at 0° C. for 4 hours, the completion of the reaction was monitored by TLC, 15 mL of water was added to the resulting reaction solution to quench the reaction, the aqueous phase was extracted with ethyl acetate (20 mL×3), the organic phases were combined, and dried over anhydrous sodium sulfate, filtered, the filtrate was concentrated under reduced pressure, purified by preparative-grade high performance liquid chromatography (acetonitrile/pure water system), collected the target peak, removed acetonitrile under reduced pressure, and lyophilized to obtain about 36 mg of Compound 31 as a yellow solid, which was collected Yield about 33%, MS m/z: [M+NH4]+ 847.4.

Synthesis of Compound 32

At 0° C., Compound 31 (36 mg, 43 umol) was added to a 25 mL single-neck flask, 5 mL of DMF was added to dissolve, and diethylamine (9 µL, 87 umol) was added to the resulting solution, and the temperature was naturally raised to room temperature, and the reaction was maintained at room temperature. After 2 hours, the obtained reaction solution was concentrated and used directly for the next reaction.

Synthesis of Compound 33

At room temperature, Compound 32 was added to a 10 mL single-neck flask, 2 mL of DMF was added to dissolve, cooled to 0° C. in an ice-water bath, and DIPEA (7 µL, 2 eq), Compound 29 (30 mg, 1.5 eq) and 4-(4,6-dimethoxy-1,3,5-triazin-2-yl)-4-methyl morpholine chloride (DTMMM, 25 mg, 2 eq) were sequentially added to the resulting solution. Maintained at 0° C. after the reaction was completed for 3 hours, TLC monitored the end of the reaction, 5 mL of saturated NaCl aqueous solution was added to the obtained reaction solution to quench the reaction, the aqueous phase was extracted with ethyl acetate (10 mL×3), the organic phases were combined, dried over anhydrous sodium sulfate, filtered. The filtrate was concentrated under reduced pressure, purified by preparative high performance liquid chromatography (acetonitrile/pure water system), collected the target peak, removed acetonitrile under reduced pressure, and lyophilized to obtain Compound 33 about 6 mg, yellow solid, two-step yield about 8.4%, MS m/z: [M+H]+ 1662.4.

Example 11

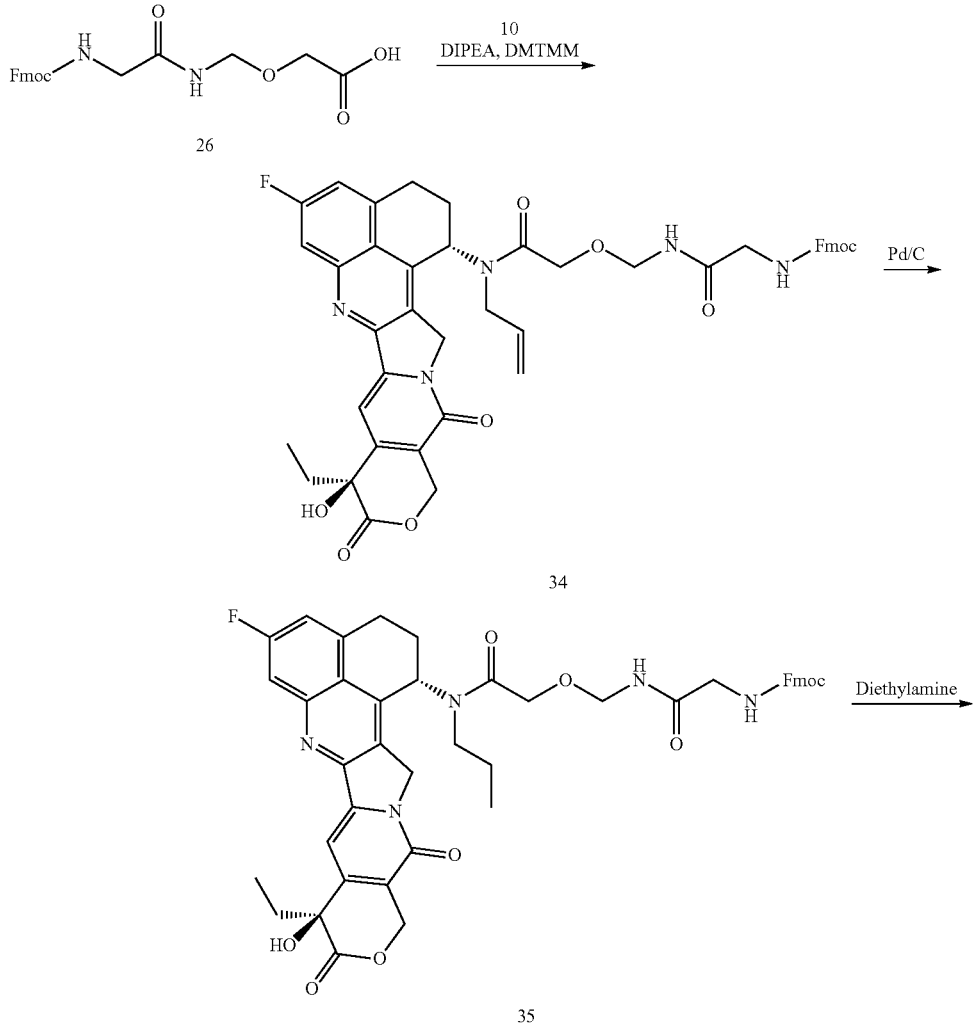

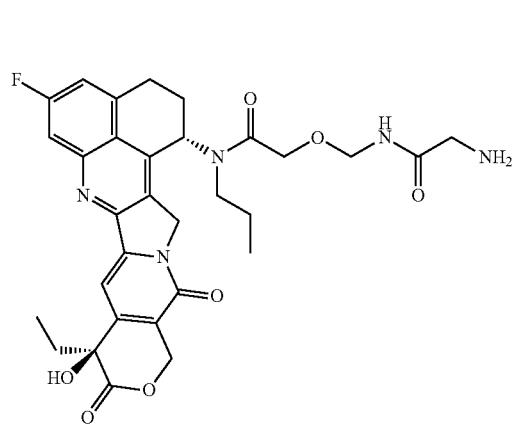

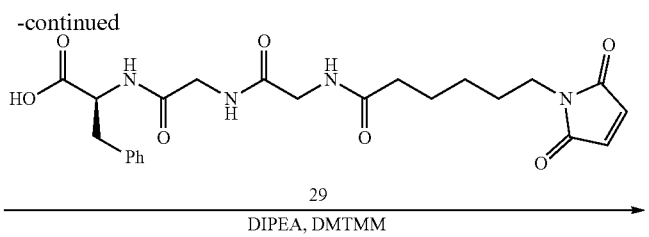

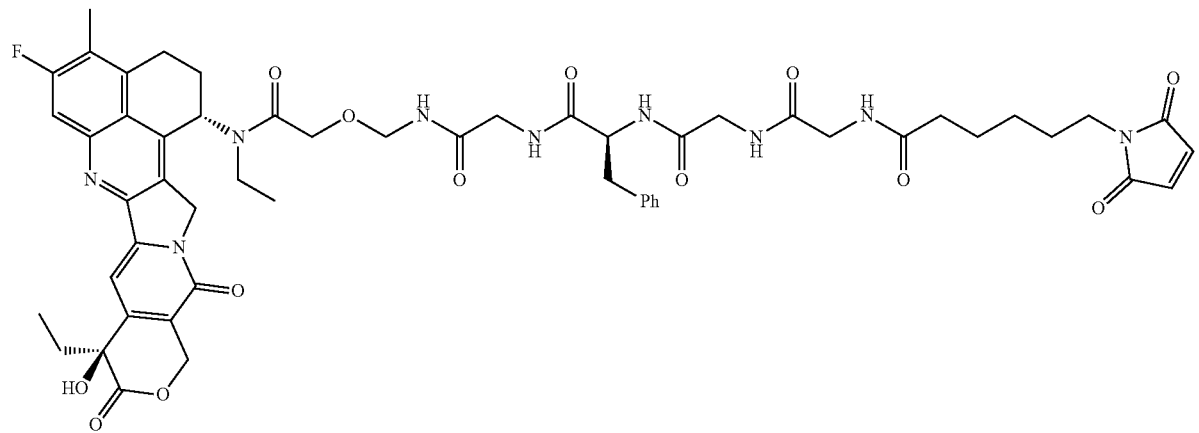

Synthesis of Compound 34

Referring to the synthesis of Compound 27, Compound 26 was used with 48 mg to obtain yellow solid Compound 34, 23 mg, yield 22%, MS m/z: [M+H]+ 828.4.

Synthesis of Compound 35

At room temperature, Compound 34 (23 mg, 28 umol) was added to a 25 mL bottle, 5 mL of DMF was added to dissolve, 10% Pd/C (23 mg) was added to the resulting solution, the atmosphere in the reaction bottle was replaced by H2 balloon three times, and HPLC monitored after the reaction is complete, the Pd/C is removed by filtration, and the obtained filtrate is concentrated under reduced pressure by an oil pump, purified by preparative high performance liquid chromatography (acetonitrile/pure water system), and the target peak is collected. After the acetonitrile is removed under reduced pressure, freeze-dried to obtain Compound 35 about 11 mg, yellow solid, yield about 47%, MS m/z: [M+H]+ 830.6.

Synthesis of Compound 36

Referring to the synthesis of Compound 28, Compound 35 was used with 11 mg to obtain yellow solid compound 36, about 6 mg of yellow solid, yield 74%, MS m/z: [M+H]+ 608.5.

Synthesis of Compound 37

Referring to the synthesis of Compound 30, the input amount was 6 mg, and 2.6 mg of yellow solid Compound 37 was obtained, with a yield of about 25%, MS m/z: [M+H]+ 1062.6.

Example 12

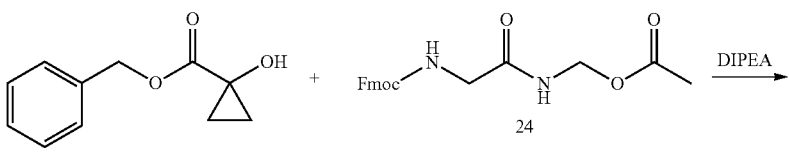

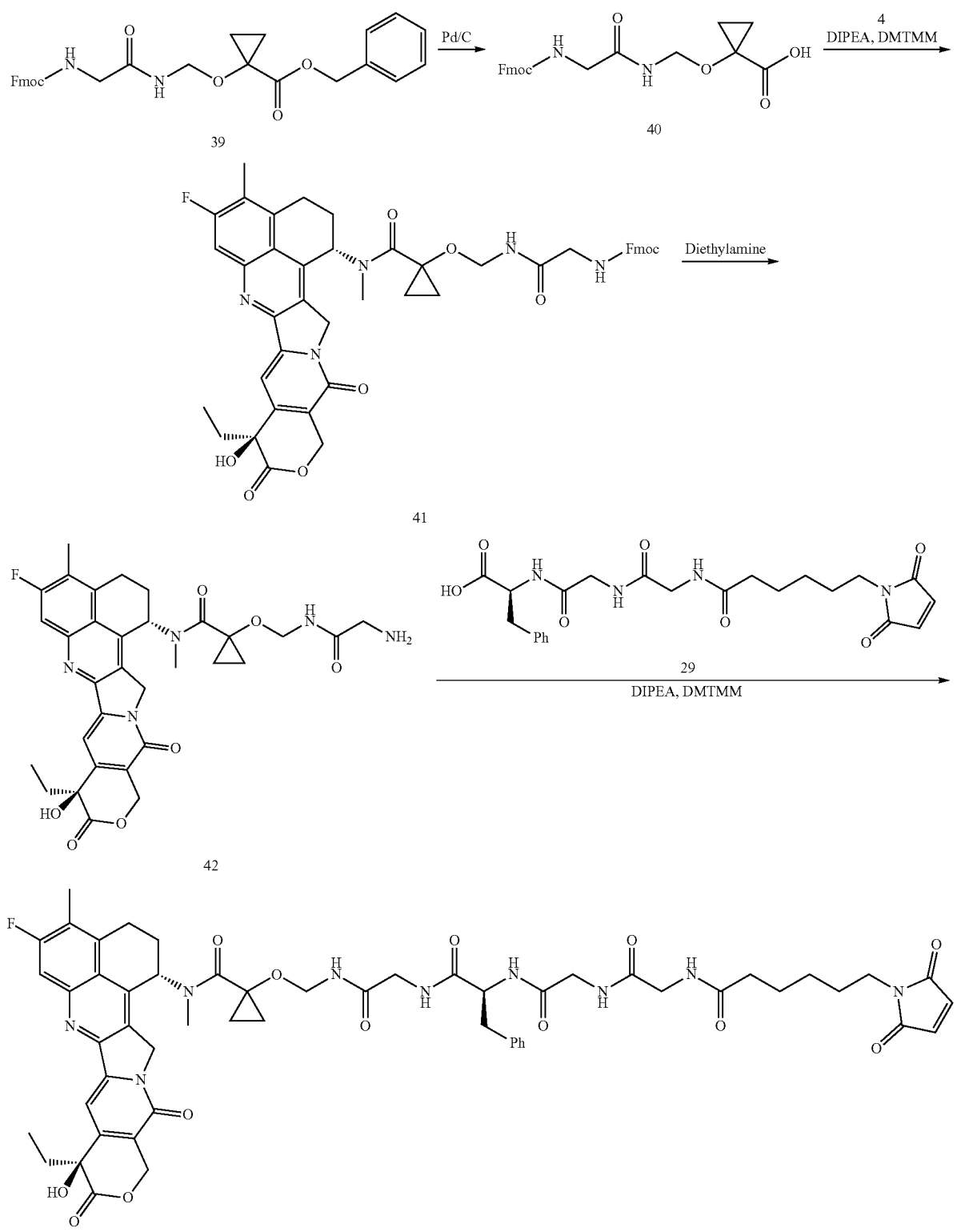

Synthesis of Compound 39

Referring to the synthesis of compound 25, compound 38 (31 mg, 161 umol) was used to obtain compound 39, 52 mg, yield 65%, MS m/z: [M+H]+ 501.4.

Synthesis of Compound 40

Referring to the synthesis of Compound 26, Compound 39 (51 mg, 100 umol) was used to obtain Compound 40, which was directly used in the next reaction without purification.

Synthesis of Compound 41

Referring to the synthesis of Compound 27, Compound 40 (measured according to Compound 39) gave Compound 41, 21 mg, two-step yield 25%, MS m/z: [M+H]+ 842.4.

Synthesis of Compound 42

Referring to the synthesis of Compound 28, Compound 41 (21 mg, 25 umol) was used to obtain yellow solid Compound 42, about 9 mg, yield 58%, MS m/z: [M+H]+ 620.2.

Synthesis of Compound 43

Referring to the synthesis of Compound 30, the input amount was 5 mg, and 1.4 mg of yellow solid Compound 43 was obtained with a yield of about 16%, MS m/z: [M+H]+ 1074.5.

Example 13

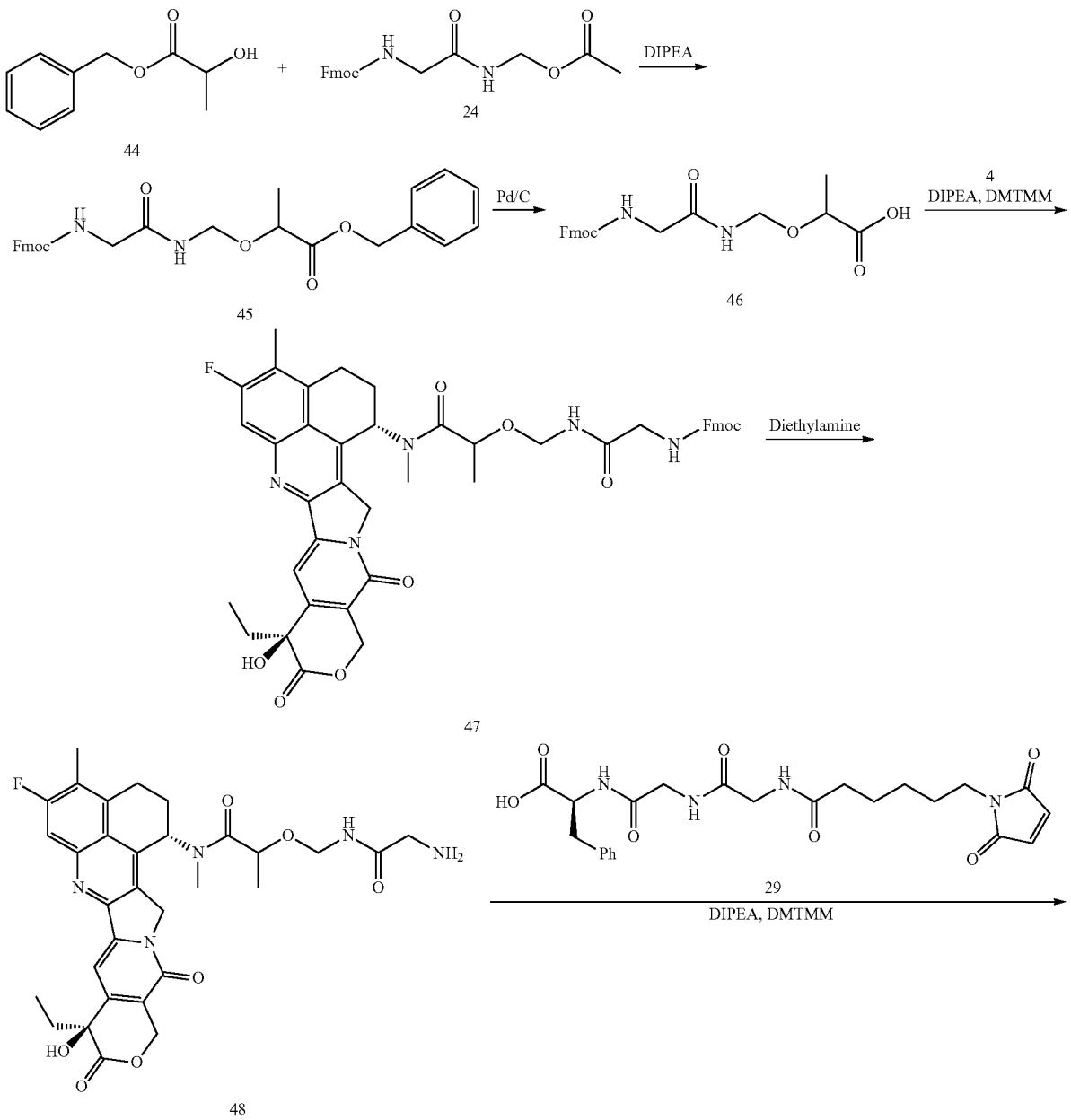

-continued

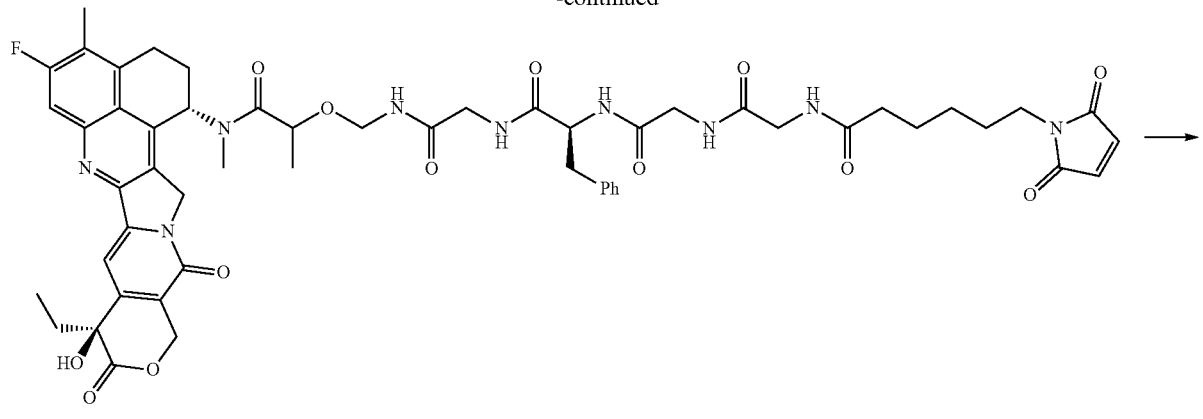

49

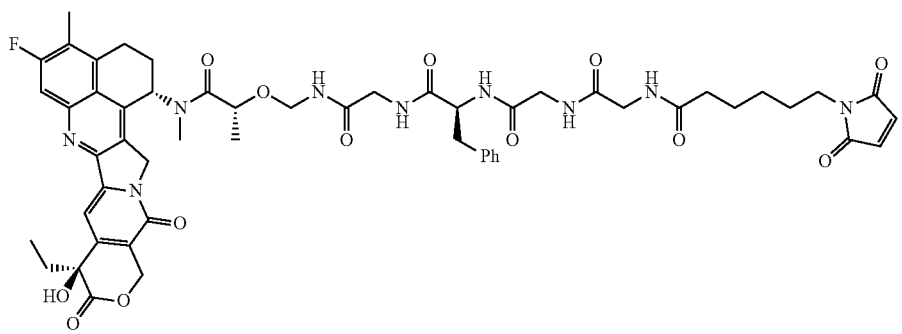

49A

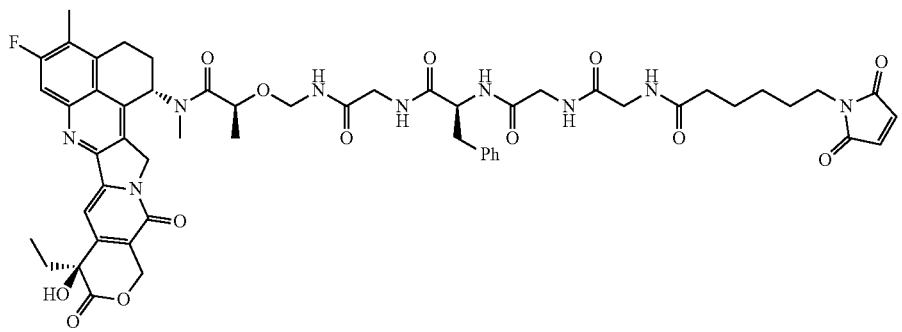

49B

Synthesis of Compound 45

Referring to the synthesis of Compound 25, compound 44 (25 mg, 139 umol) was used to obtain yellow solid Compound 45, 50 mg, yield 74%, MS m/z: [M+H]+ 488.3.

Synthesis of Compound 46

Referring to the synthesis of Compound 26, compound 45 (50 mg, 100 umol) was used to obtain yellow solid Compound 46, which was directly used in the next reaction without purification.

Synthesis of Compound 47

Referring to the synthesis of Compound 27, Compound 46 was used according to Compound 45 to obtain yellow solid Compound 47, 28 mg, two-step yield 33%, MS m/z: [M+H]+ 830.4.

Synthesis of Compound 48

Referring to the synthesis of Compound 28, 27 mg of Compound 47 was used to obtain yellow solid compound 48, about 11 mg, yield 56%, MS m/z: [M+H]+ 608.5.

Synthesis of Compound 49

Referring to the synthesis of Compound 30, 10 mg of Compound 48 was used, and 2.6 mg of yellow solid Compound 49 was obtained with a yield of about 15%, MS m/z: [M+H]+ 1062.4.

Example 14
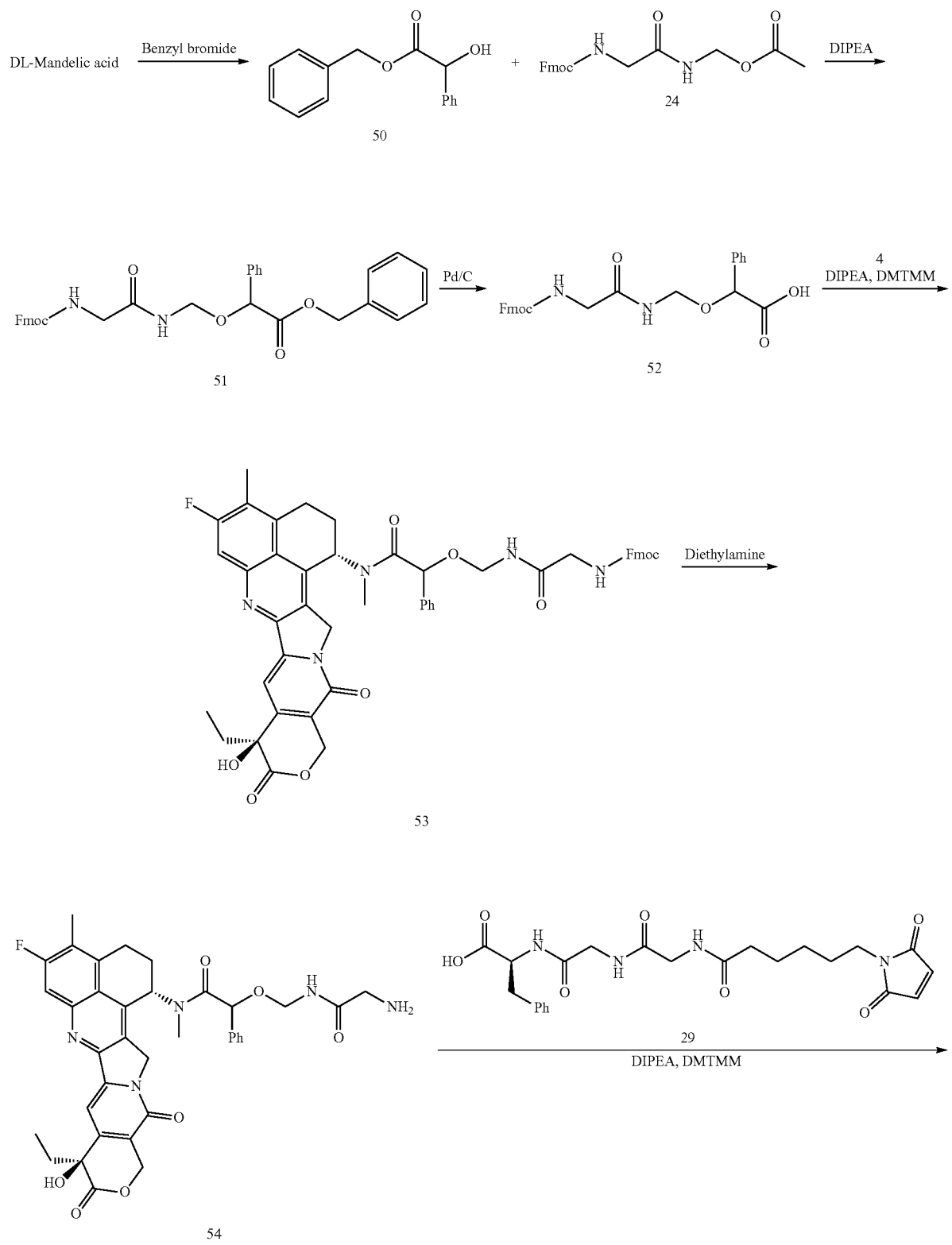

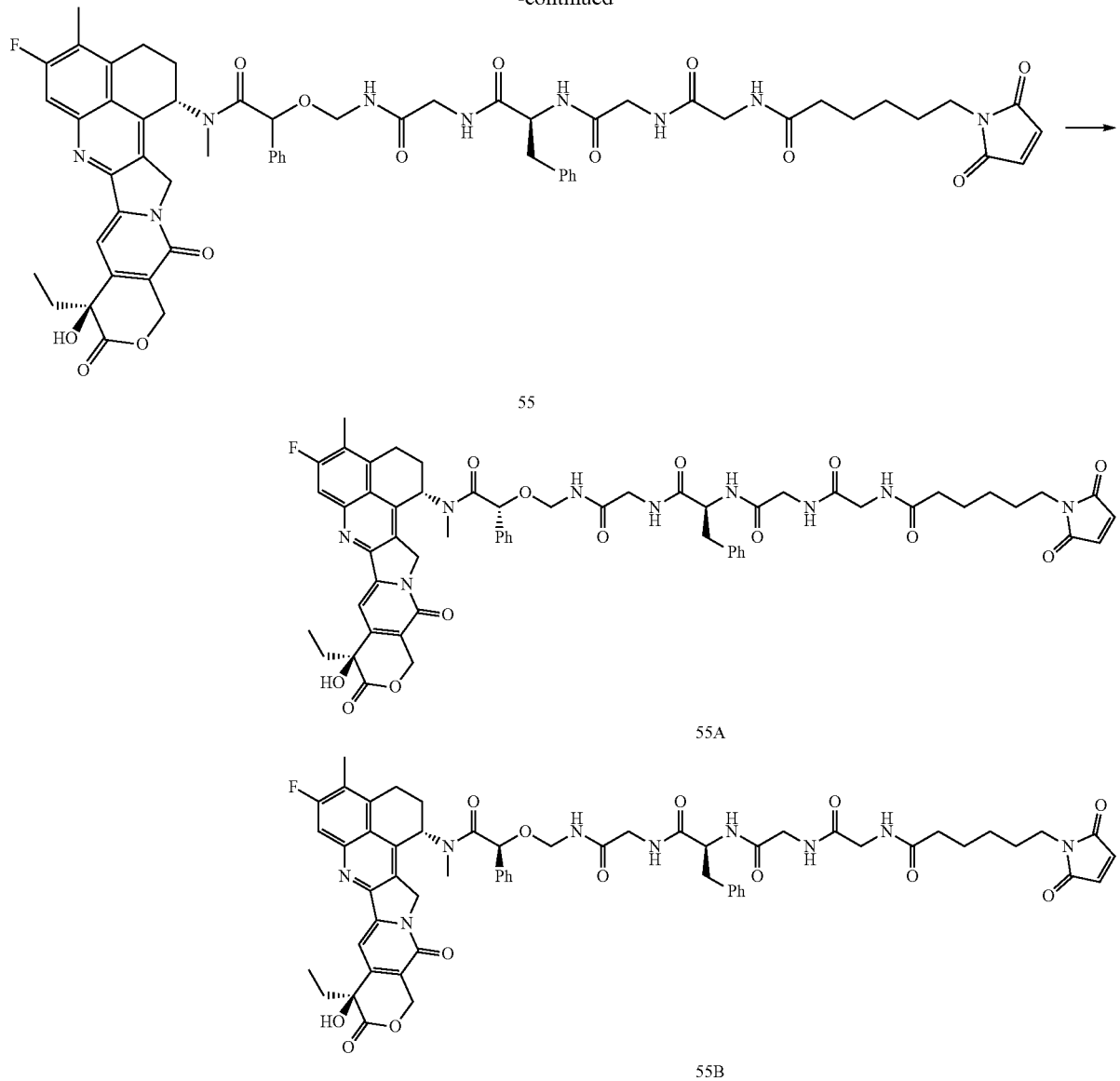

55

55A

55B

Synthesis of Compound 50

It was prepared with reference to the synthetic method of the known document "Organic Letters, 2012, 14(18), 4910-4913.".

Synthesis of Compound 51

Referring to the synthesis of Compound 25, Compound 50 (30 mg, 124 umol) was used to obtain yellow oily Compound 51, 47 mg, yield 82%, MS m/z: [M+H]+ 461.1.

Synthesis of Compound 52

Referring to the synthesis of Compound 26, Compound 51 (46 mg, 100 umol) was used and the product was used directly for the next reaction without purification.

Synthesis of Compound 53

Referring to the synthesis of Compound 27, Compound 52 was used according to Compound 51 to obtain yellow solid Compound 53, 35 mg, two-step yield 39%, MS m/z: [M+H]+ 892.1.

Synthesis of Compound 54

Referring to the synthesis of Compound 28, 10 mg of Compound 53 was used to obtain yellow solid Compound 54, about 4 mg, yield 54%, MS m/z: [M+H]+ 670.0.

Synthesis of Compound 55

Referring to the synthesis of Compound 30, 4 mg of Compound 54 was used, and 1.8 mg of yellow solid Compound 55 was obtained with a yield of about 27%, MS m/z: [M+H]+ 1124.4.

Example 15
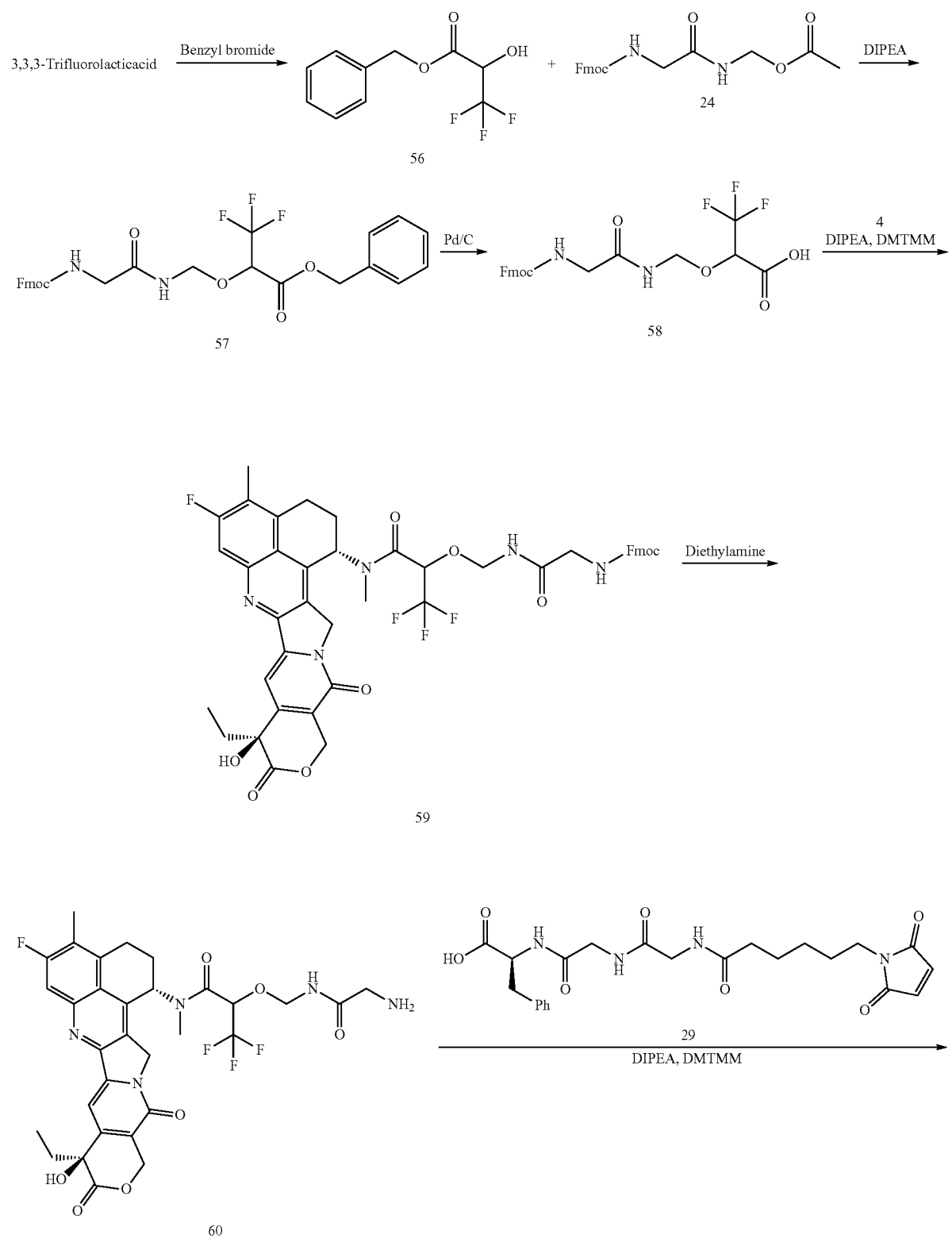

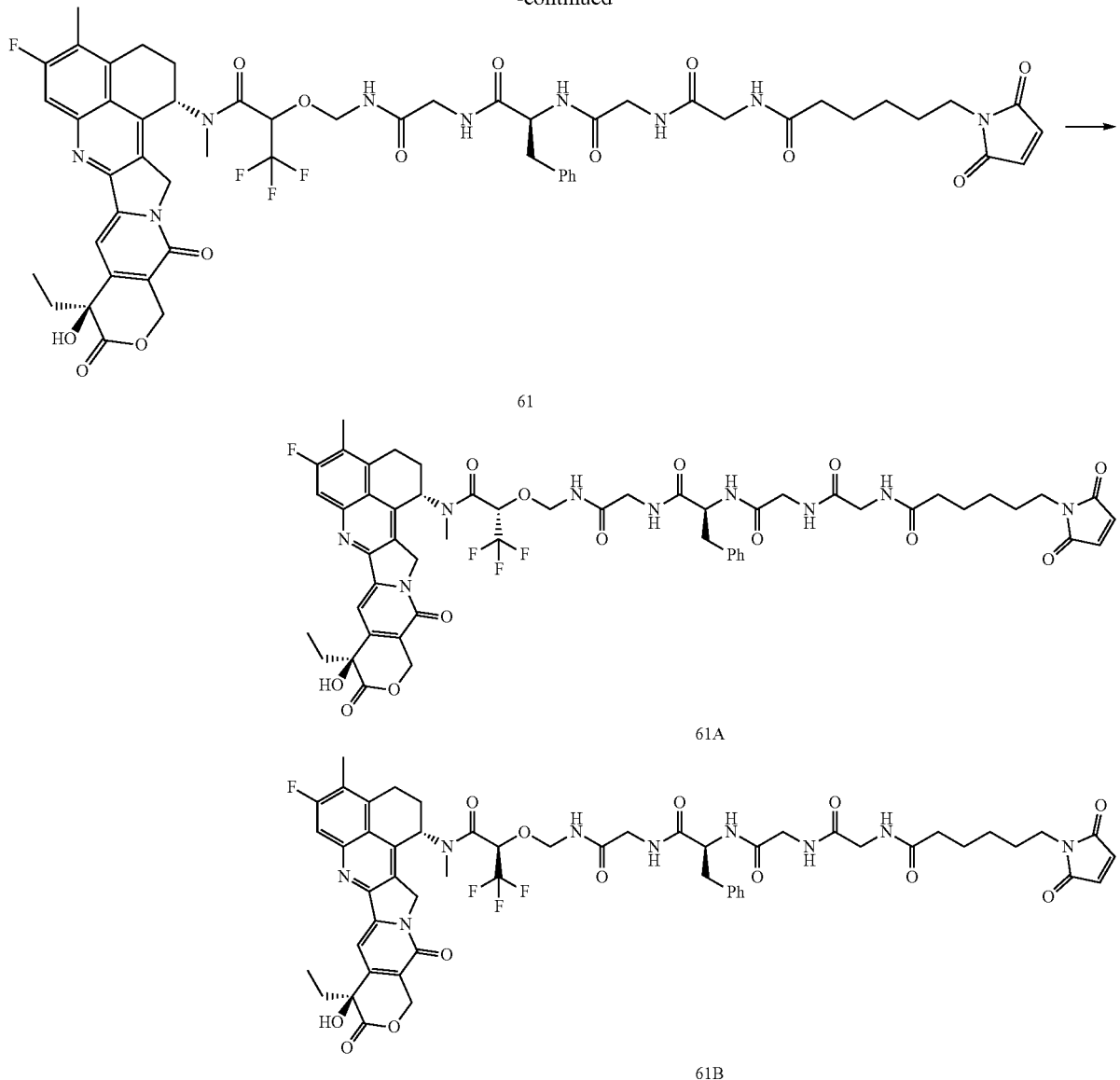

Synthesis of Compound 56

Prepared by referring to the synthetic method of the known method "Patent No: WO 2020063673".

Synthesis of Compound 57

Referring to the synthesis of Compound 25, Compound 56 (50 mg, 214 umol) was used to obtain 24 mg of yellow oily compound, yield 21%, MS m/z: [M+H]+ 543.1.

Synthesis of Compound 58

Referring to the synthesis of Compound 26, Compound 57 (24 mg, 44 umol) was used and the product was used for the next reaction without purification.

Synthesis of Compound 59

Referring to the synthesis of Compound 27, Compound 58 was used according to Compound 57 to obtain 15 mg of Compound 59, with a two-step yield of 39%, MS m/z: [M+H]+ 884.3.

Synthesis of Compound 60

Referring to the synthesis of Compound 28, 15 mg of Compound 59 was used to obtain Compound 60, about 4 mg, yield 36%, MS m/z: [M+H]+ 662.7.

Synthesis of Compound 61

Referring to the synthesis of Compound 30, 4 mg of Compound 60 was used, and 2.2 mg of yellow solid Compound 61 was obtained with a yield of about 33%, MS m/z: [M+H]+ 1116.7.

Example 16
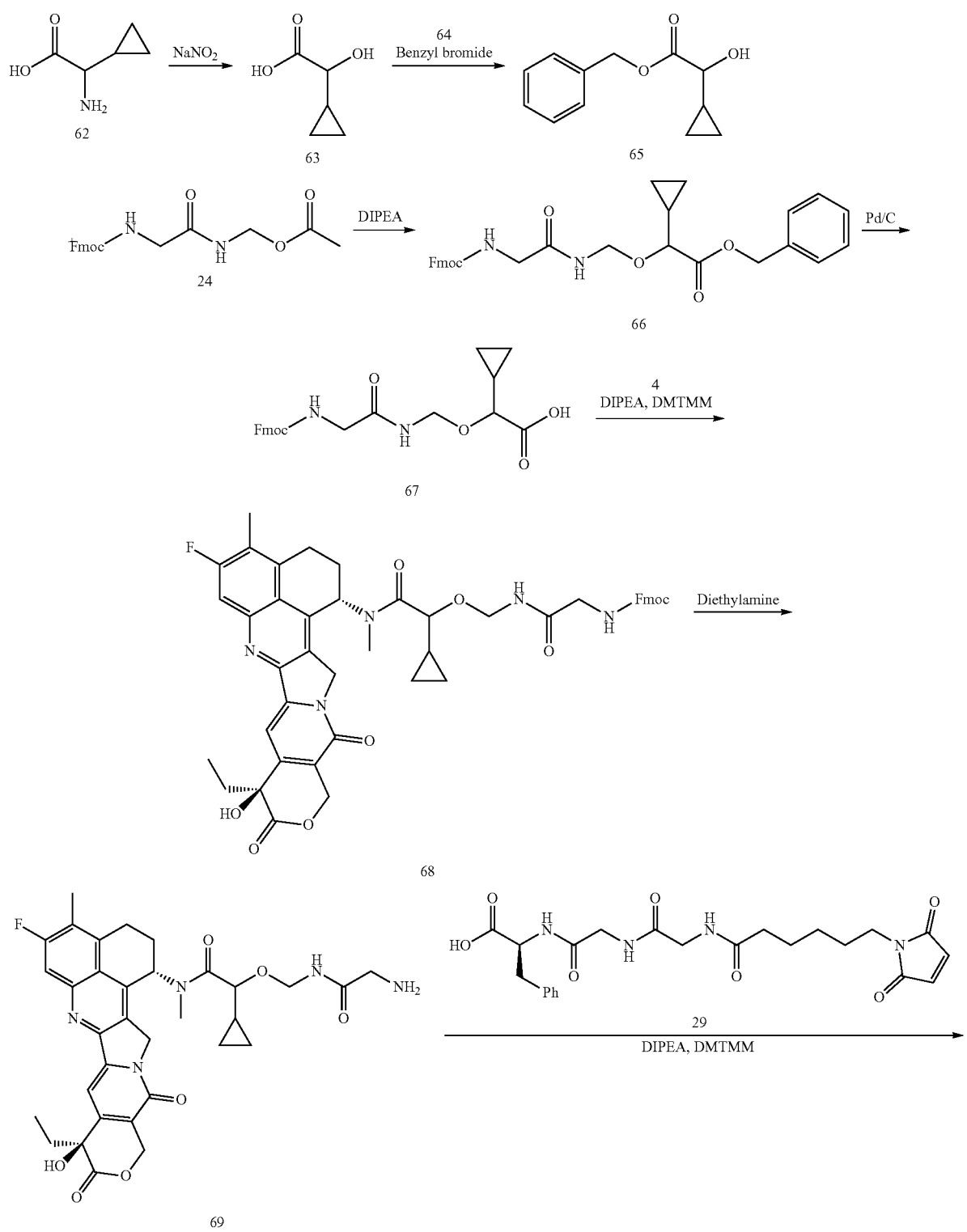

-continued

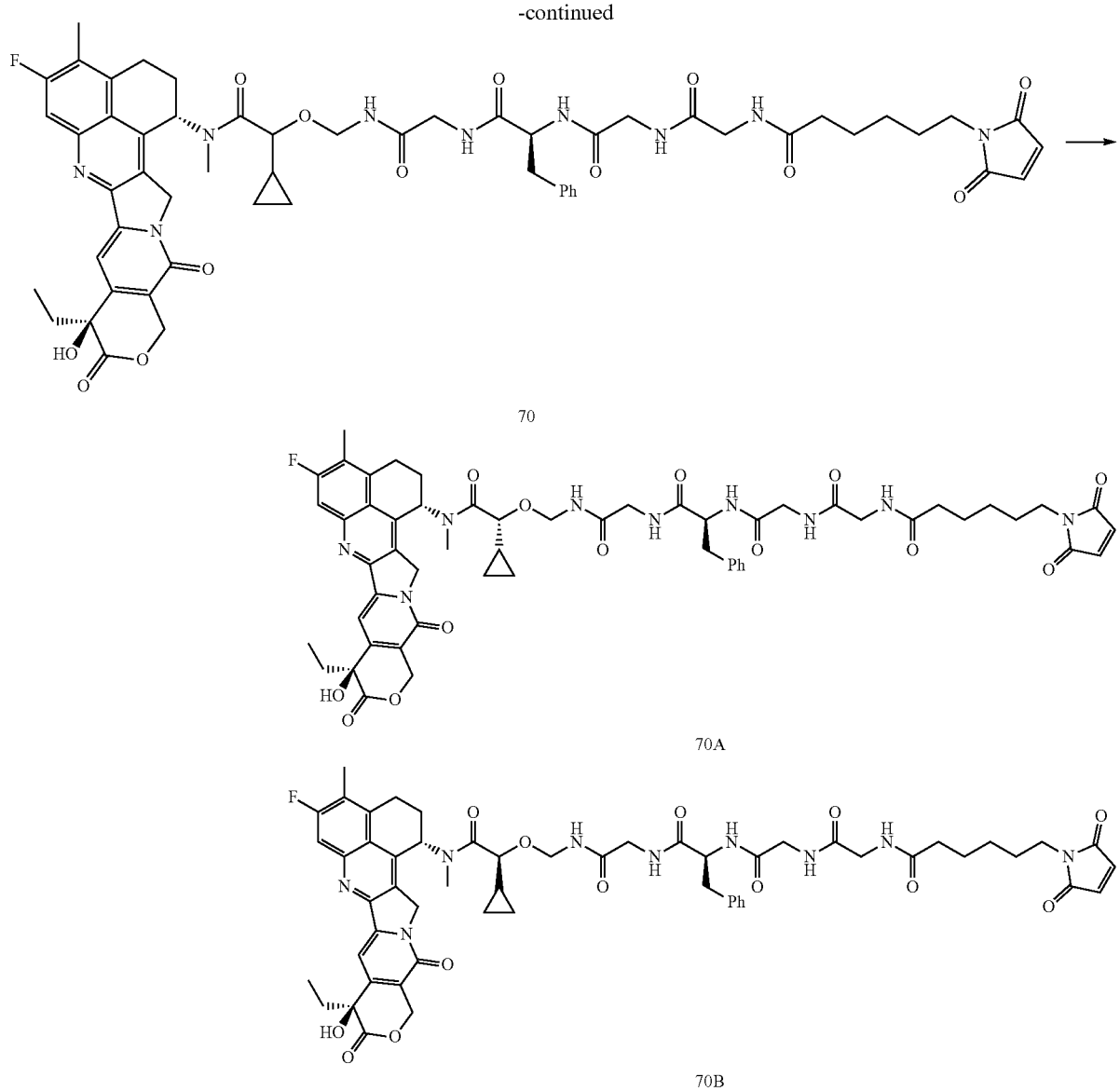

Synthesis of Compound 65

Prepared by referring to the synthetic method of the known method "Patent No: WO 2020063673".

Synthesis of Compound 66

Referring to the synthesis of Compound 25, Compound 65 (30 mg, 146 umol) was used to obtain 27 mg of yellow oily compound, yield 36%, MS m/z: [M+H]+ 515.2.

Synthesis of Compound 67

Referring to the synthesis of Compound 26, Compound 66 (27 mg, 53 umol) was used and the product was used for the next reaction without purification.

Synthesis of Compound 68

Referring to the synthesis of Compound 27, Compound 67 was used according to Compound 66 to obtain 9 mg of Compound 68, two-step yield of 20%, MS m/z: [M+H]+ 856.7.

Synthesis of Compound 69

Referring to the synthesis of Compound 28, 9 mg of Compound 68 was used to obtain Compound 69, about 2.5 mg, yield 38%, MS m/z: [M+H]+ 634.2.

Synthesis of Compound 70

Referring to the synthesis of Compound 30, 2.5 mg of Compound 69 was used, and 1.2 mg of yellow solid Compound 61 was obtained with a yield of about 28%, MS m/z: [M+H]+ 1088.5.

Example 17
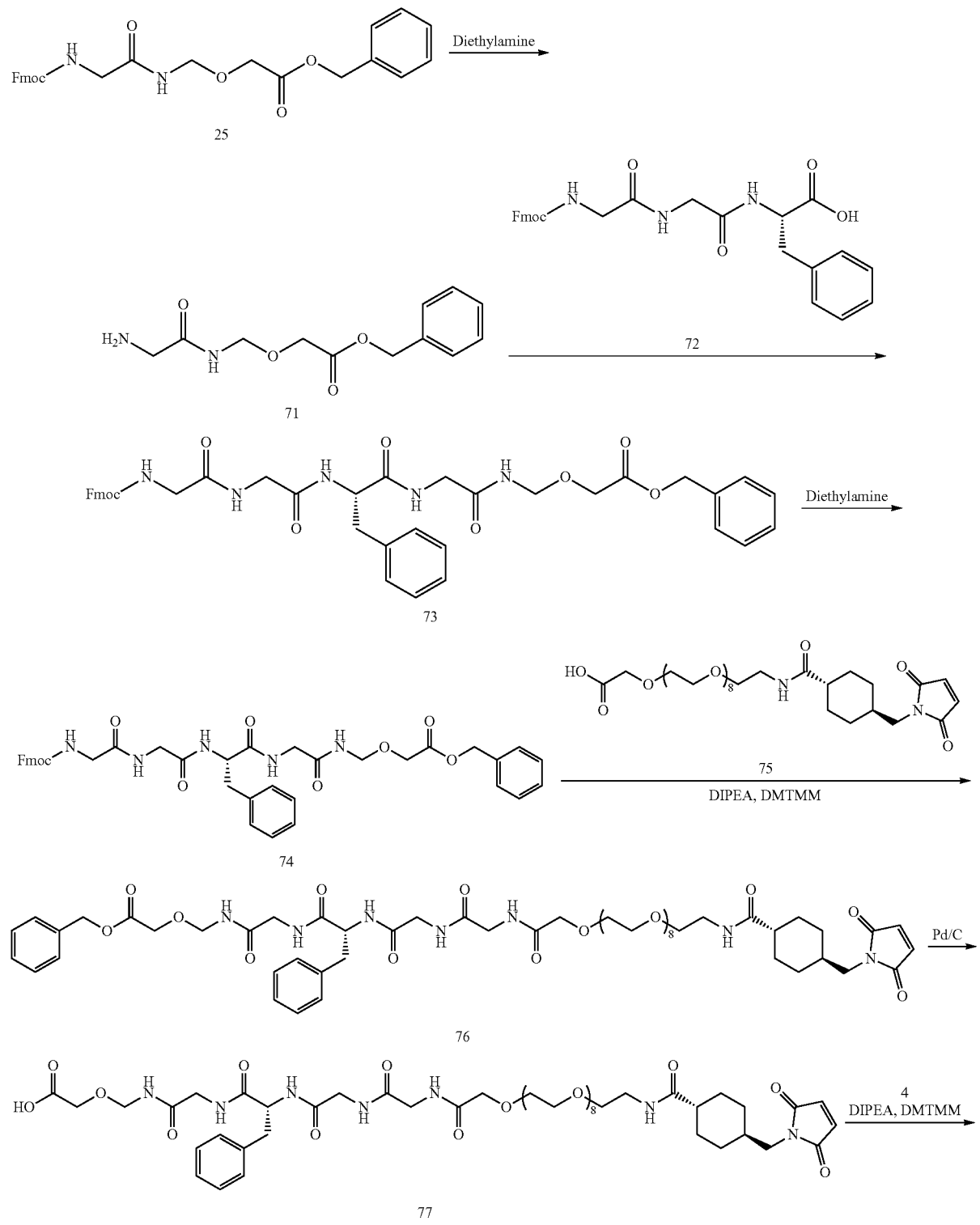

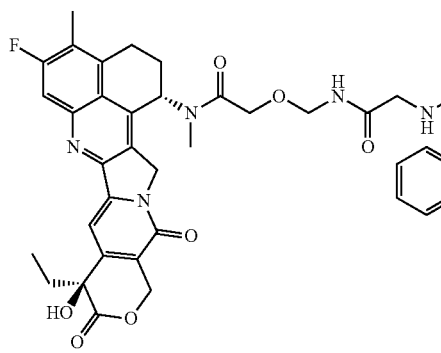 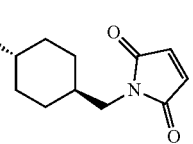

Synthesis of Compound 71

At 0° C., Compound 25 (40 mg, 84 umol) was added to a 25 mL single-neck flask, 5 mL of DMF was added, and Diethylamine (13 μL, 1.5 eq) was added dropwise, and the reaction was allowed to rise to room temperature for 2 hours. Concentrated under reduced pressure, purified by preparative high performance liquid chromatography (acetonitrile/pure water system), collected the target peak, removed acetonitrile under reduced pressure, and lyophilized to obtain about 17 mg of Compound 71, the yield was about 80%, MS m/z: [M+H]+ 253.1.

Synthesis of Compound 73

At room temperature, Compound 71 (17 mg, 67 umol) was added to a 25 mL bottle, 5 mL of DMF was added to dissolve, cooled to 0° C. in an ice-water bath. And DIPEA (22 μL, 2 eq), Compound 72 (67 mg, 2 eq) and 4-(4,6-dimethoxy-1,3,5-triazin-2-yl)-4-methylmorpholine chloride (DTMMM, 40 mg, 2 eq) were added sequentially. Then the reaction was maintained at 0° C. for 4 hours, 5 mL of saturated NaCl aqueous solution was added to the resulting reaction solution to quench the reaction, the aqueous phase was extracted with ethyl acetate (10 mL×3), the organic phases were combined, dried over anhydrous sodium sulfate, filtered. The filtrate was concentrated under reduced pressure, purified by preparative high-performance liquid chromatography (acetonitrile/pure water system), collected the target peak, removed the acetonitrile under reduced pressure, and lyophilized to obtain about 21 mg of Compound 73, with a yield of about 43%, MS m/z: [M+H]+ 736.4.

Synthesis of Compound 74

At 0° C., Compound 73 (21 mg, 29 umol) was added to a 25 mL single-neck flask, 5 mL of DMF was added to dissolve, and diethylamine (6 μL, 58 umol) was added to the resulting solution, and the temperature was naturally warmed to room temperature, and the reaction was maintained at room temperature. After 5 hours, the obtained reaction solution was concentrated and used directly for the next reaction.

Synthesis of Compound 76

At room temperature, Compound 74 was added to a 5 mL single-necked flask, measured according to Compound 73, 1.5 mL of DMF was added to dissolve, cooled to 0° C. in an ice-water bath. And DIPEA (10 μL, 2 eq), compound 75 (17 mg, 1.5 eq) and 4-(4,6-dimethoxy-1,3,5-triazin-2-yl)-4-methylmorpholine chloride (DTMMM, 17 mg, 2 eq) were added sequentially. Then the reaction was maintained at 0° C. for 1 hour, warmed to room temperature and reacted for 3 hours, directly purified by preparative high performance liquid chromatography (acetonitrile/pure water system), collected the target peak, removed acetonitrile under reduced pressure, and lyophilized to obtain the Compound 76 ca. 11 mg, yellow solid, ca. 43% over two steps, MS m/z: [M+H]+ 878.4.

Synthesis of Compound 77

At room temperature, Compound 76 (11 mg, 13 umol) was added to a 5 mL single-neck flask, 1 mL of DMF was added to dissolve, 11 mg of 10% Pd/C was added to the resulting solution, and the atmosphere in the system was replaced by a hydrogen balloon, and the reaction was maintained at room temperature. After 1 hour, Pd/C was removed by filtration, and the obtained reaction solution was concentrated and used directly for the next reaction.

Synthesis of Compound 78

At room temperature, Compound 77 (measured according to Compound 76) was added to a 5 mL single-neck flask, 1 mL of DMF was added to dissolve, cooled to 0° C. in an ice-water bath. And DIPEA (5 μL, 2 eq), Compound 4 (6 mg, 1 eq) and 4-(4,6-dimethoxy-1,3,5-triazin-2-yl)-4-methylmorpholine chloride (DTMMM, 8 mg, 2 eq)) were added sequentially. Then the reaction was maintained at 0° C. for 1 hour, the reaction solution was directly purified by preparative high performance liquid chromatography (acetonitrile/pure water system), the target peak was collected, acetonitrile was removed under reduced pressure, and lyophilized to obtain about 1.5 mg of Compound 78, the two-step yield is about 9%, MS m/z: [M+H]+ 1219.6.

Example 18

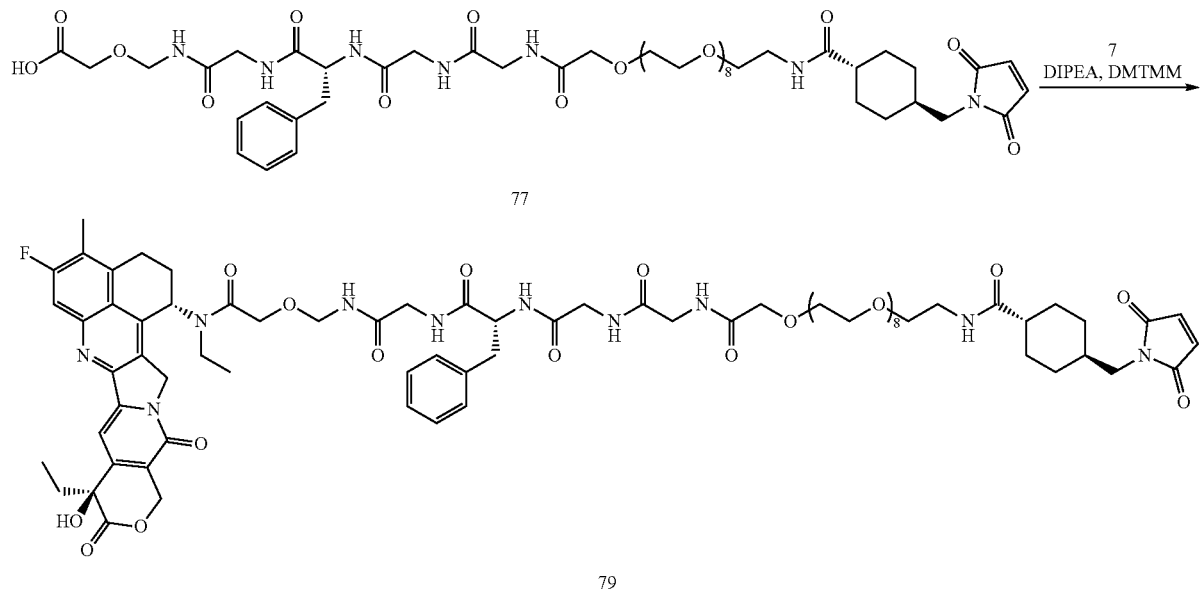

Synthesis of Compound 79

At room temperature, Compound 77 (4 mg, 5 umol) was added to a 5 mL single-neck flask, 1 mL of DMF was added to dissolve, cooled to 0° C. in an ice-water bath, and DIPEA (1.7 μL, 2 eq), Compound 7 (2.3 mg, 1 eq) and 4-(4,6-dimethoxy-1,3,5-triazin-2-yl)-4-methylmorpholine chloride (DTMMM, 2.9 mg, 2 eq) were added to the resulting solution in turn. Maintained at 0° C. for 2 hours, the reaction solution was directly purified by preparative high-performance liquid chromatography (acetonitrile/pure water system), the target peak was collected, acetonitrile was removed under reduced pressure, and lyophilized to obtain about 1.3 mg of Compound 79, the yield is about 16%, MS m/z: [M+H]+ 1233.5.

Example 19

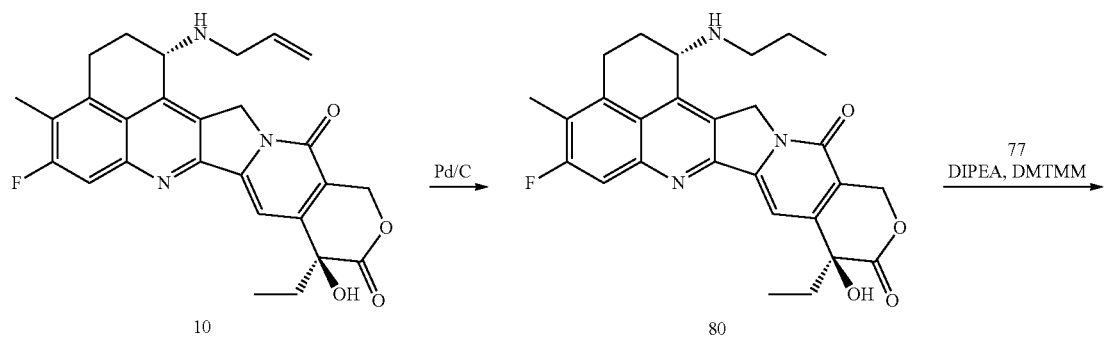

-continued

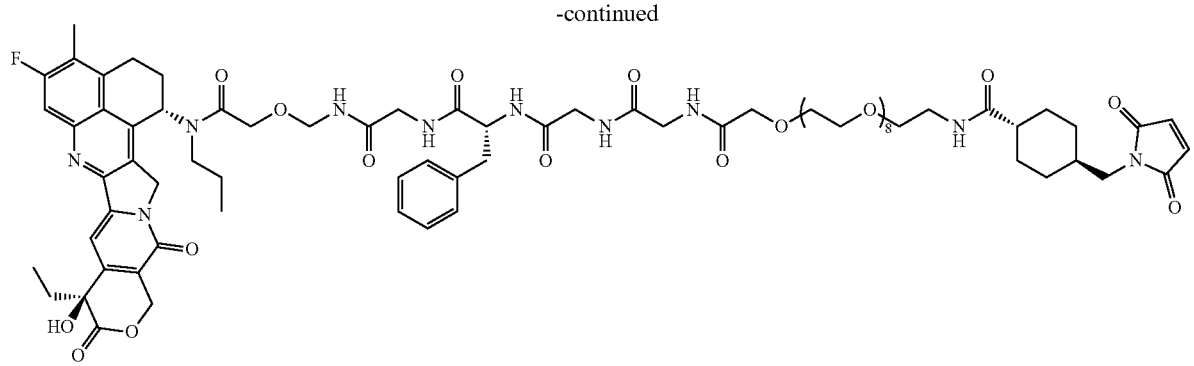

81

Synthesis of Compound 80

At room temperature, Compound 10 (12 mg, 25 umol) was added to a 5 mL single-neck flask, 2 mL of DMF was added to dissolve, 12 mg of 10% Pd/C was added to the obtained solution, and the atmosphere in the system was replaced by a hydrogen balloon, and the reaction was maintained at room temperature. After 2 hours, Pd/C was removed by filtration, and the obtained reaction solution was concentrated and used directly for the next reaction.

Synthesis of Compound 81

At room temperature, Compound 80 (measured according to Compound 10) was added to a 5 mL single-neck flask, 2 mL of DMF was added to dissolve, cooled to 0° C. in an ice-water bath. And DIPEA (9 μL, 2 eq), Compound 77 (20 mg, 1 eq) and 4-(4,6-dimethoxy-1,3,5-triazin-2-yl)-4-methylmorpholine chloride (DTMMM, 15 mg, 2 eq)) were added sequentially. Maintained at 0° C. for 2 hours, the reaction solution was directly purified by preparative-grade high performance liquid chromatography (acetonitrile/pure water system), the target peak was collected, acetonitrile was removed under reduced pressure, and lyophilized to obtain about 3.3 mg of Compound 81, the two-step yield is about 11%, MS m/z: [M+H]+ 1247.6.

Example 20

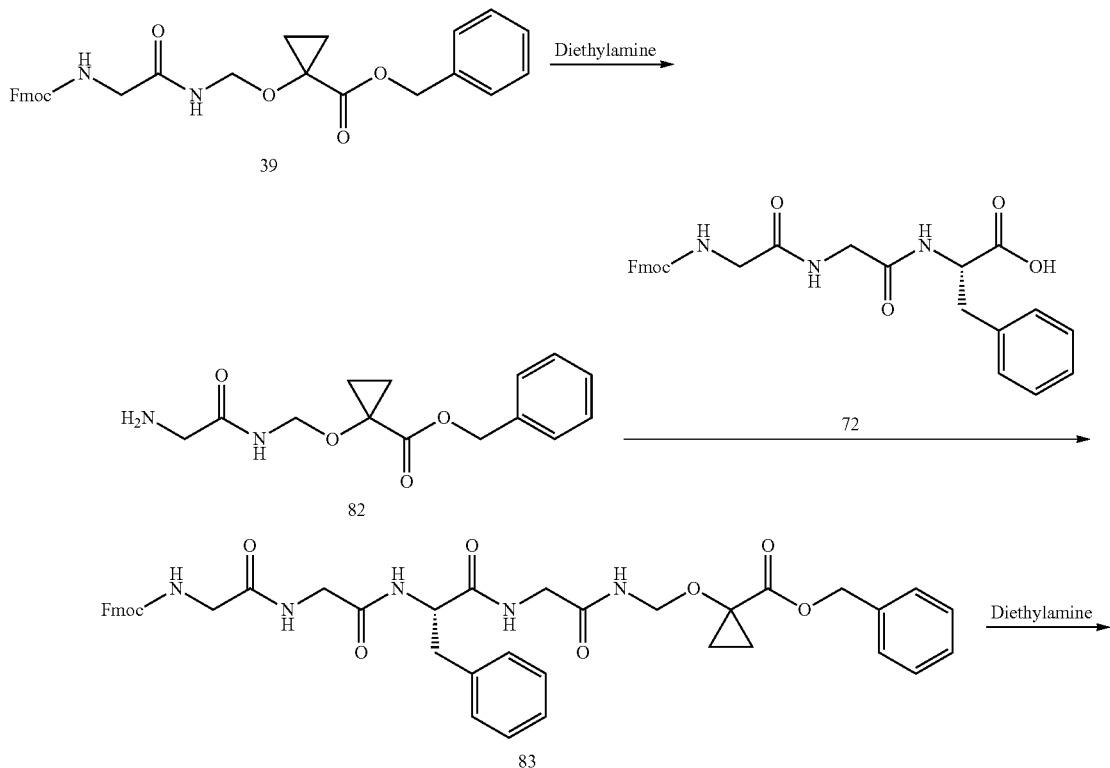

-continued

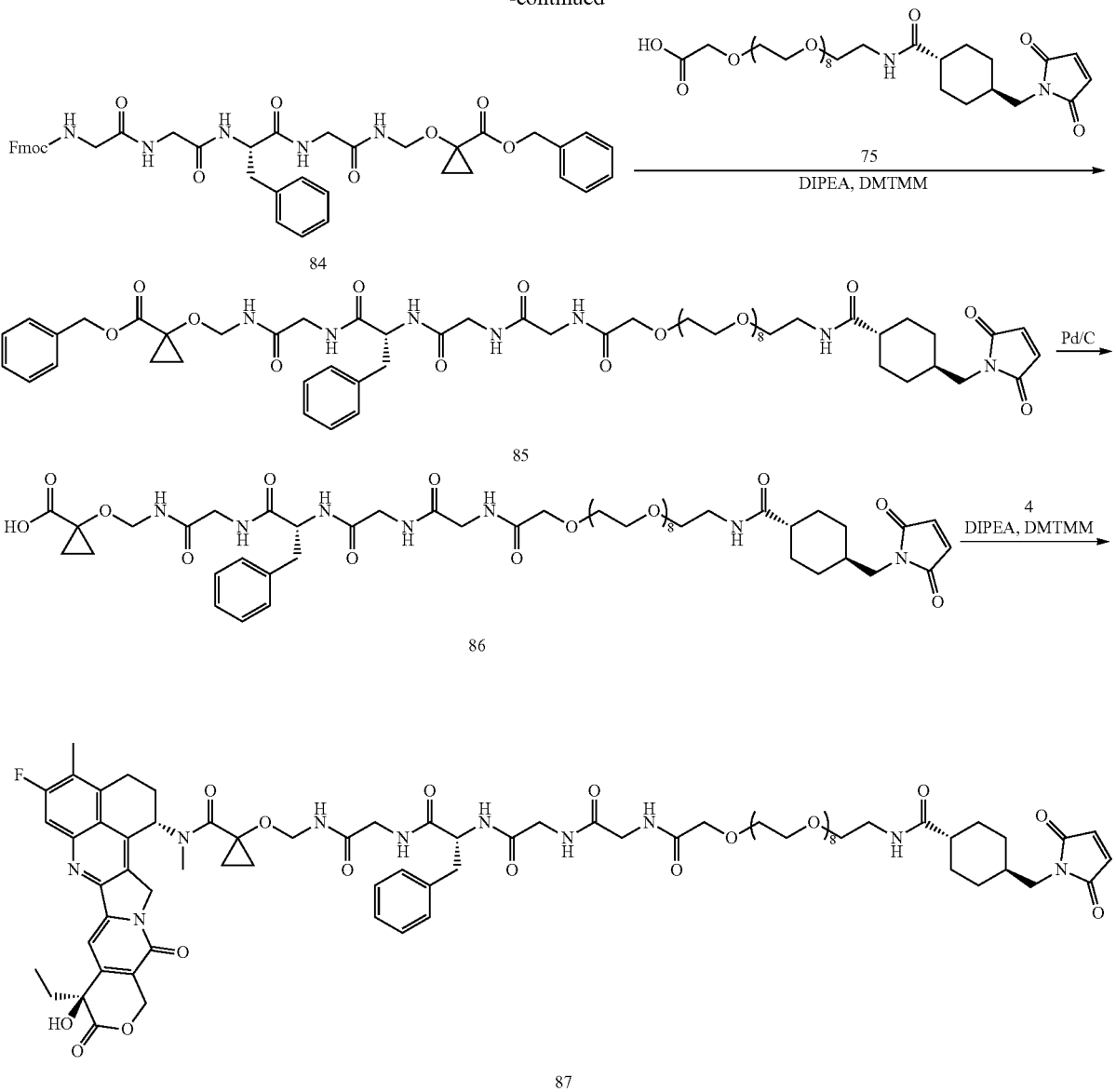

Synthesis of Compound 82

Referring to the synthesis of Compound 71, Compound 39 was used (200 mg, 400 umol) to obtain 28 mg of the target compound, yield 25%, MS m/z: [M+H]+ 279.0.

Synthesis of Compound 83

Referring to the synthesis of Compound 73, Compound 82 was used (28 mg, 100 umol) to obtain 19 mg of the target compound, yield 25%, MS m/z: [M+H]+ 762.4.

Synthesis of Compound 84

Referring to the synthesis of Compound 74, Compound 83 was used (19 mg, 25 umol) to obtain 8 mg of the target compound, yield 59%, MS m/z: [M+H]+ 540.2.

Synthesis of Compound 85

Referring to the synthesis of Compound 76, Compound 84 was used (8 mg, 15 umol) to obtain 6 mg of the target compound with a yield of 45%, MS m/z: [M+H]+ 904.4.

Synthesis of Compound 86

Referring to the synthesis of Compound 77, Compound 85 was used (6 mg, 6.7 umol), and the obtained reaction solution was concentrated and used directly for the next reaction.

Synthesis of Compound 87

Referring to the synthesis of Compound 78, Compound 86 was used (calculated according to compound 85) to obtain 0.9 mg of the target compound, the two-step yield was about 11%, MS m/z: [M+H]+ 1245.5.

Example 21
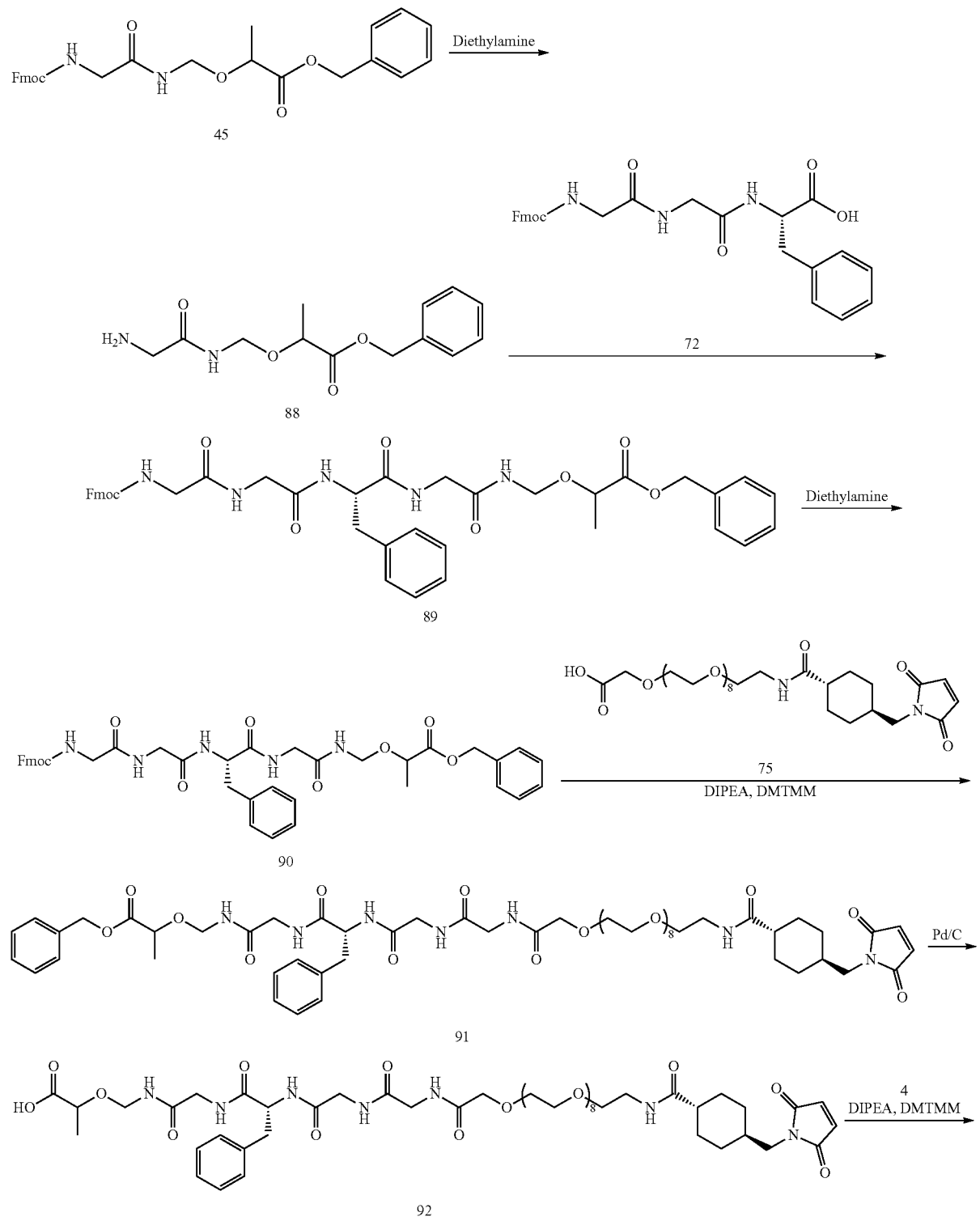

-continued

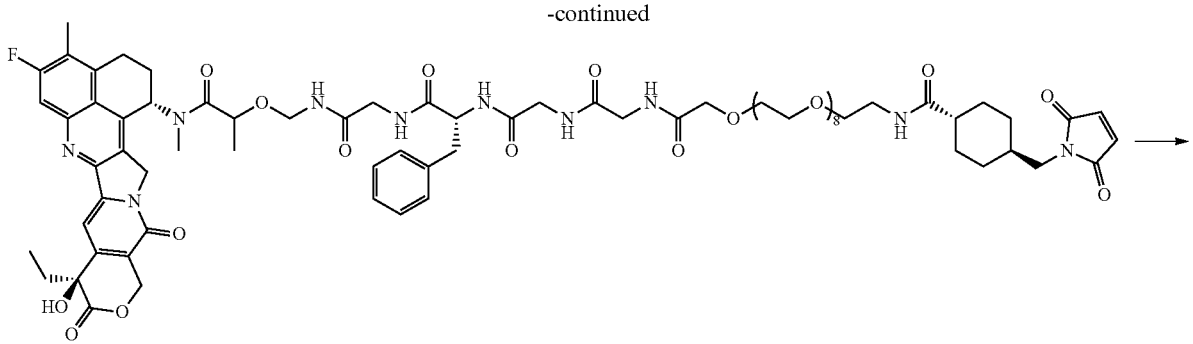

93

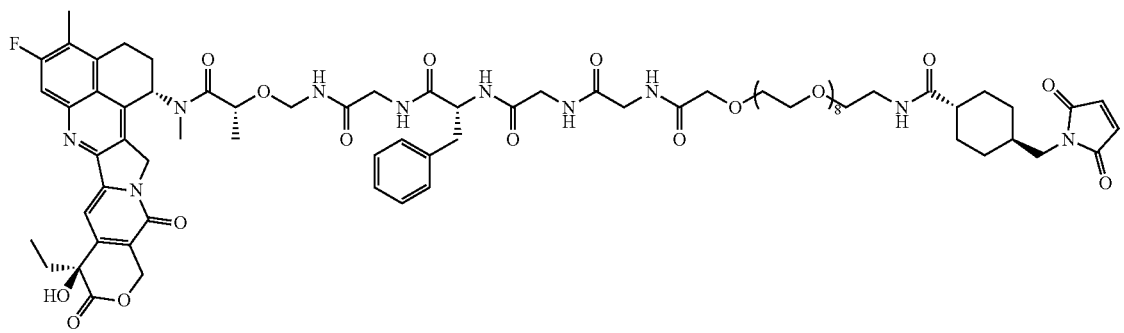

93A

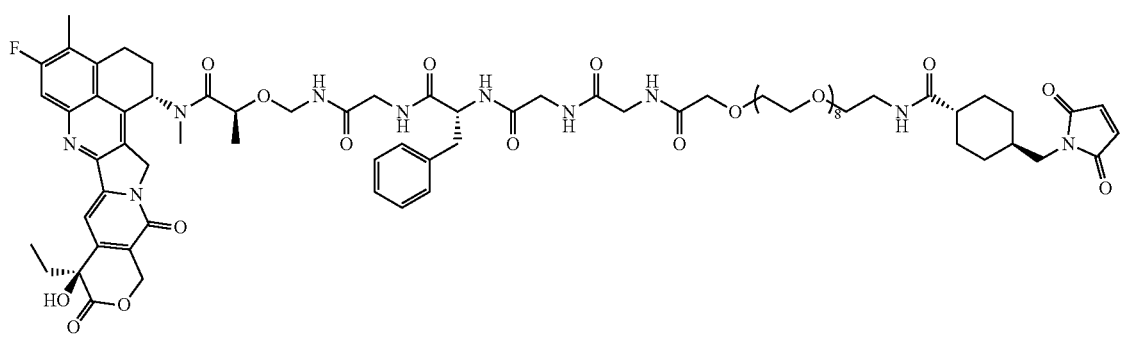

93B

Synthesis of Compound 88

Referring to the synthesis of Compound 71, Compound 45 was used (250 mg, 512 umol) to obtain 34 mg of the target compound, yield 14%, MS m/z: [M+H]+ 489.4.

Synthesis of Compound 89

Referring to the synthesis of Compound 73, Compound 88 was used (34 mg, 70 umol) to obtain 45 mg of the target compound, yield 86%, MS m/z: [M+H]+ 750.9.

Synthesis of Compound 90

Referring to the synthesis of Compound 74, Compound 89 was used (45 mg, 60 umol) to obtain 18 mg of the target Compound 90, yield 57%, MS m/z: [M+H]+ 528.1.

Synthesis of Compound 91

Referring to the synthesis of Compound 76, Compound 90 was used (18 mg, 34 umol) to obtain 11 mg of the target Compound 91, yield 36%, MS m/z: [M+H]+ 892.8.

Synthesis of Compound 92

Referring to the synthesis of Compound 77, Compound 91 was used (11 mg, 12 umol), and the obtained reaction solution was concentrated and used directly for the next reaction.

Synthesis of Compound 93

Referring to the synthesis of Compound 78, Compound 92 was used (calculated according to Compound 91) to obtain 2.8 mg of the target compound, the two-step yield was about 19%, MS m/z: [M+H]+ 1233.5.

Example 22
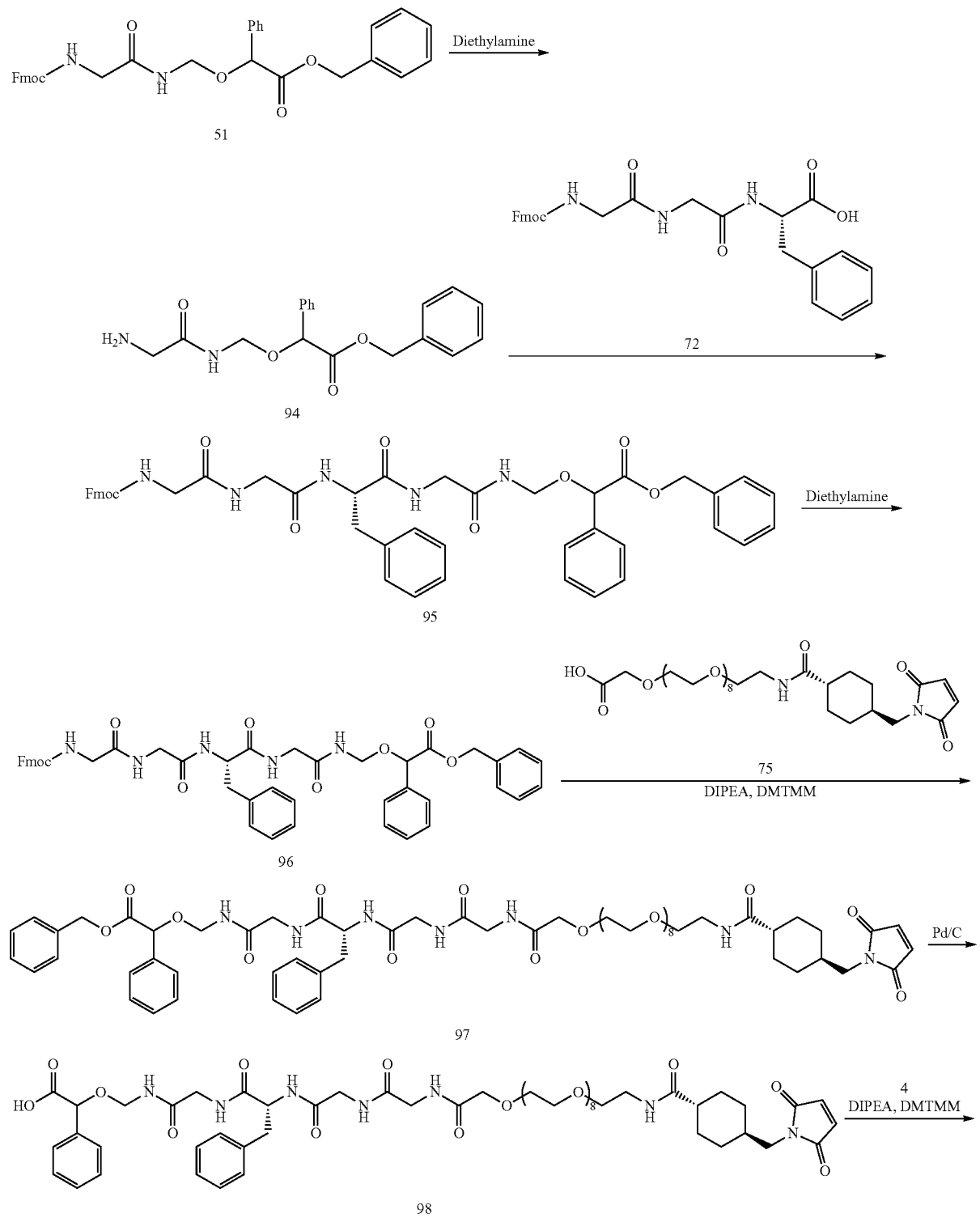

-continued

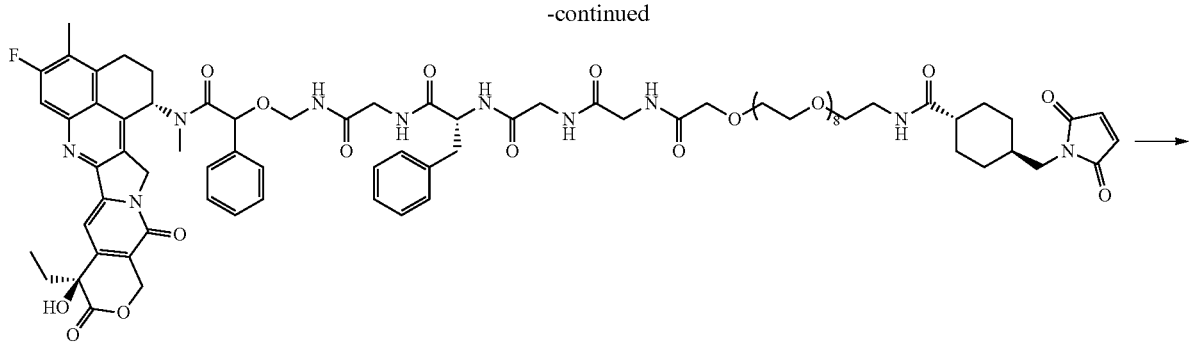

99

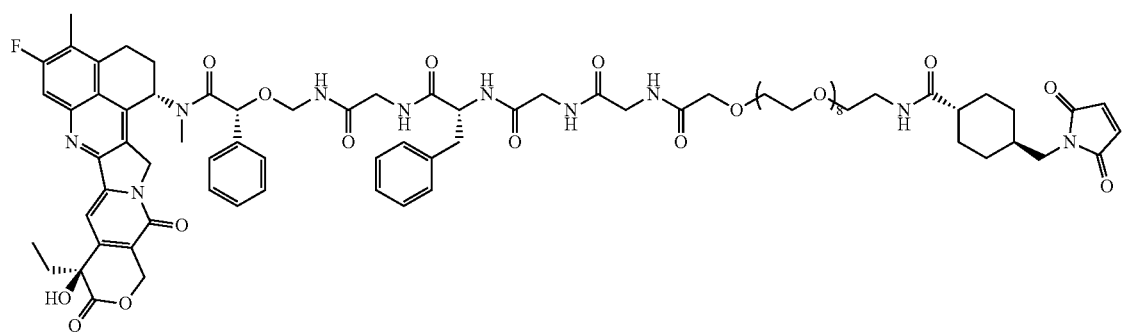

99A

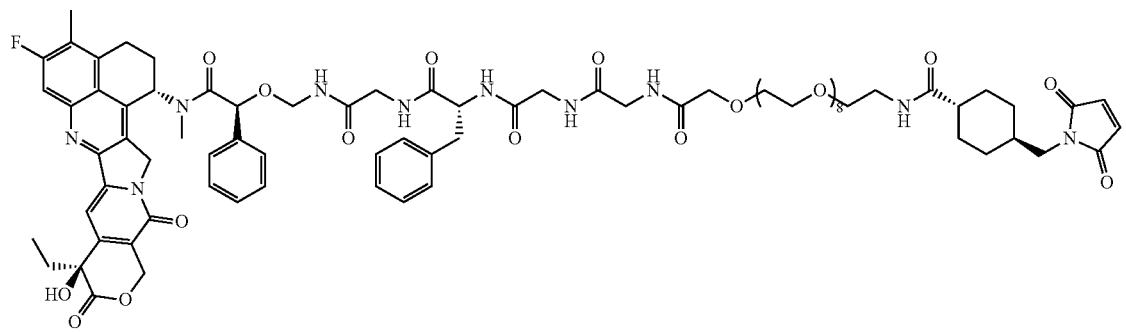

99B

Synthesis of Compound 94

Referring to the synthesis of Compound 71, Compound 51 was used (210 mg, 382 umol) to obtain 30 mg of the target compound, yield 24%, MS m/z: [M+H]+ 329.0.

Synthesis of Compound 95

Referring to the synthesis of Compound 73, Compound 94 was used (30 mg, 91 umol) to obtain 27 mg of the target compound, yield 36%, MS m/z: [M+H]+ 812.3.

Synthesis of Compound 96

Referring to the synthesis of Compound 74, Compound 95 was used (30 mg, 33 umol) to obtain 10 mg of the target compound, yield 51%, MS m/z: [M+H]+ 590.3.

Synthesis of Compound 97

Referring to the synthesis of Compound 76, Compound 96 was used (10 mg, 17 umol) to obtain 6 mg of the target compound, yield 37%, MS m/z: [M+H]+ 954.0.

Synthesis of Compound 98

Referring to the synthesis of Compound 77, Compound 97 was used (6 mg, 6.3 umol), and the obtained reaction solution was concentrated and used directly for the next reaction.

Synthesis of Compound 99

Referring to the synthesis of Compound 78, Compound 98 was used (measured according to Compound 97) to obtain 1.8 mg of the target compound, the two-step yield was about 22%, MS m/z: [M+H]+ 1295.4.

Example 23
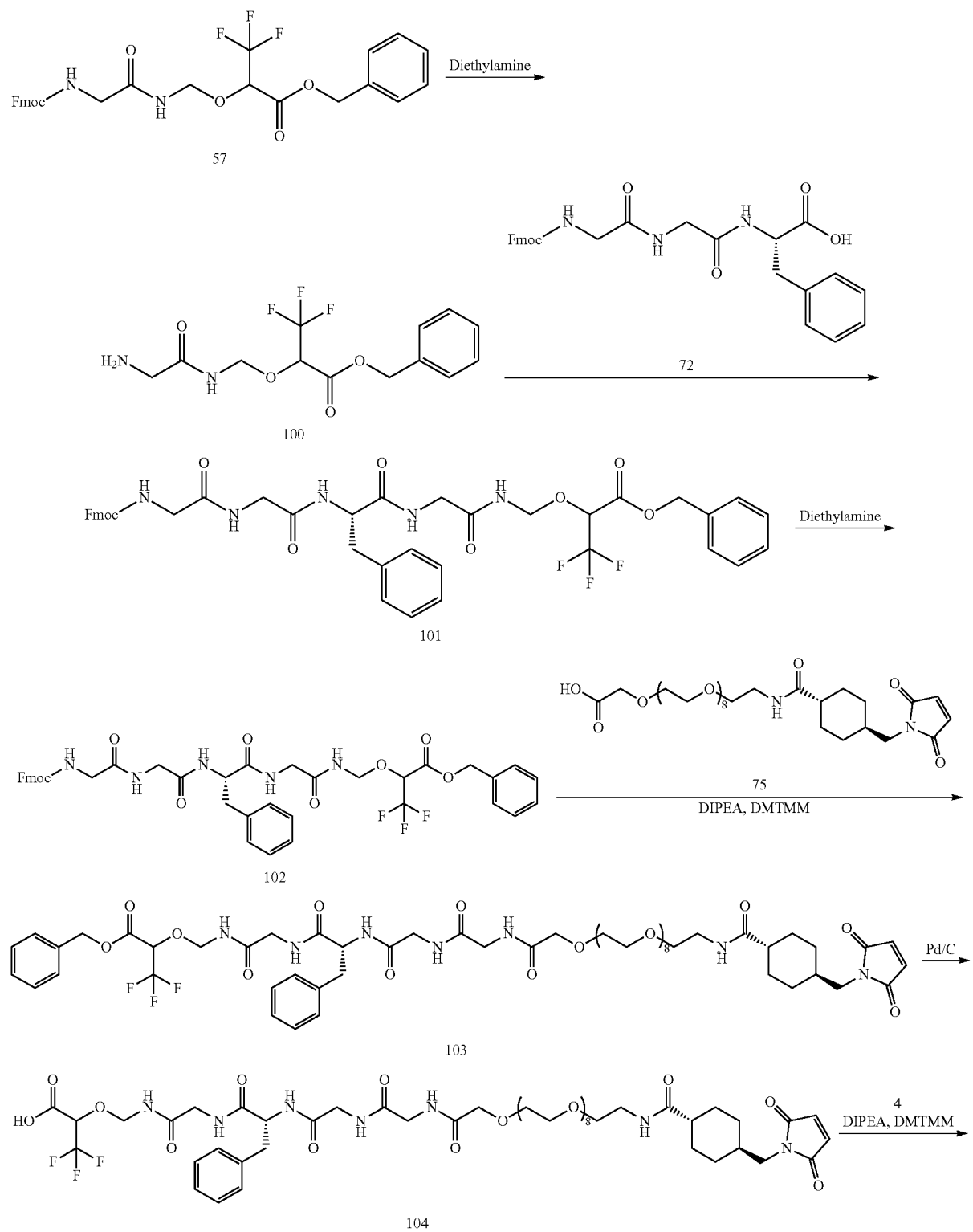

-continued

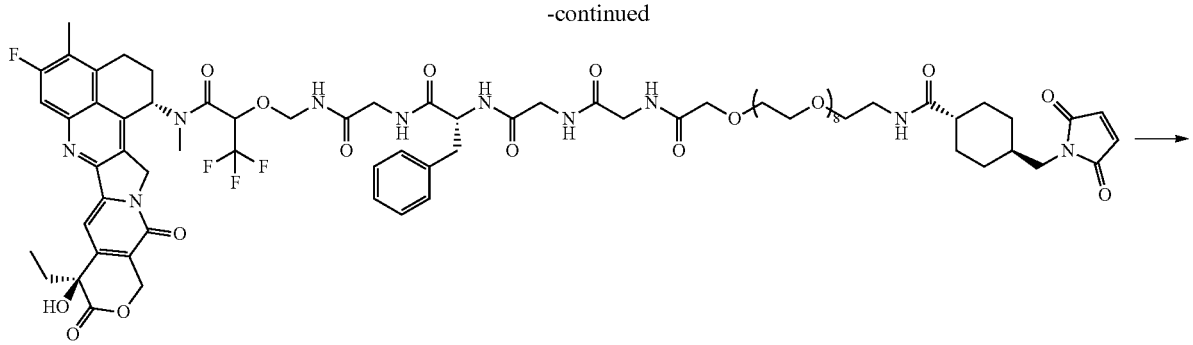

105

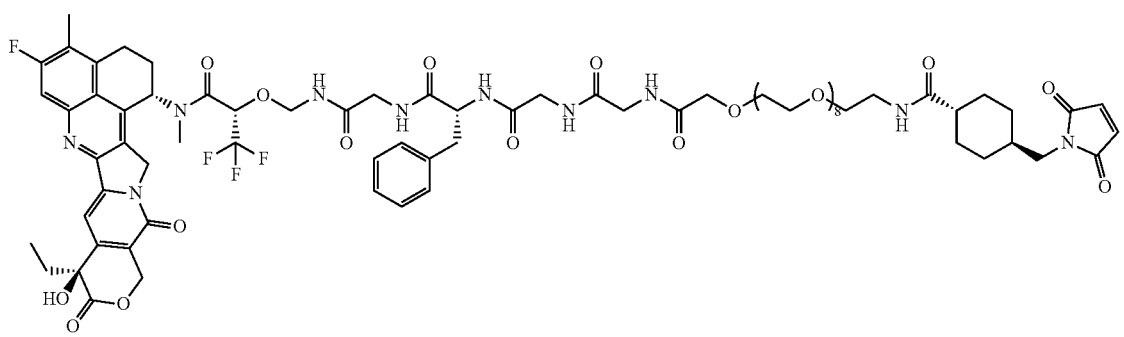

105A

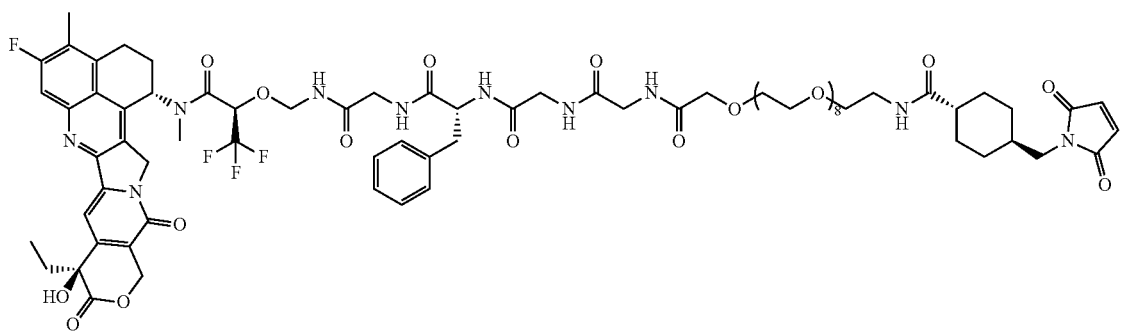

105B

Synthesis of Compound 100

Referring to the synthesis of Compound 71, Compound 57 was used (200 mg, 369 umol) to obtain 36 mg of the target compound, yield 30%, MS m/z: [M+H]+ 321.1.

Synthesis of Compound 101

Referring to the synthesis of Compound 73, Compound 100 was used (36 mg, 112 umol) to obtain 25 mg of the target compound, yield 28%, MS m/z: [M+H]+ 804.8.

Synthesis of Compound 102

Referring to the synthesis of Compound 74, Compound 101 was used (25 mg, 31 umol) to obtain 12 mg of the target compound, yield 67%, MS m/z: [M+H]+ 582.5.

Synthesis of Compound 103

Referring to the synthesis of Compound 76, Compound 102 was used (12 mg, 21 umol) to obtain 9 mg of the target compound, yield 45%, MS m/z: [M+H]+ 946.9.

Synthesis of Compound 104

Referring to the synthesis of Compound 77, Compound 103 was used (9 mg, 10 umol), and the obtained reaction solution was concentrated and used directly for the next reaction.

Synthesis of Compound 105

Referring to the synthesis of Compound 78, Compound 86 was used (measured according to Compound 85) to obtain 3.2 mg of the target compound, the two-step yield was about 25%, MS m/z: [M+H]+ 1287.3.

Example 24
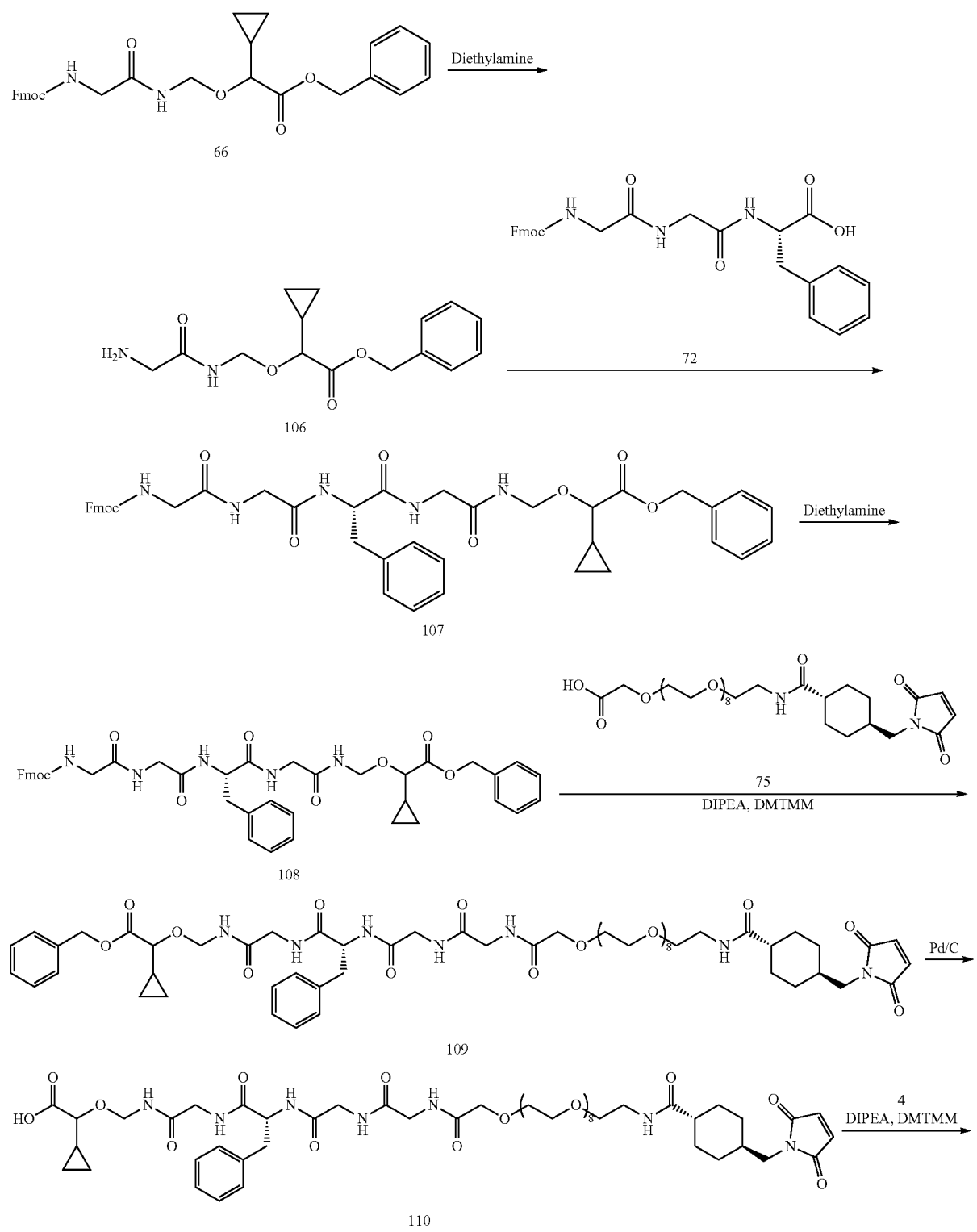

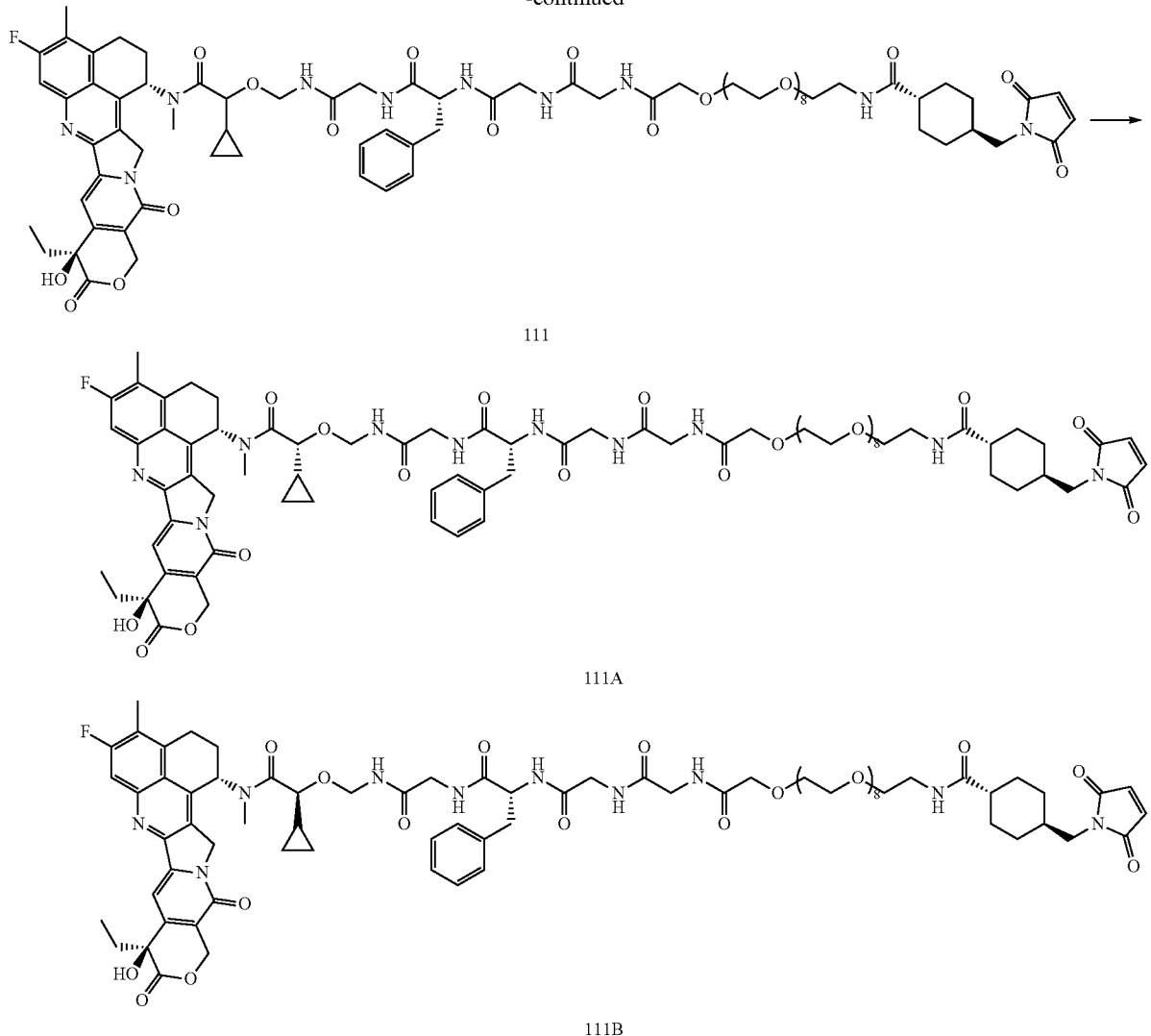

Synthesis of Compound 106

Referring to the synthesis of Compound 71, Compound 66 was used (300 mg, 583 umol) to obtain 41 mg of the target compound, yield 24%, MS m/z: [M+H]+ 293.1.

Synthesis of Compound 107

Referring to the synthesis of Compound 73, Compound 106 was used (41 mg, 140 umol) to obtain 29 mg of the target compound, yield 27%, MS m/z: [M+H]+ 776.1.

Synthesis of Compound 108

Referring to the synthesis of Compound 74, Compound 107 was used (29 mg, 37 umol) to obtain 7 mg of the target compound, yield 34%, MS m/z: [M+H]+ 554.4.

Synthesis of Compound 109

Referring to the synthesis of Compound 76, Compound 108 was used (7 mg, 13 umol) to obtain 6 mg of the target compound with a yield of 50%, MS m/z: [M+H]+ 918.2.

Synthesis of Compound 110

Referring to the synthesis of Compound 77, Compound 109 was used (6 mg, 6.5 umol), and the obtained reaction solution was concentrated and used directly for the next reaction.

Synthesis of Compound 111

Referring to the synthesis of Compound 78, Compound 110 was used (measured according to Compound 109) to obtain 1.1 mg of the target compound, the two-step yield was about 13%, MS m/z: [M+H]+ 1259.8.

1) General Coupling Method:

The antibody molecules with a monomer rate greater than 95% after preliminary purification were dispersed into phosphate buffered saline containing EDTA using an ultrafiltration centrifuge tube at a concentration of 10 mg/mL. Add 10 times the moles of TCEP to the antibody and react at room temperature for 2 h. Use an ultrafiltration centrifuge tube to change the solution to pH 6.5 phosphate buffer, then add DHAA 10 times the molar number of the antibody and react at room temperature for 2 h. Then, a payload of 15 times the molar number of the antibody was added, and the reaction was carried out at room temperature for 4 h. After the reaction, use an ultrafiltration centrifuge tube with a molecular weight cut-off of 30 KDa to change the medium to PBS, and remove the uncoupled payload.

2) Detection of Antibody-Drug Conjugated DAR:

Monomer Rate Detection Conditions:

The samples were centrifuged at 14,000 rpm for 5 minutes, and the supernatant was injected for analysis.

Instrument: Waters e2695 (2489UV/Vis);
Chromatographic column: TSKgel G3000SWXL (7.8× 300 mm, 5 μm);
Mobile phase: A: 50 mM PB, 300 mM NaCl, 200 mM Arg, 5% IPA, pH 6.5;
Mobile phase A was eluted isocratically for 30 min, flow rate: 0.714 mL/min, column temperature 25° C., detection wavelength: 280 nm.

DAR Detection Conditions:

The samples were centrifuged at 14,000 rpm for 5 minutes, and the supernatant was injected for analysis.

Instrument: Waters H-class (TUV); Chromatographic column:
Proteomix HIC Butyl-NP5 (4.6×35 mm, 5 μm);
Mobile phase: A: 1.5 M ammonium sulfate, 0.025 M anhydrous sodium phosphate, pH 7.0;
B: 0.025 M anhydrous sodium phosphate, 25% IPA, pH 7.0;

The column was equilibrated with mobile phase A, gradient elution of mobile phases A and B, flow rate 0.8 mL/min; column temperature 25° C., detection wavelength: 214 nm.

Example 25

Prepared by general coupling method, using Trastuzumab as antibody to obtain ADC: Tras-6.

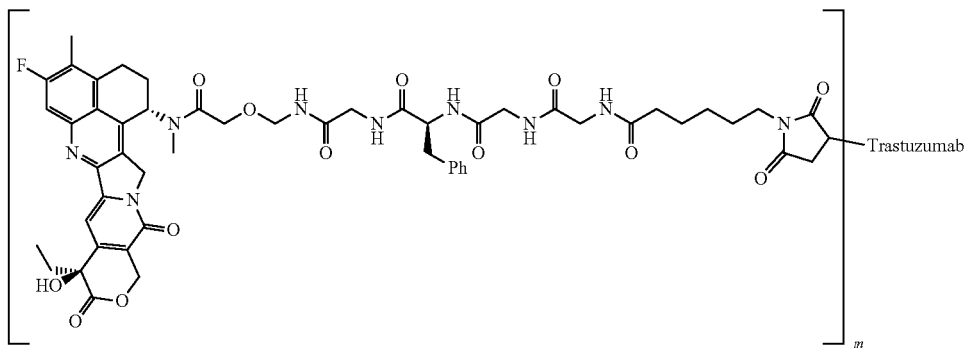

Example 26

Prepared by general coupling method, using Tr000 as antibody to obtain ADC: Tr000-6.

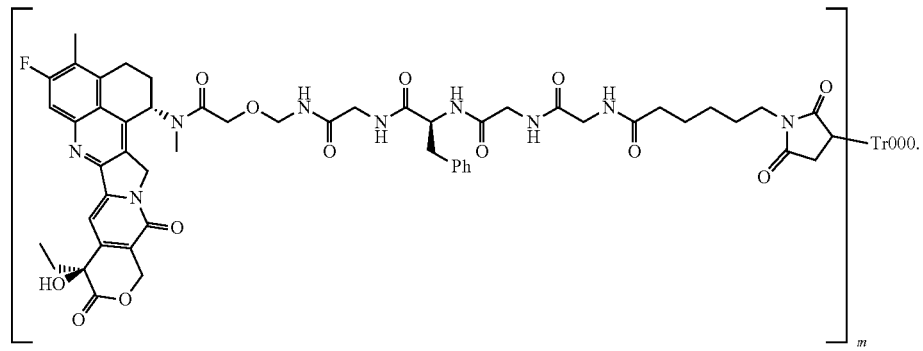

Example 27
Prepared by general coupling method, using Trastuzumab as antibody to obtain ADC: Tras-9.
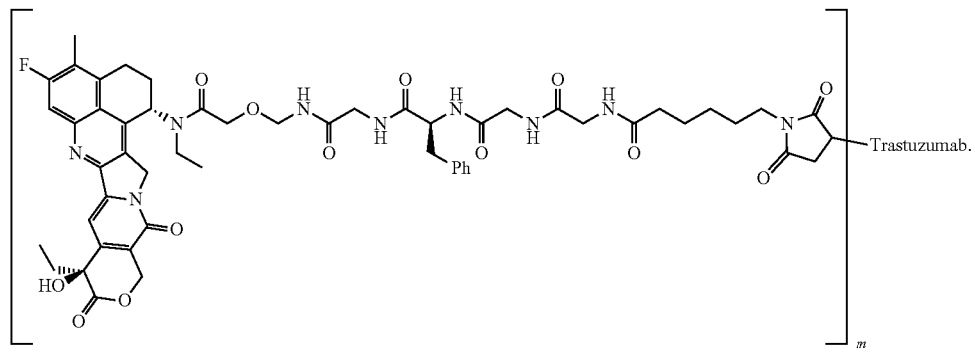
Example 28
Prepared by general coupling method, using Trastuzumab as antibody to obtain ADC: Tras-12.
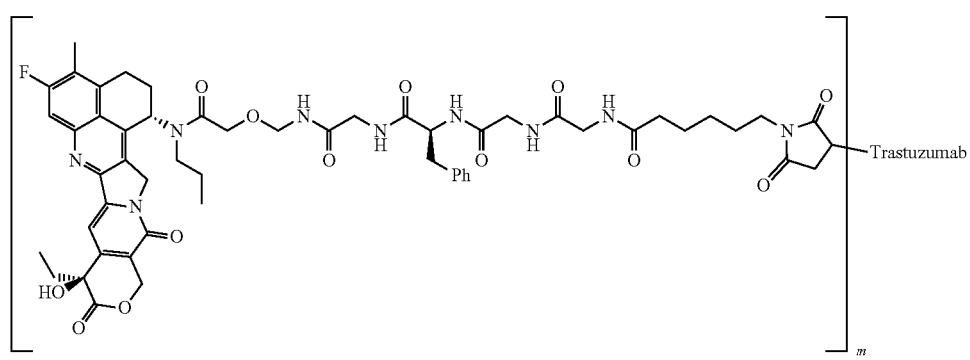
Example 29
Prepared by general coupling method, using Tr000 as antibody to obtain ADC: Tr000-12.
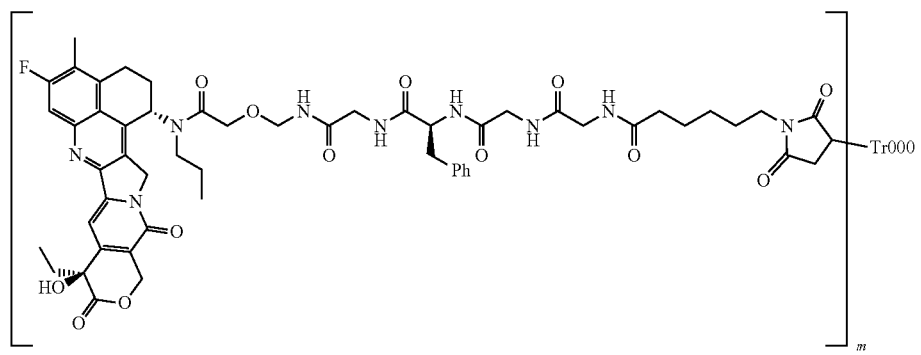

Example 30

Prepared according to the general coupling method, using Trastuzumab as the antibody to obtain ADC: Tras-14

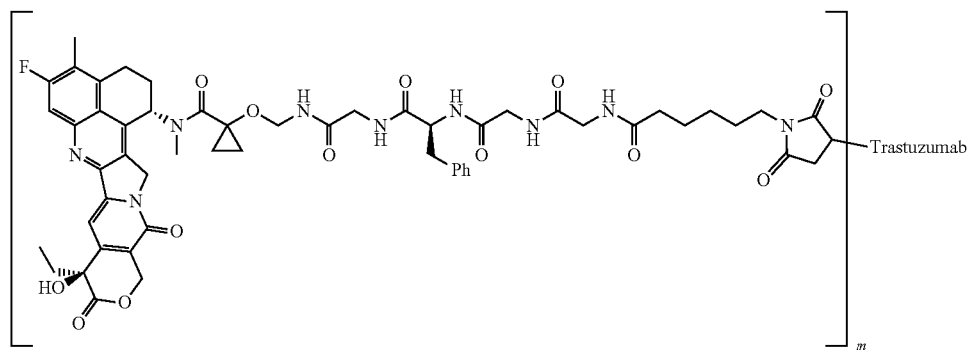

Example 31

Prepared by general coupling method, using Trastuzumab as antibody to obtain ADC: Tras-16.

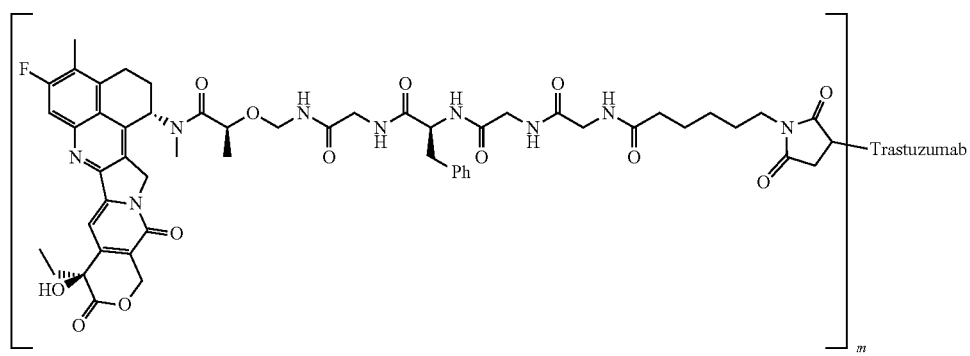

Example 32

Prepared according to the general coupling method, using Tr000 as the antibody to obtain ADC: Tr000-16.

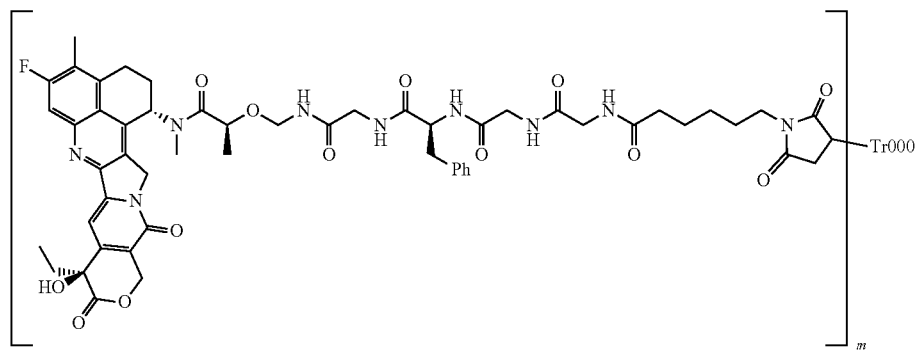

Example 33

Prepared by general coupling method, using Trastuzumab as antibody to obtain ADC: Tras-18

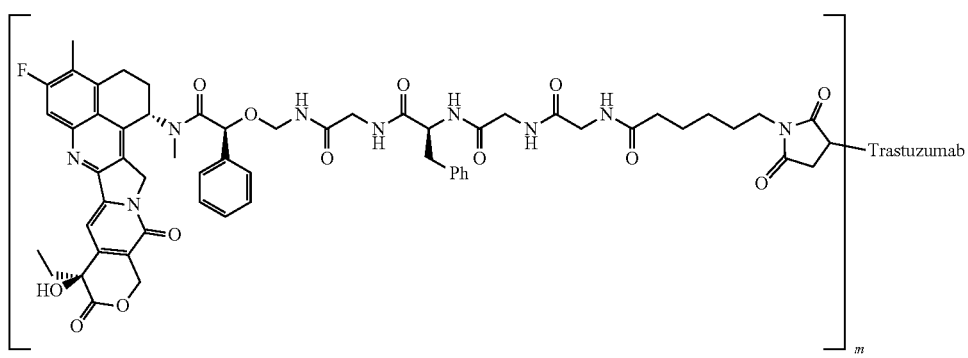
Example 34
Prepared by general coupling method, using Trastuzumab as antibody to obtain ADC: Tras-20A.
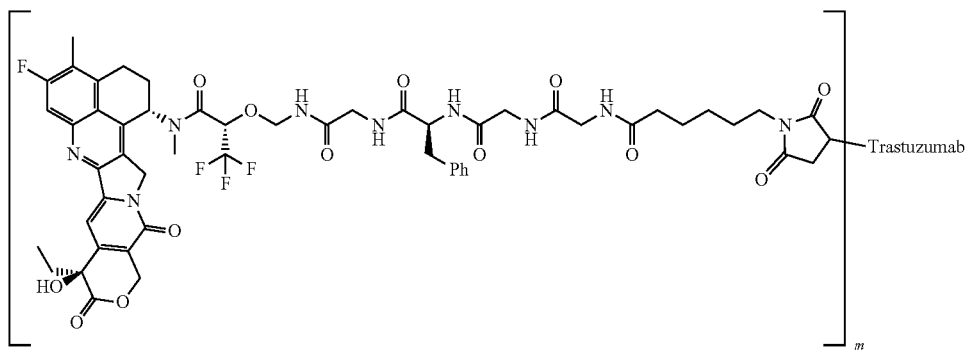
Example 35
Prepared by general coupling method, using Trastuzumab as antibody to obtain ADC: Tras-22B.
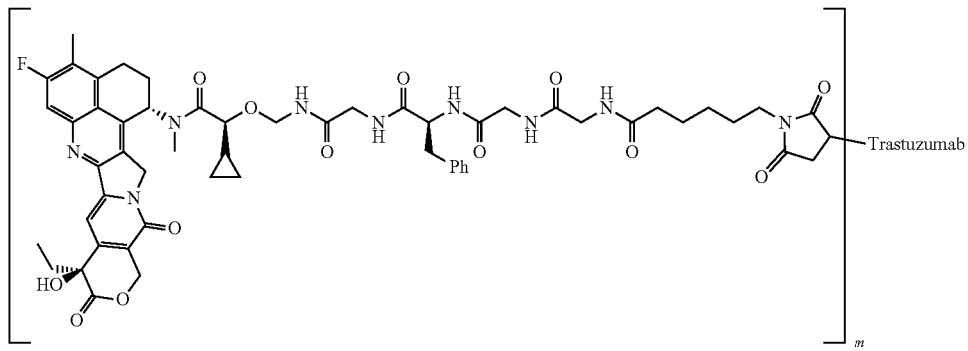
Example 36
Prepared by general coupling method, using Trastuzumab as antibody to obtain ADC: Tras-PEG-6.

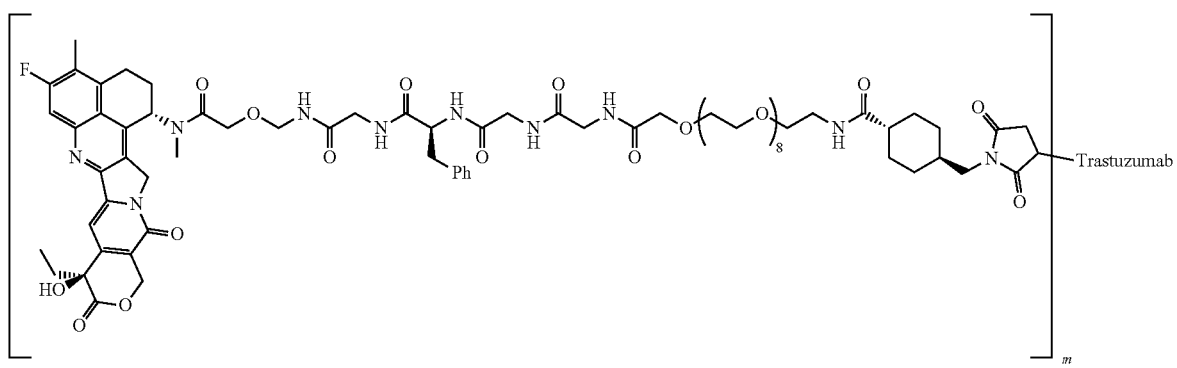
Example 37
Prepared by general coupling method, using Trastuzumab as antibody to obtain ADC: Tras-PEG-9.
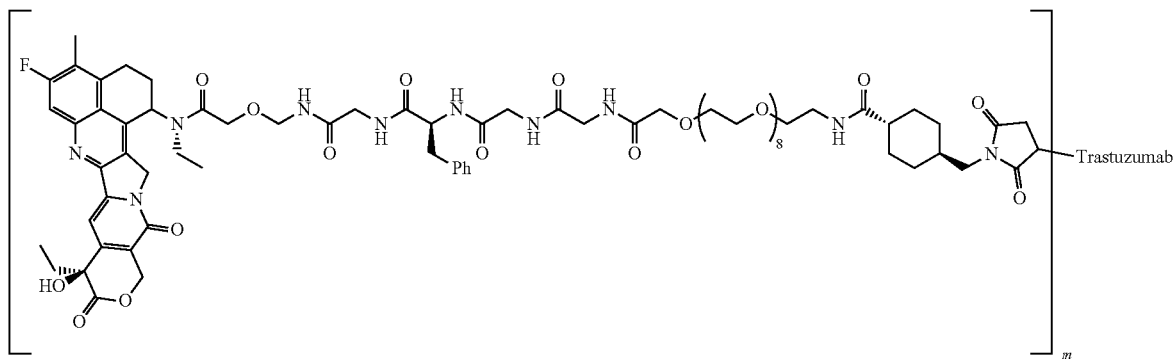
Example 38
Prepared according to general coupling method, using Trastuzumab as antibody to obtain ADC: Tras-PEG-12.
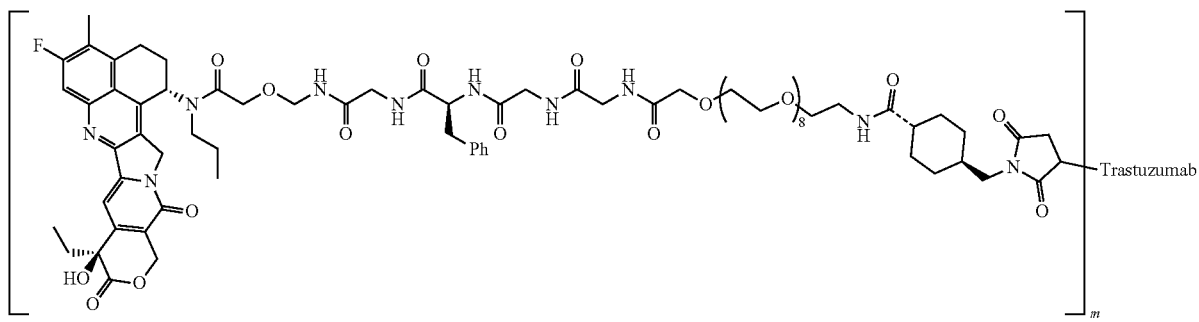
Example 39
Prepared according to general coupling method, using Trastuzumab as antibody to obtain ADC: Tras-PEG-14.

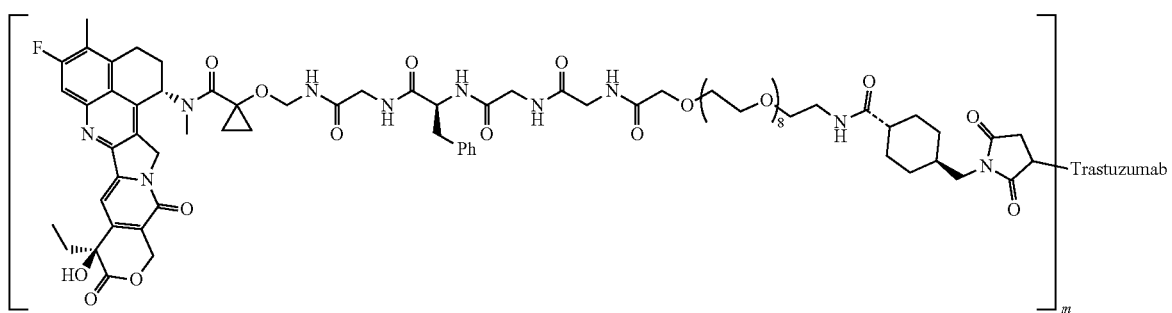
Example 40
Prepared according to the general coupling method, using Trastuzumab as antibody to obtain ADC: Tras-PEG-16.
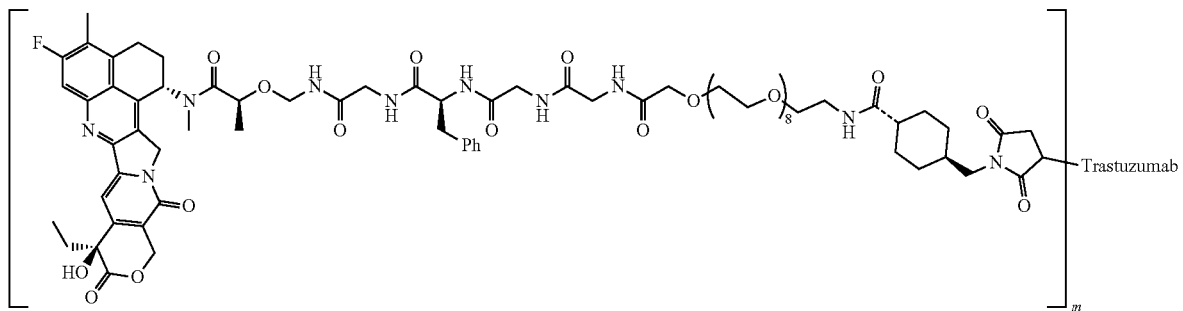
Example 41
Prepared by general coupling method, using Trastuzumab as antibody to obtain ADC: Tras-PEG-18.
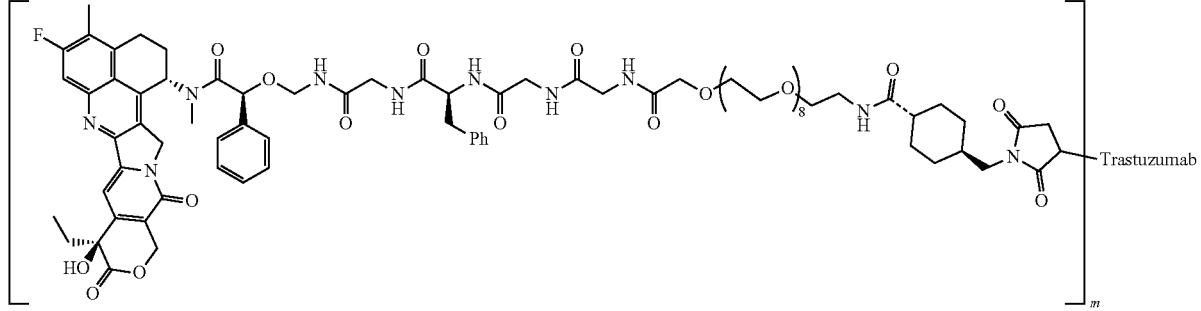
Example 42
Prepared by general coupling method, using Trastuzumab as antibody to obtain ADC: Tras-PEG-20A.

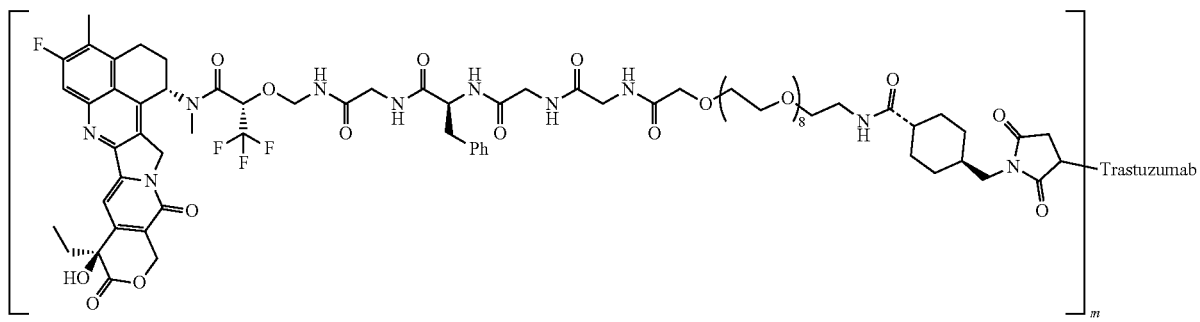

Example 43

Prepared by general coupling method, using Trastuzumab as antibody to obtain ADC: Tras-PEG-22B.

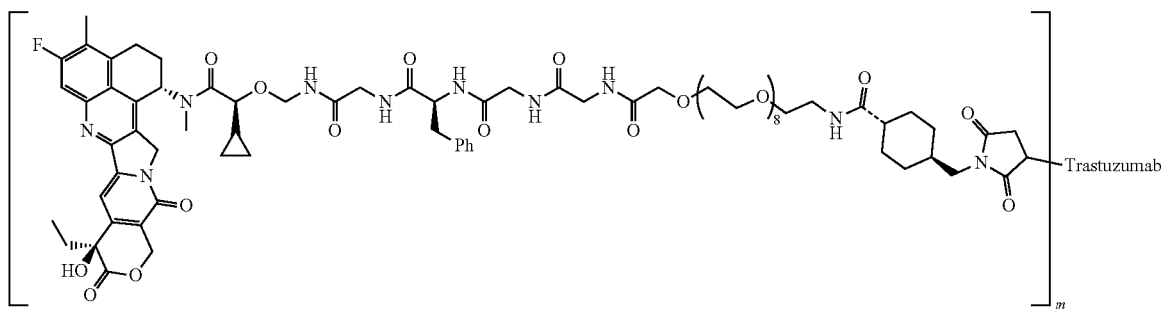

In Vitro Activity Test

1) Experimental Materials

Cells: A431, SW620, BXPC3, Fadu from the Cell Bank of the Chinese Academy of
Sciences Cell
Culture medium DMEM: Gibco
FBS: BIOWEST

2) Preparation of Culture Medium

Growth medium (with 10% FBS, Penicillin/streptomycin (100 U/mL)
Detection medium (with 1% FBS, Penicillin/streptomycin (100 U/mL)

3) Operation

Turn on the UV light of the biological safety cabinet 30 minutes in advance, and then turn on the ventilation for 3 minutes. The growth medium, detection medium, D-PBS and trypsin were preheated in a constant temperature water bath at 37° C., and then the surfaces were disinfected with alcohol and placed in a biological safety cabinet. Place the cells with a confluence of about 80% in a biological safety cabinet, aspirate the old medium, rinse with D-PBS, aspirate and discard, digest with trypsin for 2-3 min, add growth medium to neutralize, and centrifuge. 1200 rpm, 3 min. Aspirate the centrifugation supernatant, mix with 4 mL of detection medium, and count 100 uL (50 uL of cell fluid is taken out, 50 μL of Trypan Blue Stain is added and mixed, and counted after mixing). According to the pre-optimized cell plating density, 80 ul/well was plated in a 96-well plate. Only 80 uL detection medium was added to wells E11 and F11, and 150 uL of DPBS was added to the edge wells. 24 h after plating, add diluted antibody, 20 uL per well and set control, only add 20 uL detection medium in column 11, set 2 duplicate wells for each concentration, and mix on a cell vortex shaker after adding, 550 rpm, 3 min.

Dilution of the antibody solution: use the detection medium to prepare the test solution with an initial concentration of 5 uM and 300 uL in the first column of the V-shaped 96-well plate, and then add 240 uL of detection medium to the second to 10th columns respectively, take 60 uL from the first column of mixing and add it to the second column, mix up and down with a row gun for 10 times, discard the pipette tip, and operate the following 7 concentrations in sequence.

4) Detection

After 4 days, take out the MTS reagent, thaw at room temperature in the dark, vortex and mix well, add 20 μL of CellTiter One Solution Reagen MTS reagent per 100 μL of cell culture volume along the side wall of the well in the biological safety cabinet, and tap gently. After the MTS solution was evenly mixed, it was placed in a cell incubator for 2 h in the dark. After the reaction, the 96-well plate was taken out, the absorbance at OD490 nm was detected in a microplate reader, and the data was recorded, organized, analyzed and stored.

5) Results

TABLE 1

IC50 values of camptothecin derivatives for the inhibition of target cell proliferation in vitro.

| Compound No. | IC50(nM) | | | |
|---|---|---|---|---|
| | A431 | Fadu | Bxpc-3 | SW620 |
| 6 | 3.63 | 1.64 | 13.07 | 17.72 |
| 12 | 1.10 | 0.13 | 1.6-8 | 200-1000 |
| 14 | 93.29 | 52.99 | 152.76 | 200-1000 |
| Control of 16 | 0.03 | 0.0014 | 0.00256-0.0128 | 0.064-0.32 |

The cell experiment results show that the camptothecin derivatives of the present disclosure have significant in vitro antitumor activity (nanomolar level), and the toxicity is significantly lower than that of the toxin used by Daiichi Sankyo (control compound 16). Therefore, the present disclosure the designed and synthesized camptothecin derivatives are expected to become safer anti-tumor ADC drugs.

ADC In Vivo Efficacy Testing

In the present disclosure, an A431 tumor-bearing mouse model is established to evaluate the in vivo efficacy of the toxin ADC conjugated drug. That is, 1×106A431 cells were subcutaneously injected into the right side of 4-6 weeks old BALB/c nude mice, and when the average tumor size of the mice grew to 180-200 mm$^3$, they were randomly divided into groups of 5 mice in each group, 14 and 21 days were given to blank control (blank buffer solution) and antibody drug conjugate Tr000-6, all of which were administered intravenously at a dose of 10 mg/kg. Tumor volume measurement data are shown as mean tumor volume±SE at the time of measurement.

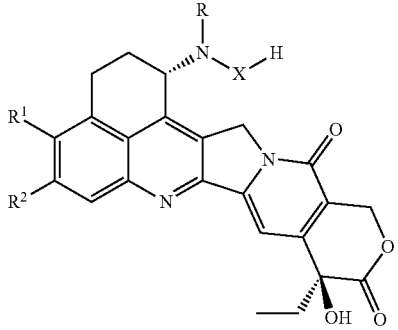

wherein:
R is $C_{1-6}$ alkyl, deuterated alkyl, substituted alkyl, aryl, substituted aryl or heteroaryl;
$R^1$ is hydrogen, deuterium, halogen, alkyl, deuterated alkyl, haloalkyl, cycloalkyl, cycloalkylalkyl, alkoxyalkyl, carboxyl, heterocyclyl, aryl, substituted aryl or heteroaryl;
$R^2$ is hydrogen, deuterium, halogen, alkyl, deuterated alkyl, haloalkyl, cycloalkyl, cycloalkylalkyl, alkoxyalkyl, carboxyl, heterocyclyl, aryl, substituted aryl or heteroaryl; and
X is —C(O)—$CR^aR^b$—$(CR^3R^4)_n$—O—, —C(O)—$CR^aR^b$—$(CR^3R^4)_n$—NH— or —C(O)—$CR^aR^b$—$(CR^3R^4)_n$—S—, wherein:
$R^a$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;
$R^b$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;
or $R^a$ and $R^b$ together with the carbon atom to which they are attached constitute $C_{3-6}$ cycloalkyl, cycloalkylalkyl or heterocyclyl;
$R^3$ and $R^4$ are the same or different, and are independently hydrogen, deuterium, halogen, alkyl, haloalkyl, deuter-

What is claimed is:

1. A camptothecin derivative having a formula D, its tautomers, mesomers, racemates, enantiomers, diastereomers, mixtures, or pharmaceutically acceptable salts or solvates thereof:

ated alkyl, alkoxy, hydroxyl, amino, cyano, nitro, hydroxyalkyl, cycloalkyl or heterocyclyl; or $R^3$ and $R^4$ together with the carbon atom to which they are attached constitute $C_{3-6}$ cycloalkyl, cycloalkylalkyl or heterocyclyl; and
n is an integer from 0 to 4.

2. A camptothecin derivative, its tautomers, mesomers, racemates, enantiomers, diastereomers, mixtures, or its pharmaceutically acceptable salts or solvates thereof, having a formula $D_1$:

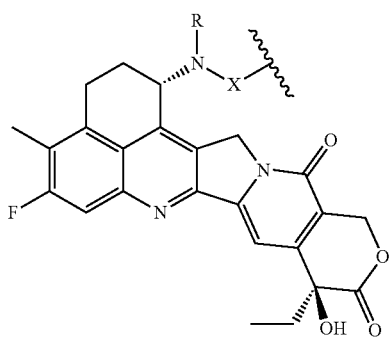

wherein:
R is $C_{1-6}$ alkyl, deuterated alkyl, substituted alkyl, aryl, substituted aryl or heteroaryl; and
X is —C(O)—$CR^aR^b$—$(CR^3R^4)_n$—O—, —C(O)—$CR^aR^b$—$(CR^3R^4)_n$—NH— or —C(O)—$CR^aR^b$—$(CR^3R^4)_n$—S—, wherein:
$R^a$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;
$R^b$ is hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;
or $R^a$ and $R^b$ together with the carbon atom to which they are attached constitute $C_{3-6}$ cycloalkylalkyl or heterocyclyl;
$R^3$ and $R^4$ are the same or different, and are each independently hydrogen, deuterium, hydroxyl, amino, cyano, nitro, halogen, alkyl, haloalkyl, deuterated alkyl, alkoxy, hydroxyalkyl, cycloalkyl or heterocyclyl;
or $R^3$ and $R^4$ together with the carbon atom to which they are attached constitute $C_{3-6}$ cycloalkyl, cycloalkylalkyl or heterocyclyl;
n is an integer from 0 to 4; and
the wavy line in the formula $D_1$ is a hydrogen atom or is covalently linked to a linker or to an antibody having a binding specificity to an antigen expressed by a target cell.

3. The camptothecin derivative of claim 1, its tautomers, mesomers, racemates, enantiomers, diastereomers, mixtures, or a pharmaceutically acceptable salt or solvate thereof, wherein X is —C(O)—$CR^aR^b$—$(CR^3R^4)_n$—O—, wherein:
R is a $C_{1-6}$ alkyl group, a deuterated alkyl group, a substituted alkyl group, an aryl group, a substituted aryl group or a heteroaryl group;
$R^3$ and $R^4$ are the same or different, each independently selected from hydrogen atom, deuterium atom, halogen or alkyl;
$R^a$ is $C_{3-6}$ cycloalkylalkyl or $C_{3-6}$ cycloalkyl;
$R^b$ is hydrogen, haloalkyl or $C_{3-6}$ cycloalkyl;
or $R^a$ and $R^b$ together with the carbon atom to which they are attached form a $C_{3-6}$ cycloalkyl; and
n is 0 or 1.

4. The camptothecin derivative of claim 1, its tautomers, mesomers, racemates, enantiomers, diastereomers, mixtures, or a pharmaceutically acceptable salt or solvate thereof, having a formula $D_2$:

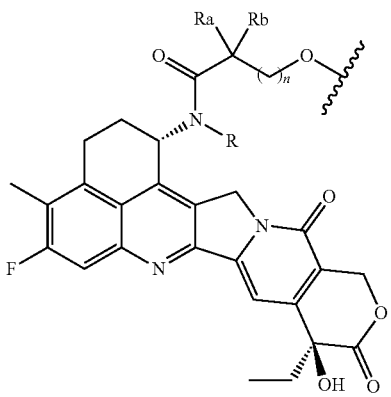

wherein:
R is $C_{1-6}$ alkyl, deuterated alkyl, substituted alkyl, aryl, substituted aryl or heteroaryl;
$R^a$ is cycloalkyl or cycloalkylalkyl;
$R^b$ is hydrogen, deuterium, alkyl, haloalkyl, cycloalkyl or cycloalkylalkyl;
or $R^a$ and $R^b$ together with the carbon atom to which they are attached constitute $C_{3-6}$ cycloalkyl, cycloalkylalkyl or heterocyclyl;
n is 0 or 1; and
the wavy line in the formula $D_2$ is hydrogen or is covalently linked to a linker, or to an antibody having a binding specificity to an antigen expressed by a target cell.

5. The camptothecin derivative of claim 1, its tautomers, mesomers, racemates, enantiomers, diastereomers, mixtures, or a pharmaceutically acceptable salt or solvate thereof, wherein X is:

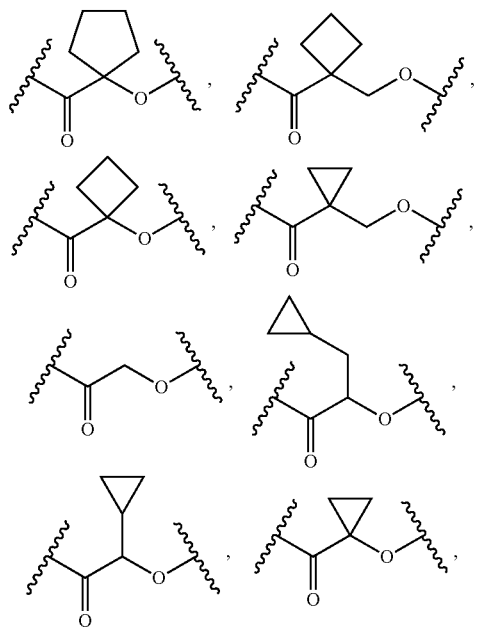

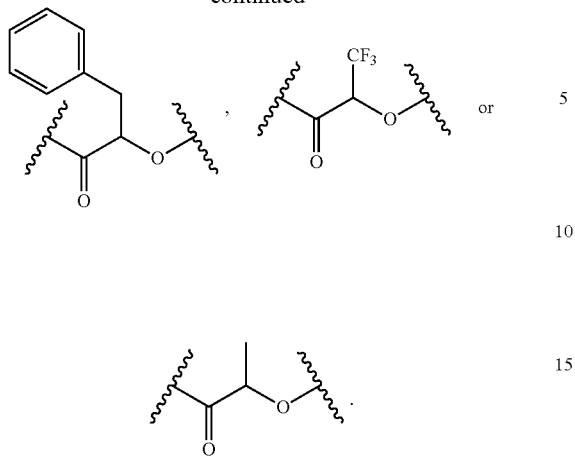

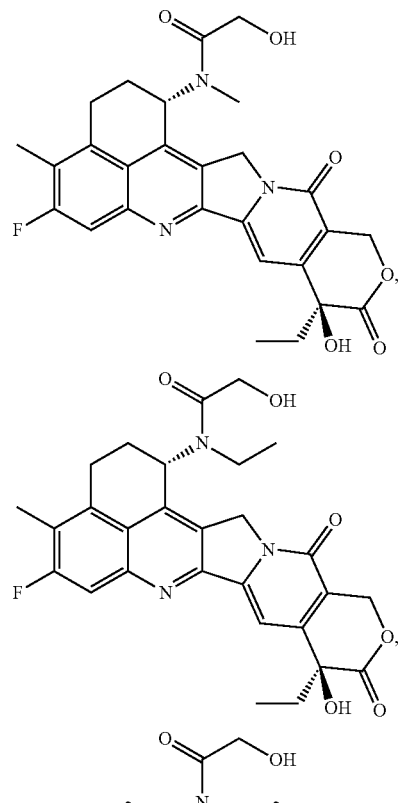

6. The camptothecin derivative of claim 1, its tautomers, mesomers, racemates, enantiomers, diastereomers, mixtures, or a pharmaceutically acceptable salt or solvate thereof, having a formula $D_3$:

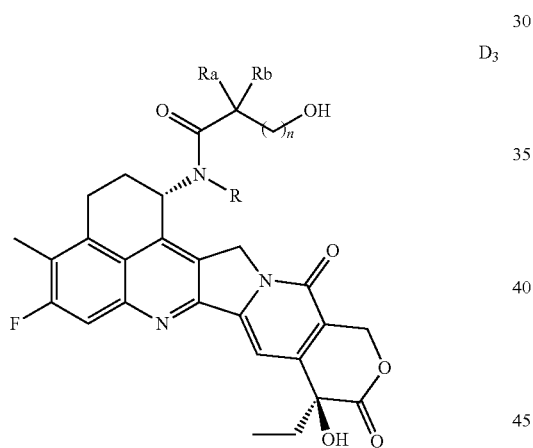

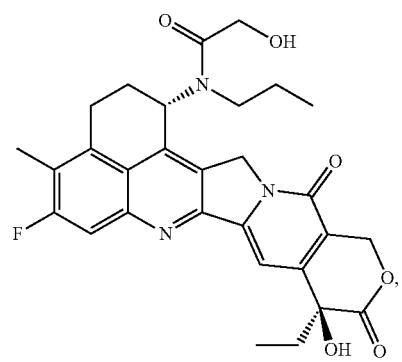

wherein:
R is $C_{1-6}$ alkyl, deuterated alkyl, substituted alkyl, aryl, substituted aryl or heteroaryl;

$R^a$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

$R^b$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

or $R^a$ and $R^b$ together with the carbon atom to which they are attached constitute $C_{3-6}$ cycloalkyl, cycloalkylalkyl or heterocyclyl; and n is 0 or 1.

7. The camptothecin derivative of claim 1, its tautomers, mesomers, racemates, enantiomers, diastereomers, mixtures, or pharmaceutically acceptable salts or solvates thereof, comprising:

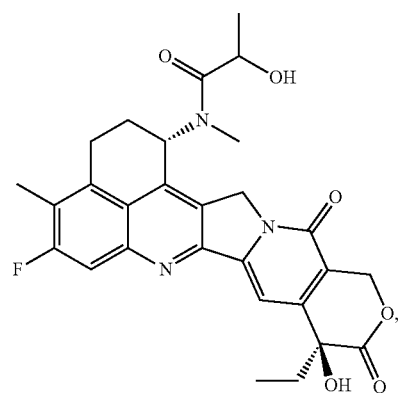

-continued

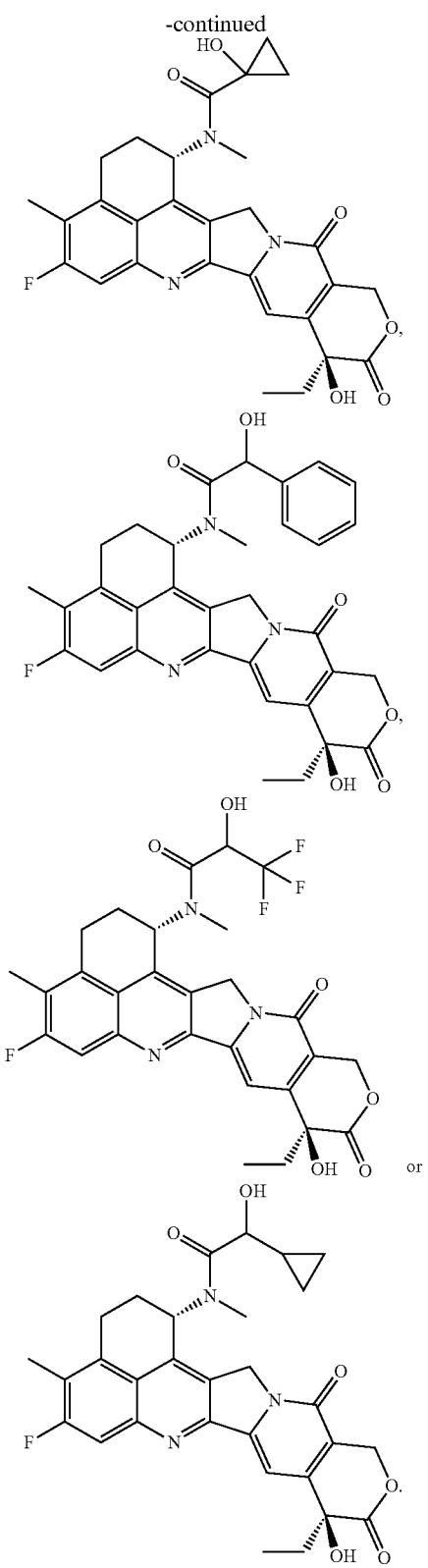

or

8. A drug-linker compound having a formula (-L-X-D2) or its pharmaceutically acceptable salt or solvate thereof:

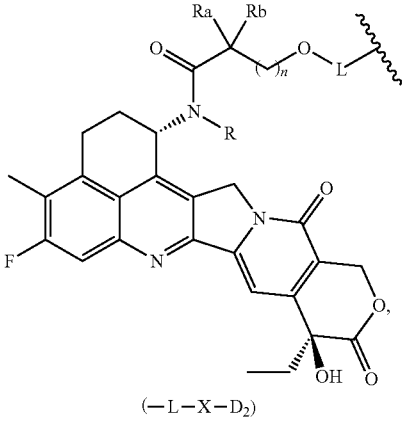

(—L—X—D₂)

wherein:
R is $C_{1-6}$ alkyl, deuterated alkyl, substituted alkyl, aryl, substituted aryl or heteroaryl;

$R^a$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

$R^b$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

or $R^a$ and $R^b$ together with the carbon atom to which they are attached constitute $C_{3-6}$ cycloalkyl, cycloalkylalkyl or heterocyclyl;

n is 0 or 1;

L is a linker; and the wavy line in the formula -L-X-D2 is hydrogen or is covalently linked to a linker, or to an antibody having a binding specificity to an antigen expressed by a target cell.

9. The drug-linker compound of claim 8, or its pharmaceutically acceptable salt or solvate thereof, wherein the linker -L- is -$L_1$-$L_2$-$L_3$-$L_4$-, wherein:
the $L_1$ end is connected to the antibody, and the $L_4$ end is connected to X;

$L_1$ is -(succinimide-3-yl-N)—Y—C(O)—, —CH₂—C(O)—NR⁵—Y—C(O)— or —C(O)—Y—C(O)—, wherein Y is $C_{1-8}$ alkyl, $C_{1-8}$ alkyl-cycloalkyl, or linear or linear-cyclic heteroalkyl with 1-8 atoms comprising 1-3 atoms selected from N, O or S; and wherein the $C_{1-8}$ alkyl, cycloalkyl, linear or linear-cyclic heteroalkyl are each independently substituted with one or more substituents of deuterium, halogen, hydroxyl, cyano, nitro, amino, alkyl, carboxyl, heteroalkyl, substituted alkyl, alkoxy or cycloalkyl;

$L_2$ is —NR⁶(CH₂CH₂O)$_p$CH₂CH₂C(O)—, —NR⁶(CH₂CH₂O)$_p$CH₂C(O)—, —S(CH₂)$_p$C(O)— or a chemical bond, wherein p is an integer of 0-20;

$L_3$ is a peptide consisting of 2-7 amino acids, wherein the amino acid is optionally substituted with one or more substituents of deuterium, halogen, hydroxyl, cyano, amino, nitro, alkyl, substituted alkyl, alkoxy, cycloalkyl or substituted cycloalkyl;

L$_4$ is —NR$^7$(CR$^8$R$^9$)$_q$—, —C(O)NR$^7$—, —C(O)NR$^7$(CH$_2$)$_q$— or a chemical bond, wherein q is an integer of 0-6;

R$^5$, R$^6$ and R$^7$ are the same or different, and are each independently selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; and R$^8$ and R$^9$ are the same or different, and are each independently selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl.

10. The drug-linker compound of claim 8, or its pharmaceutically acceptable salt or solvate compound thereof, wherein the linker -L- is -L$_1$-L$_2$-L$_3$-L$_4$-, and wherein:

L$_1$ is -(succinimide-3-yl-N)—Y—C(O)—, —CH$_2$—C(O)—NR$^5$—Y—C(O)— or —C(O)—Y—C(O)—, wherein Y is C$_{1-8}$ alkyl, C$_{1-8}$ alkyl-cycloalkyl, or linear or linear-cyclic heteroalkyl having 1-8 atoms comprising 1-3 atoms selected from N, O or S, wherein the C$_{1-8}$ alkyl, cycloalkyl, linear or linear-cyclic heteroalkyl are each independently substituted with one or more substituents of deuterium, halogen, hydroxyl, cyano, nitro, amino, alkyl, carboxyl, heteroalkyl, substituted alkyl, alkoxy or cycloalkyl;

L$_2$ is —NR$^6$(CH$_2$CH$_2$O)$_p$CH$_2$CH$_2$C(O)—, —NR$^6$(CH$_2$CH$_2$O)$_p$CH$_2$C(O)—, —S(CH$_2$)$_p$C(O)— or a chemical bond, wherein p is an integer of 0-20;

L$_3$ is a peptide residue consisting of 2-7 amino acids, wherein the amino acids is optionally substituted with deuterium, halogen, hydroxyl, cyano, amino, nitro, alkyl, substituted alkyl, carboxyl, alkoxy or substituted alkoxy, cycloalkyl or substituted cycloalkyl;

L$_4$ is —NR$^7$(CR$^8$R$^9$)$_q$—, —C(O)NR$^7$—, —C(O)NR$^7$(CH$_2$)$_q$— or a chemical bond, wherein q is an integer of 0-6;

R$^5$, R$^6$ and R$^7$ are the same or different, and are each independently selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; and R$^8$ and R$^9$ are the same or different, and are each independently hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl.

11. A drug-linker compound having a general formula (L-X-D$_2$), or its pharmaceutically acceptable salt or solvate thereof:

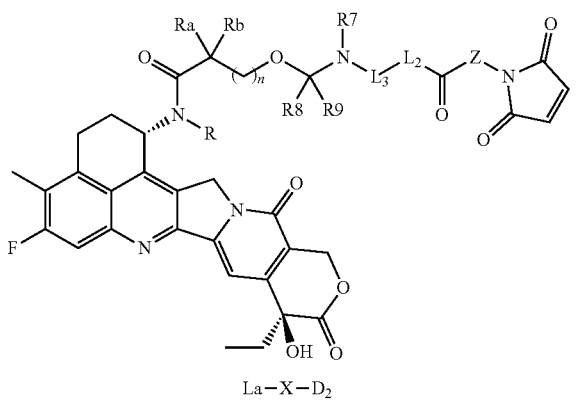

L$_a$—X—D$_2$ wherein:

Z is —Y—C(O)—, —CH$_2$—C(O)—NR$^5$—Y—C(O)— or —C(O)—Y—C(O)—, wherein

Y comprises C$_{1-8}$ alkyl, C$_{1-8}$ alkyl-cycloalkyl or linear or linear-cyclic heteroalkyl with 1-8 atoms having 1-3 atoms selected from N, O or S; and wherein the C$_{1-8}$ alkyl, cycloalkyl, linear or linear-cyclic heteroalkyl are each independently substituted with one or more substituents of deuterium, halogen, hydroxyl, cyano, nitro, amino, alkyl, heteroalkyl, alkoxy, carboxyl or cycloalkyl;

L$_2$ is —NR$^6$(CH$_2$CH$_2$O)$_p$CH$_2$CH$_2$C(O)—, —NR$^6$(CH$_2$CH$_2$O)$_p$CH$_2$C(O)—, —S(CH$_2$)$_p$C(O)— or chemical bond, wherein p is an integer of 0-20;

L$_3$ is a peptide residue consisting of 2-7 amino acids, wherein the amino acid is optionally substituted with deuterium, halogen, hydroxyl, cyano, amino, nitro, alkyl, substituted alkyl, alkoxy, cycloalkyl and substituted cycloalkyl; and R is C$_{1-6}$ alkyl or substituted alkyl, aryl, substituted aryl or heteroaryl;

R$^a$ is hydrogen, deuterium, halogen, alkyl, deuterated alkyl, haloalkyl, cycloalkyl, cycloalkylalkyl, heterocyclyl, aryl, substituted aryl, or heteroaryl;

R$^b$ is hydrogen, deuterium, halogen, alkyl, haloalkyl, deuterated alkyl, cycloalkyl, cycloalkylalkyl, alkoxyalkyl, heterocyclyl, aryl, substituted aryl or heterocycle aryl;

or R$^a$ and R$^b$ together with the carbon atoms to which they are attached constitute C$_{3-6}$ cycloalkyl, cycloalkylalkyl or heterocyclyl;

R$^5$, R$^6$ and R$^7$ are the same or different, and are each independently hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

R$^8$ and R$^9$ are the same or different, and are each independently hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; and n is an integer from 0 to 4.

12. The compound of claim 11, wherein the compound has a formula (L$_b$-X-D$_2$), its tautomers, mesomers, racemates, enantiomers, diastereomers or mixtures thereof:

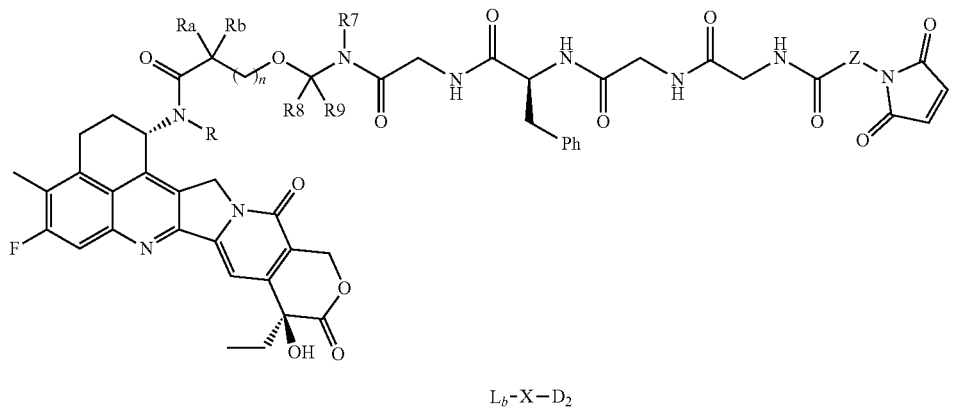

$L_b$-X-$D_2$ wherein:

Z is —Y—C(O)—, —CH$_2$—C(O)—NR$^5$—Y—C(O)— or —C(O)—Y—C(O)—, wherein

Y comprises C$_{1-8}$ alkyl, C$_{1-8}$ alkyl-cycloalkyl, linear or linear-cyclic heteroalkyl of 1-8 atoms containing 1-3 atoms selected from N, O or S, wherein the C$_{1-8}$ alkyl, cycloalkyl, linear or linear-cyclic heteroalkyl are each independently substituted with one or more substituents of deuterium, halogen, hydroxyl, cyano, nitro, amino, alkyl, heteroalkyl, substituted alkyl, alkoxy, carboxyl or cycloalkyl;

R is C$_{1-6}$ alkyl, deuterated alkyl, substituted alkyl, aryl, substituted aryl or heteroaryl;

R$^a$ is hydrogen, deuterium, halogen, alkyl, deuterated alkyl, haloalkyl, cycloalkyl, cycloalkylalkyl, heterocyclyl, aryl, substituted aryl, or heteroaryl;

R$^b$ is hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;

or R$^a$ and R$^b$ together with the carbon atom to which they are attached constitute C$_{3-6}$ cycloalkyl, cycloalkylalkyl or heterocyclyl;

R$^5$ and R$^7$ are the same or different, and are each independently selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;

R$^8$ and R$^9$ are the same or different, and are each independently selected from hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl; and n is an integer from 0 to 4.

13. The drug-linker compound having the general formula (L-X-D$_2$) according to claim 11, or its pharmaceutically acceptable salt or solvate thereof, wherein the drug-linker compound is selected from the following structures:

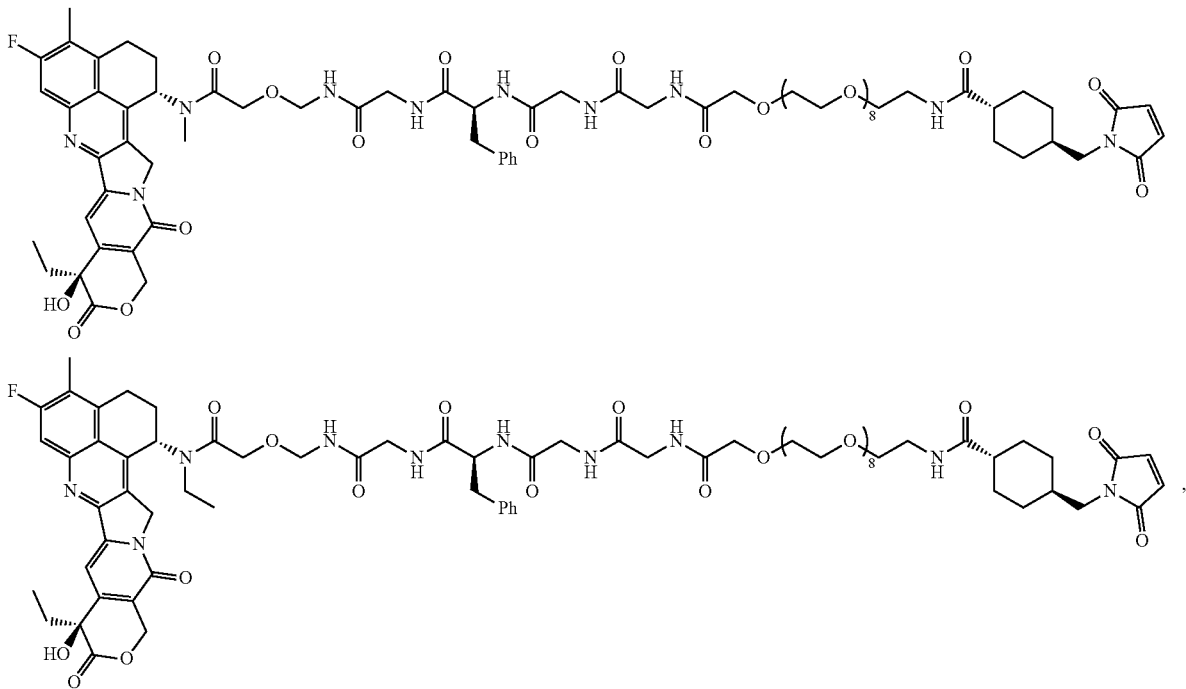

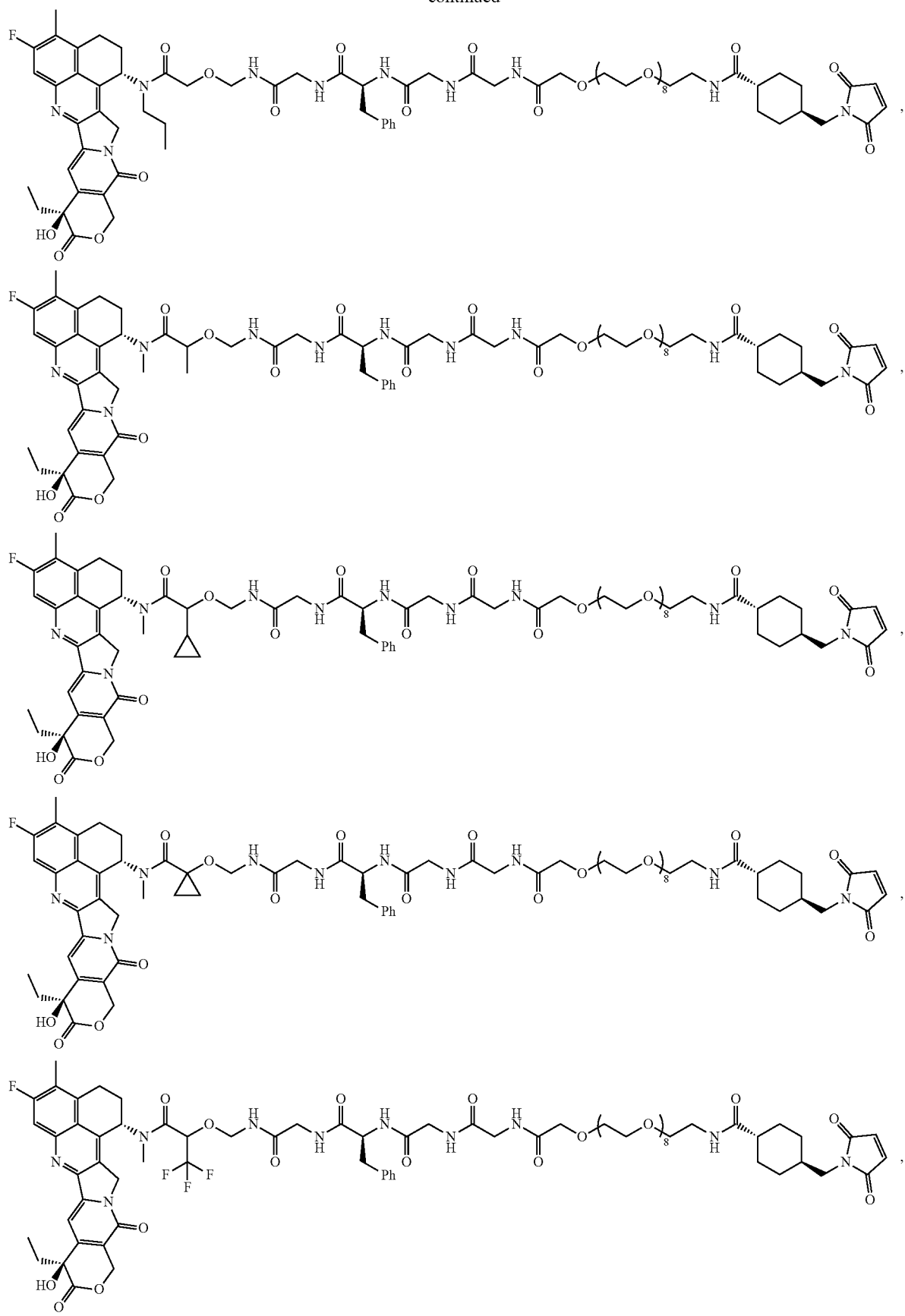

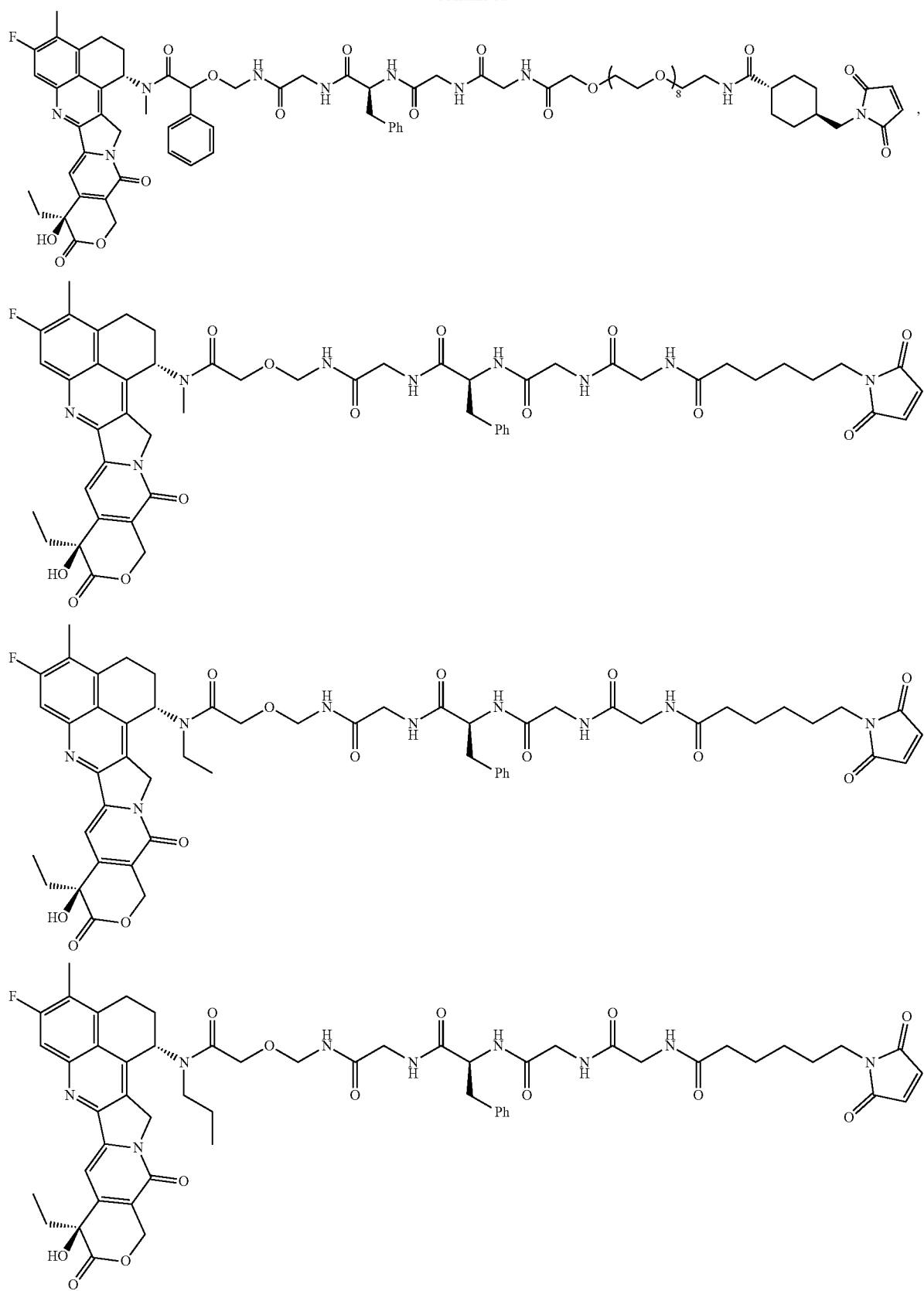

-continued
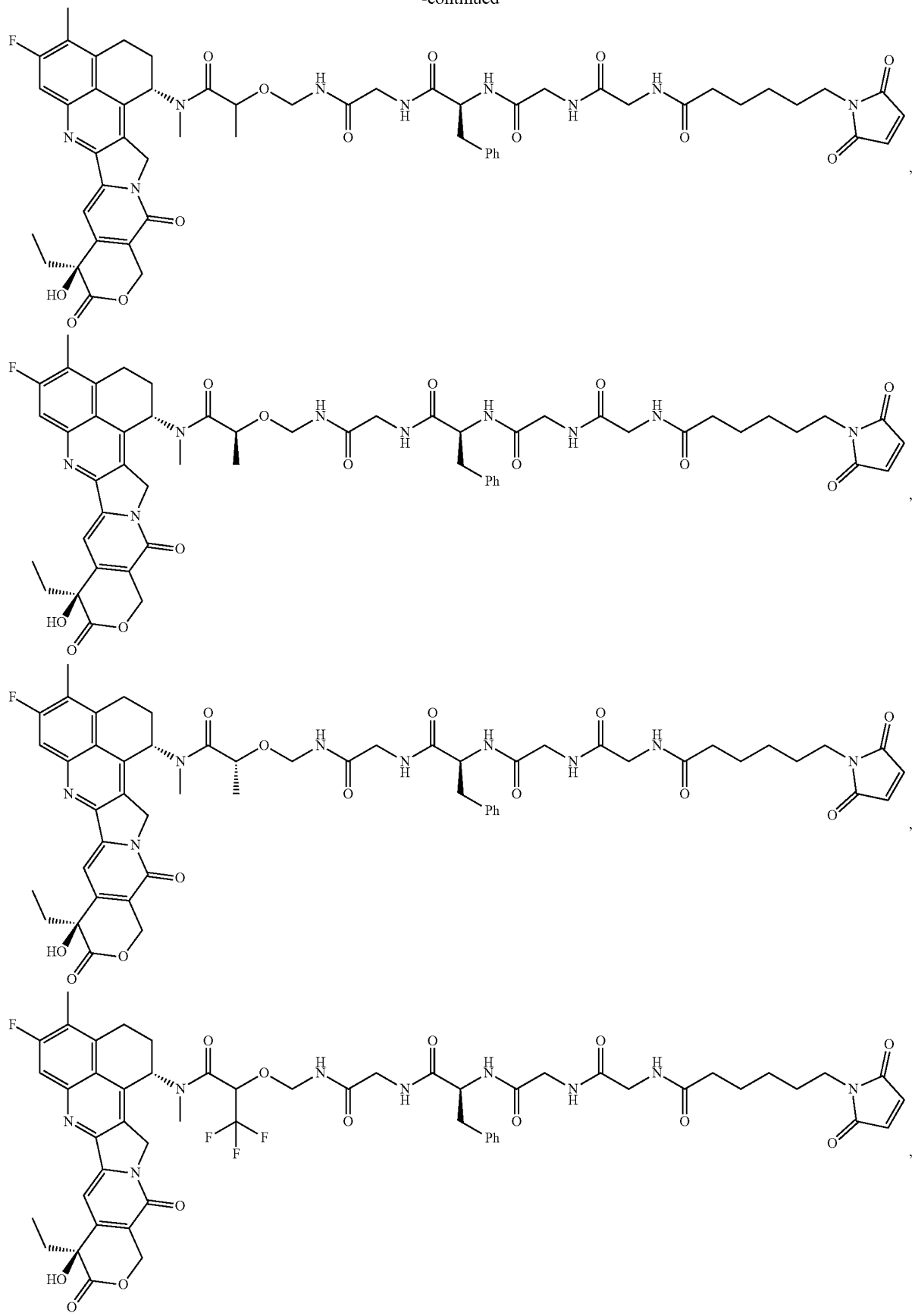

-continued
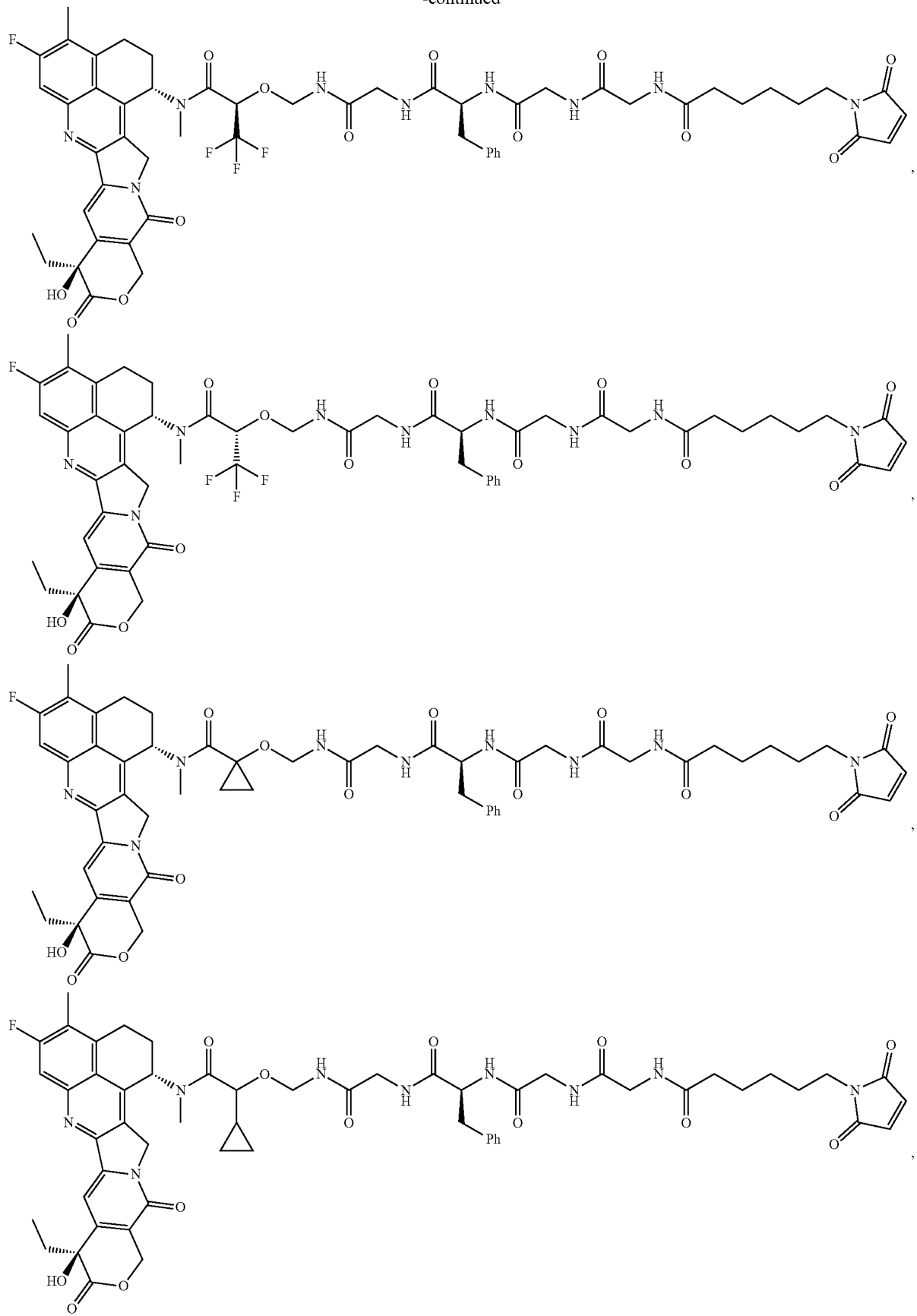

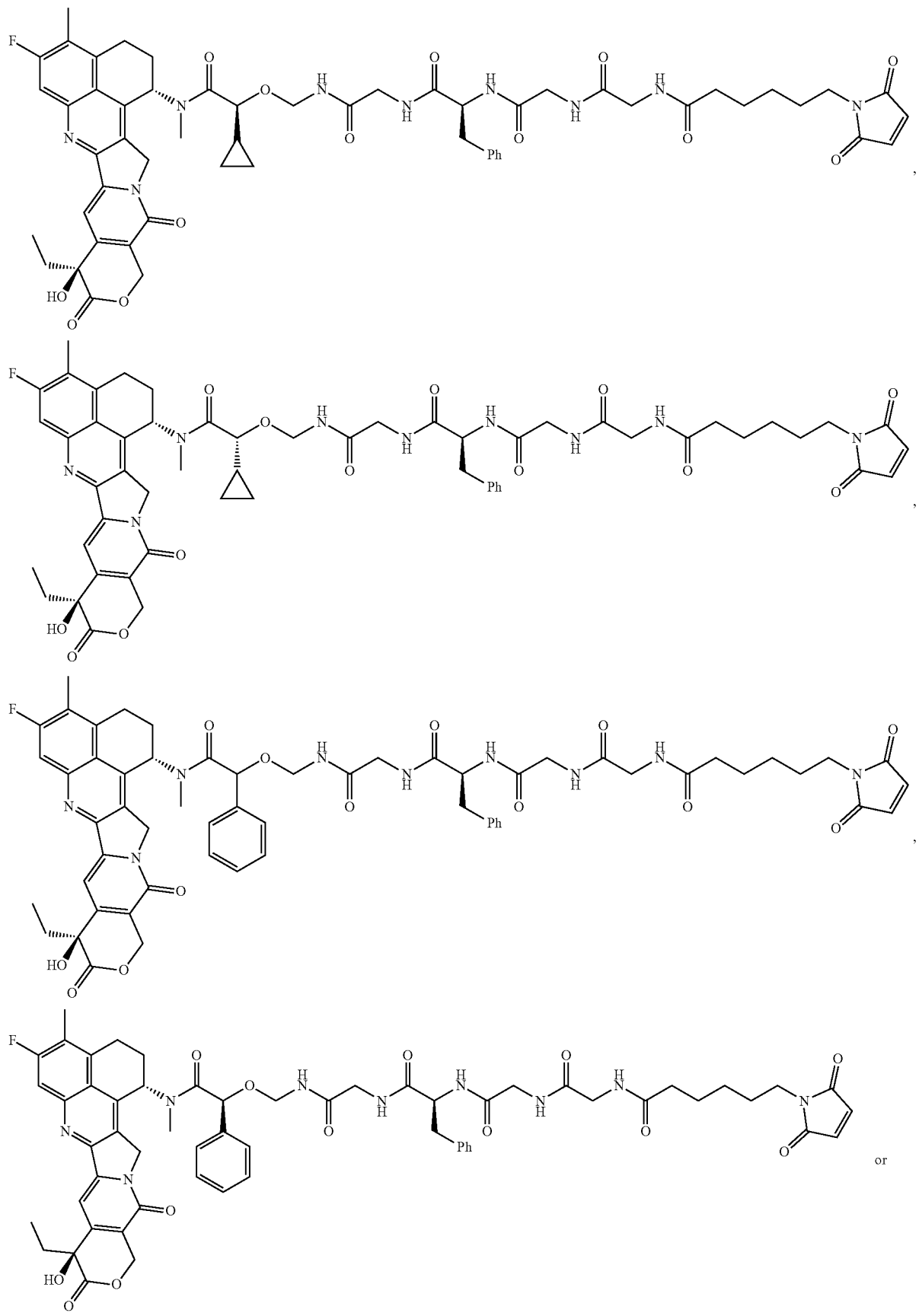

-continued

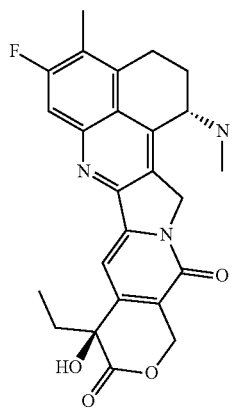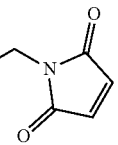

14. An antibody-drug conjugate having a formula (Ab-L-X-Dr) or its pharmaceutically acceptable salt or solvate thereof, wherein the antibody-drug conjugate comprises the drug-linker compound according to claim 8, or its tautomers, mesomers, racemates, enantiomers, diastereomers or mixtures, or pharmaceutically acceptable salts or solvates thereof:

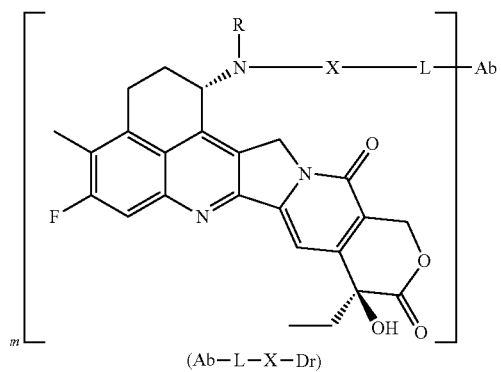

(Ab—L—X—Dr)

wherein:
X is —C(O)—CR$^a$R$^b$—(CR$^3$R$^4$)$_n$—O—, —C(O)—CR$^a$R$^b$—(CR$^3$R$^4$)$_n$—NH— or —C(O)—CR$^a$R$^b$—(CR$^3$R$^4$)$_n$—S—;

wherein
R is C$_{1-6}$ alkyl, deuterated alkyl, substituted alkyl, aryl, substituted aryl or heteroaryl;
R$^a$ is hydrogen, deuterium, halogen, alkyl, deuterated alkyl, haloalkyl, cycloalkyl, cycloalkylalkyl, alkoxyalkyl, heterocyclyl, aryl, substituted aryl or heteroaryl;
R$^b$ is hydrogen, deuterium, halogen, alkyl, haloalkyl, deuterated alkyl, cycloalkyl, cycloalkylalkyl, alkoxyalkyl, heterocyclyl, aryl, substituted aryl or heteroaryl;
or R$^a$ and R$^b$ together with the carbon atom to which they are attached constitute C$_{3-6}$ cycloalkyl, cycloalkylalkyl or heterocyclyl;
R$^3$ and R$^4$ are the same or different, and are independently selected from hydrogen, deuterium, halogen, alkyl, haloalkyl, deuterated alkyl, alkoxy, hydroxyl, amino, cyano, nitro, hydroxyalkyl, cycloalkyl or heterocyclyl;
or R$^3$ and R$^4$ together with the carbon atom to which they are attached constitute C$_{3-6}$ cycloalkyl or heterocyclyl;

n is an integer from 0 to 4;
m is an integer or decimal from 1 to 10;
Ab is an antibody, antibody fragment or protein; and
L is a linker.

15. The antibody-drug conjugate or pharmaceutically acceptable salt or solvate thereof according to claim 14, wherein Ab is an antibody configured to form a linking bond with the linker through its heteroatom, and wherein the antibody is a chimeric antibody, humanized antibody, fully human antibody or murine antibody.

16. The antibody-drug conjugate according to claim 14 or a pharmaceutically acceptable salt or solvate thereof, wherein the antibody is a monoclonal antibody selected from the group consisting of: anti-EGFRvIII antibody, anti-DLL-3 antibody, anti-PSMA antibody, anti-CD70 antibody, anti-MUC16 antibody, anti-ENPP3 antibody, anti-TDGF1 antibody, anti-ETBR antibody, anti-MSLN antibody, anti-TIM-1 antibody, anti-LRRC15 antibody, anti-LIV-1 antibody, AFP antibody, anti-Cladin 18.2 antibody, anti-Mesothelin antibody, anti-HER2(ErbB2) antibody, anti-EGFR antibody, anti-c-MET antibody, anti-SLITRK6 antibody, anti-KIT/CD117 antibody, anti-STEAP1 antibody, anti-SLAMF7/CS1 antibody, anti-NaPi2B/SLC34A2 antibody, anti-GPNMB antibody, anti-HER3 (ErbB3) antibody, anti-MUC1/CD227 antibody, anti-AXL antibody, anti-CD166 antibody, anti-B7-H3 (CD276) antibody, anti-PTK7/CCK4 antibody, anti-PRLR antibody, anti-EFNA4 antibody, anti-5T4 antibody, anti-NOTCH3 antibody, anti-Nectin 4 antibody, anti-TROP-2 antibody, anti-CD142 antibody, anti-CA6 antibody, anti-GPR20 antibody, anti-CD174 antibody, anti-CD71 antibody, anti-EphA2 antibody, anti-LYPD3 antibody, anti-FGFR2 antibody, anti-FGFR3 antibody, anti-FRα antibody, anti-CEACAMs antibody, anti-GCC antibody, anti-Integrin Av antibody, anti-CAIX antibody, anti-P-cadherin antibody, anti-GD3 antibody, anti-Cadherin 6 antibody, anti-LAMP1 antibody, anti-FLT3 antibody, anti-BCMA antibody, anti-CD79b antibody, anti-CD19 antibody, anti-CD33 antibody, anti-CD56 antibody, anti-CD74 antibody, anti-CD22 antibody, anti-CD30 antibody, anti-CD37 antibody, anti-CD138 antibody, anti-CD352 antibody, anti-CD25 antibody and anti-CD123 antibody.

17. The antibody-drug conjugate or a pharmaceutically acceptable salt or solvate thereof according to claim 14, selected from a group consisting of the following structures:

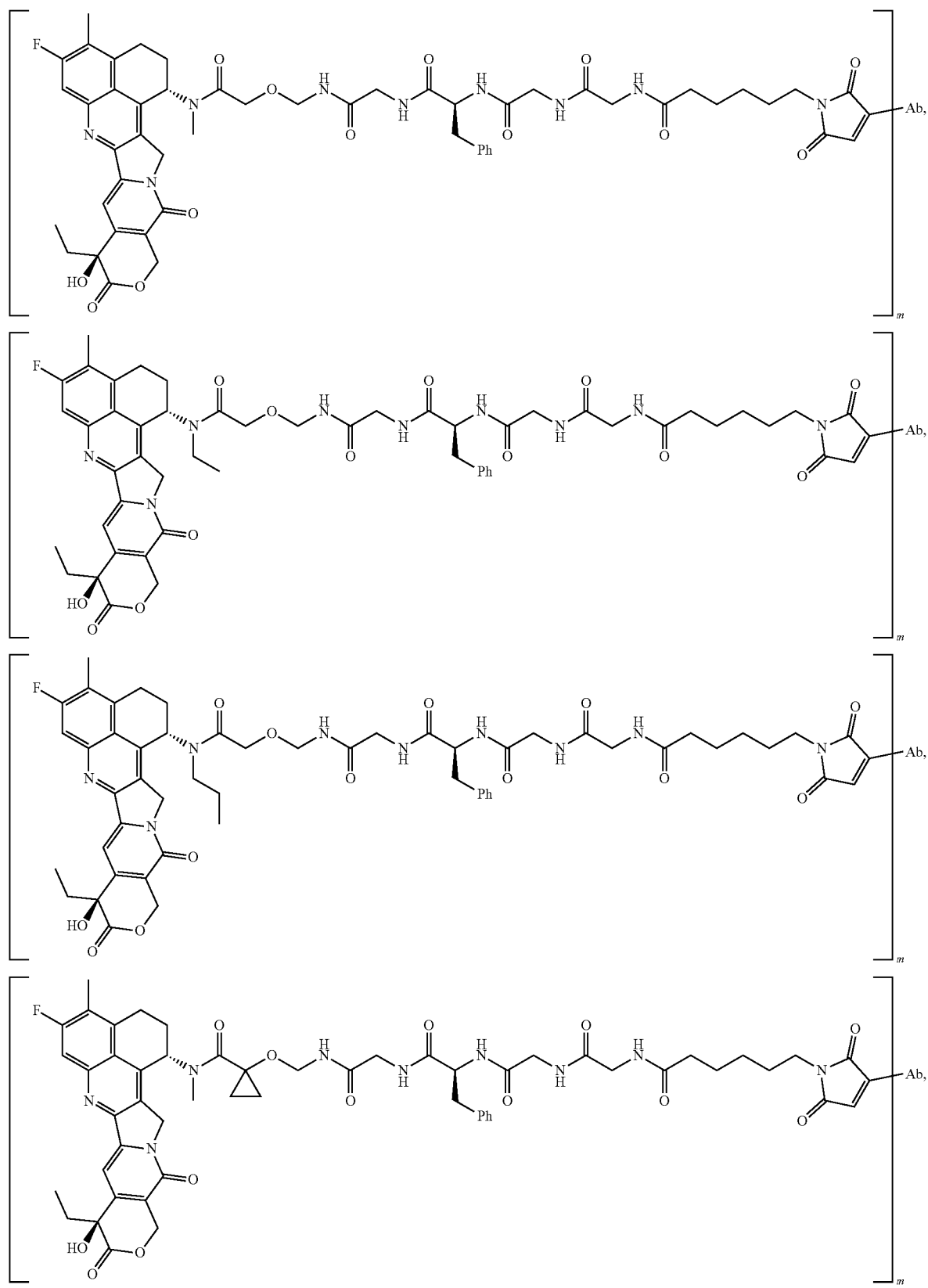

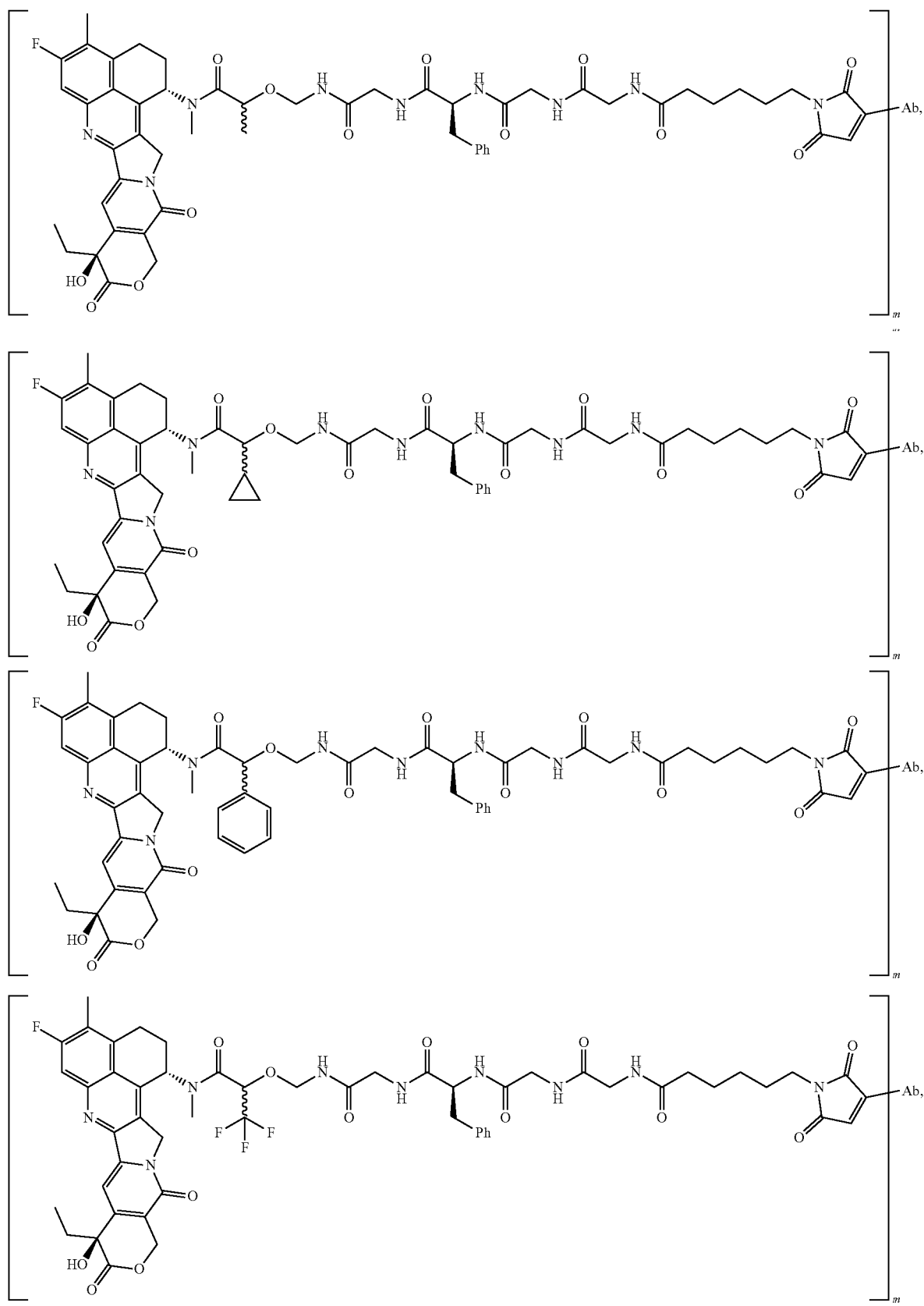

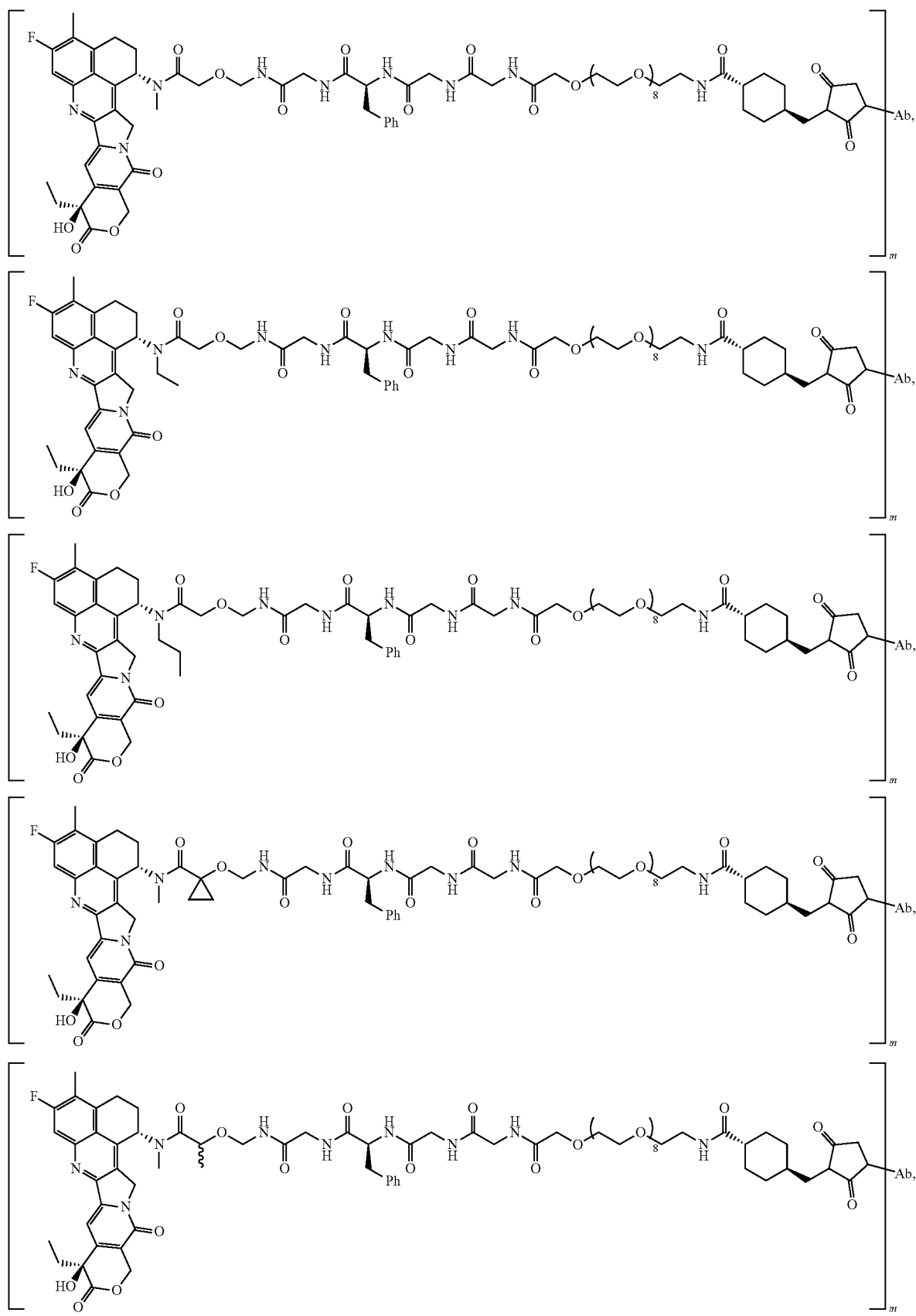

-continued

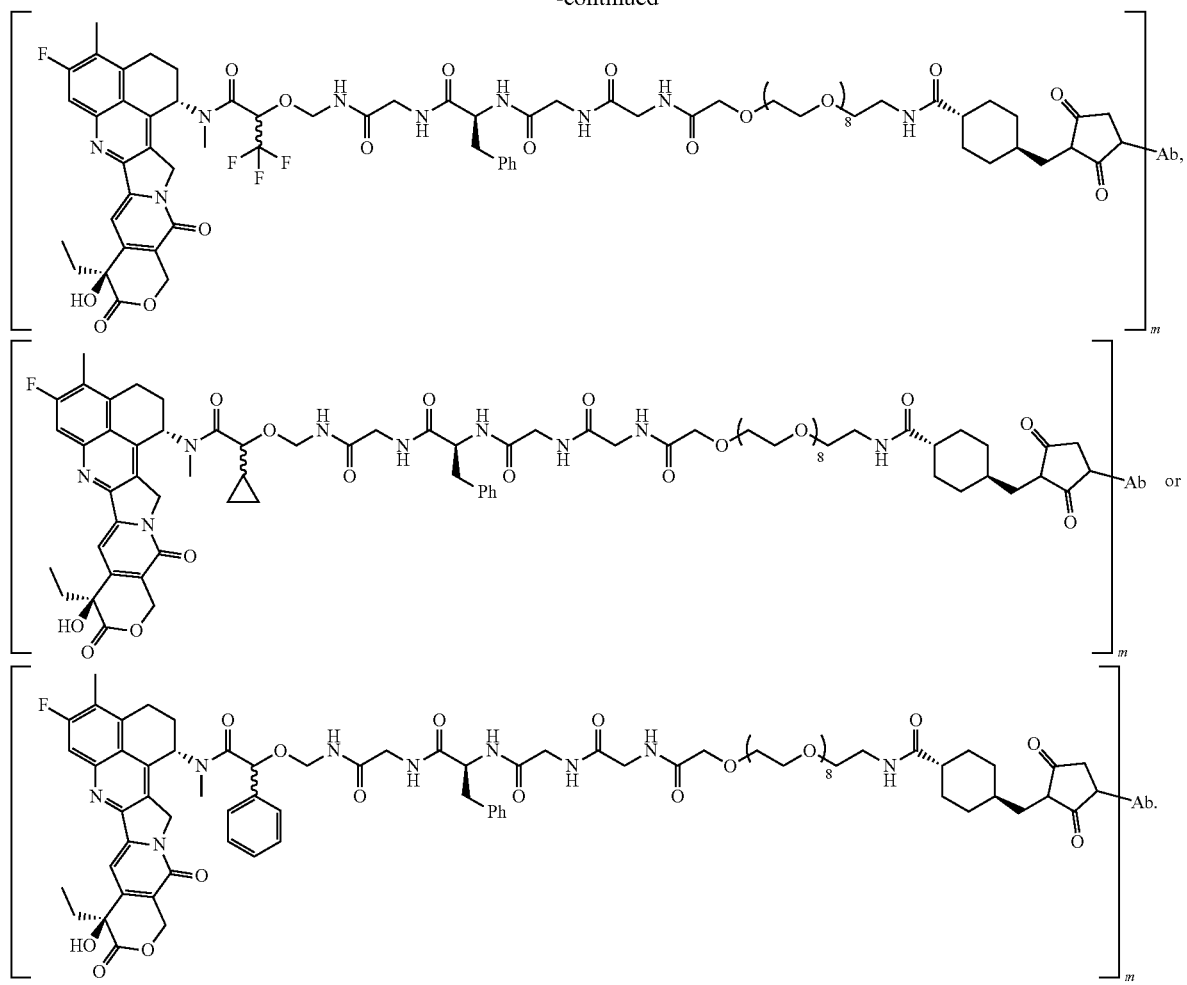

wherein:

m is an integer or decimal from 1 to 10; and

Ab is an antibody, antibody fragment, or antigen-linked fragment.

18. A method for preparing an antibody-drug conjugate having the formula (Ab-L-X-Dr) according to claim 14 or its pharmaceutically acceptable salt or solvate thereof, comprising the step of:

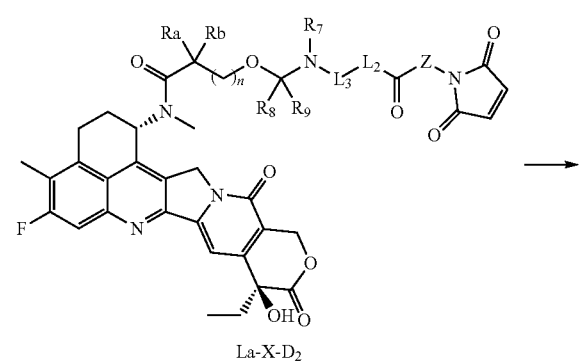

La-X-D$_2$

-continued

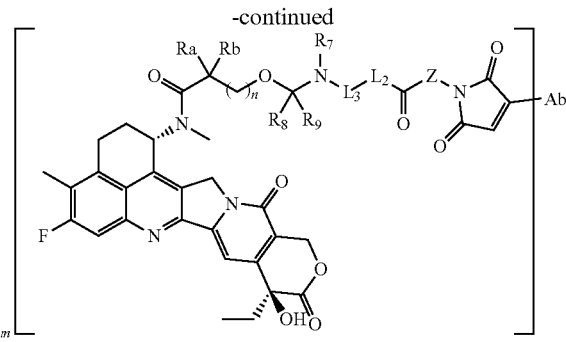

Ab-La-X-D$_2$ obtaining the formula (Ab-L-X-D$_2$) by coupling the antibody, antibody fragment or its antigen-binding fragment with the general formula (L-X-D$_2$).

19. A pharmaceutical composition comprising a therapeutically effective amount of the camptothecin derivative according to claim 1, its tautomers, mesomers, racemates, enantiomers, diastereomers, mixtures thereof, a pharmaceutically acceptable salt or solvate thereof, with a pharmaceutically acceptable carrier, diluent or excipient.

20. A method of treating cancer, comprising administering to a subject in need thereof an effective amount of the camptothecin derivative according to claim 1, or its tautomers, mesomers, racemates, enantiomers, diastereomers or mixtures thereof, or pharmaceutically acceptable salts or solvate compounds thereof, or the antibody-drug conjugate according to claim 14, or its pharmaceutically acceptable salt or solvate thereof, and pharmaceutically acceptable carriers, diluents or excipients.

21. The method of treating cancer according to claim 20, wherein the cancer is selected from solid tumors and hematological malignancies.

22. The drug-linker compound of claim 10, or its pharmaceutically acceptable salt or solvate compound thereof, wherein $L_3$ comprises polypeptide residues formed by phenylalanine (F), glycine (G), valine (V), lysine (K), citrulline, serine (S), glutamic acid (E) or aspartic acid (D).

23. The drug-linker compound of claim 10, or its pharmaceutically acceptable salt or solvate compound thereof, wherein $L_3$ comprises polypeptide residues formed by one or two phenylalanine and glycine.

24. The drug-linker compound of claim 10, or its pharmaceutically acceptable salt or solvate compound thereof, wherein-$L_3$ comprises tetrapeptide residue composed of GGFG (glycine-glycine-phenylalanine-glycine).

25. The method of treating cancer according to claim 20, wherein the solid tumors and hematological malignancies comprise breast cancer, ovarian cancer, cervical cancer, uterine cancer, prostate cancer, kidney cancer, urethral cancer, bladder cancer, liver cancer, stomach cancer, endometrial cancer, salivary gland cancer, esophagus cancer, lung cancer, colon cancer, rectal cancer, colorectal cancer, bone cancer, skin cancer, thyroid cancer, pancreatic cancer, melanoma, glioma, neuroblastoma, glioblastoma multiforme, sarcoma, lymphoma, or leukemia.

* * * * *